US012784745B2

(12) United States Patent
Perkins et al.

(10) Patent No.: US 12,784,745 B2
(45) Date of Patent: *Nov. 3, 2026

(54) APPLICATION VOCABULARY INTEGRATION WITH A DIGITAL ASSISTANT

(71) Applicant: Apple Inc., Cupertino, CA (US)

(72) Inventors: Lewis N. Perkins, Cambridge, MA (US); Pierre Belin, Lynnwood, WA (US); Deniz Dizman, Sammamish, WA (US); Kevin D. Pitolin, San Jose, CA (US)

(73) Assignee: Apple Inc., Cupertino, CA (US)

( * ) Notice: Subject to any disclaimer, the term of this patent is extended or adjusted under 35 U.S.C. 154(b) by 253 days.

This patent is subject to a terminal disclaimer.

(21) Appl. No.: 18/611,526

(22) Filed: Mar. 20, 2024

(65) Prior Publication Data

US 2024/0265914 A1 Aug. 8, 2024

Related U.S. Application Data

(63) Continuation of application No. 17/946,977, filed on Sep. 16, 2022, now Pat. No. 11,978,436.

(60) Provisional application No. 63/348,965, filed on Jun. 3, 2022.

(51) Int. Cl.
*G10L 15/18* (2013.01)
*G10L 15/22* (2006.01)

(52) U.S. Cl.
CPC .............. *G10L 15/18* (2013.01); *G10L 15/22* (2013.01); *G10L 2015/223* (2013.01)

(58) Field of Classification Search
None
See application file for complete search history.

(56) References Cited

U.S. PATENT DOCUMENTS 7,024,363 B1 * 4/2006 Comerford ............ G10L 15/22 704/E15.04
7,117,223 B2 10/2006 Koizumi et al.
7,526,466 B2 4/2009 Au
(Continued)

FOREIGN PATENT DOCUMENTS

AU 2015203483 A1 7/2015
CN 101667424 A 3/2010
(Continued)

OTHER PUBLICATIONS

Decision to Grant received for European Patent Application No. 23169461.3, mailed on Aug. 14, 2025, 2 pages.
(Continued)

*Primary Examiner* — Jonathan C Kim
(74) *Attorney, Agent, or Firm* — YHE Law LLP

(57) ABSTRACT

Systems and processes for operating an intelligent automated assistant are provided. For example, a digital assistant obtains, from a software application, a first static vocabulary entry for the software application; registers the first vocabulary entry with a knowledge base for a digital assistant of the electronic device; and, while the software application is running: receives a request from the software application to register a second dynamic vocabulary entry for the software application; and registers the second vocabulary entry with the knowledge base for the digital assistant.

41 Claims, 19 Drawing Sheets

(56) References Cited

U.S. PATENT DOCUMENTS

| | | | | |
|---|---|---|---|---|
| 7,529,671 | B2 | 5/2009 | Rockenbeck et al. | |
| 7,562,007 | B2 | 7/2009 | Hwang | |
| 7,606,712 | B1 | 10/2009 | Smith et al. | |
| 7,672,841 | B2 | 3/2010 | Bennett | |
| 7,739,588 | B2 | 6/2010 | Reynar et al. | |
| 7,788,590 | B2 | 8/2010 | Taboada et al. | |
| 7,805,299 | B2 | 9/2010 | Coifman | |
| 7,809,565 | B2 | 10/2010 | Coifman | |
| 7,880,730 | B2 | 2/2011 | Robinson et al. | |
| 7,992,085 | B2 | 8/2011 | Wang-Aryattanwanich et al. | |
| 8,046,231 | B2 | 10/2011 | Hirota et al. | |
| 8,239,206 | B1 * | 8/2012 | LeBeau | H04W 4/50<br>707/769 |
| 8,340,975 | B1 | 12/2012 | Rosenberger | |
| 8,457,959 | B2 | 6/2013 | Kaiser | |
| 8,880,405 | B2 | 11/2014 | Cerra et al. | |
| 8,903,716 | B2 | 12/2014 | Chen et al. | |
| 9,190,062 | B2 | 11/2015 | Haughay | |
| 9,367,541 | B1 | 6/2016 | Servan et al. | |
| 9,501,741 | B2 | 11/2016 | Cheyer et al. | |
| 9,606,986 | B2 | 3/2017 | Bellegarda | |
| 9,626,955 | B2 | 4/2017 | Fleizach et al. | |
| 9,633,004 | B2 | 4/2017 | Giuli et al. | |
| 9,633,660 | B2 | 4/2017 | Haughay | |
| 9,633,674 | B2 | 4/2017 | Sinha | |
| 9,668,121 | B2 | 5/2017 | Naik et al. | |
| 9,697,822 | B1 | 7/2017 | Naik et al. | |
| 9,715,875 | B2 | 7/2017 | Piernot et al. | |
| 9,721,566 | B2 | 8/2017 | Newendorp et al. | |
| 9,754,016 | B1 | 9/2017 | Bozarth et al. | |
| 9,818,400 | B2 | 11/2017 | Paulik et al. | |
| 9,858,925 | B2 | 1/2018 | Gruber et al. | |
| 9,886,953 | B2 | 2/2018 | Lemay et al. | |
| 9,922,642 | B2 | 3/2018 | Pitschel et al. | |
| 9,940,396 | B1 | 4/2018 | Willhoit | |
| 9,966,065 | B2 | 5/2018 | Gruber et al. | |
| 9,966,068 | B2 | 5/2018 | Cash et al. | |
| 9,986,419 | B2 | 5/2018 | Naik et al. | |
| 10,049,663 | B2 | 8/2018 | Orr et al. | |
| 10,049,668 | B2 | 8/2018 | Huang et al. | |
| 10,074,360 | B2 | 9/2018 | Kim | |
| 10,078,487 | B2 | 9/2018 | Gruber et al. | |
| 10,083,690 | B2 | 9/2018 | Giuli et al. | |
| 10,089,072 | B2 | 10/2018 | Piersol et al. | |
| 10,089,983 | B1 * | 10/2018 | Gella | G10L 15/22 |
| 10,102,359 | B2 | 10/2018 | Cheyer | |
| 10,102,855 | B1 | 10/2018 | Sindhwani | |
| 10,169,329 | B2 | 1/2019 | Futrell et al. | |
| 10,170,123 | B2 | 1/2019 | Orr et al. | |
| 10,176,167 | B2 | 1/2019 | Evermann | |
| 10,185,542 | B2 | 1/2019 | Carson et al. | |
| 10,186,254 | B2 | 1/2019 | Williams et al. | |
| 10,192,552 | B2 | 1/2019 | Raitio et al. | |
| 10,199,051 | B2 | 2/2019 | Binder et al. | |
| 10,210,860 | B1 | 2/2019 | Ward et al. | |
| 10,223,066 | B2 | 3/2019 | Martel et al. | |
| 10,249,300 | B2 | 4/2019 | Booker et al. | |
| 10,269,345 | B2 | 4/2019 | Castillo Sanchez et al. | |
| 10,296,160 | B2 | 5/2019 | Shah et al. | |
| 10,297,253 | B2 | 5/2019 | Walker, II et al. | |
| 10,311,482 | B2 | 6/2019 | Baldwin | |
| 10,311,871 | B2 | 6/2019 | Newendorp et al. | |
| 10,332,509 | B2 | 6/2019 | Catanzaro et al. | |
| 10,354,168 | B2 | 7/2019 | Bluche | |
| 10,417,037 | B2 | 9/2019 | Gruber et al. | |
| 10,446,142 | B2 | 10/2019 | Lim et al. | |
| 10,475,446 | B2 | 11/2019 | Gruber et al. | |
| 10,497,365 | B2 | 12/2019 | Gruber et al. | |
| 10,504,512 | B1 | 12/2019 | Sarikaya et al. | |
| 10,540,976 | B2 | 1/2020 | Van Os et al. | |
| 10,568,032 | B2 | 2/2020 | Freeman et al. | |
| 10,643,611 | B2 | 5/2020 | Lindahl | |
| 10,652,394 | B2 | 5/2020 | Van Os et al. | |
| 10,659,851 | B2 | 5/2020 | Lister et al. | |
| 10,671,343 | B1 | 6/2020 | Kim et al. | |
| 10,671,428 | B2 | 6/2020 | Zeitlin | |
| 10,691,473 | B2 | 6/2020 | Karashchuk et al. | |
| 10,706,841 | B2 | 7/2020 | Gruber et al. | |
| 10,747,498 | B2 | 8/2020 | Stasior et al. | |
| 10,748,529 | B1 | 8/2020 | Milden | |
| 10,791,176 | B2 | 9/2020 | Phipps et al. | |
| 10,957,337 | B2 | 3/2021 | Chen et al. | |
| 10,978,090 | B2 | 4/2021 | Binder et al. | |
| 11,087,759 | B2 | 8/2021 | Lemay et al. | |
| 11,152,002 | B2 | 10/2021 | Walker et al. | |
| 11,204,787 | B2 | 12/2021 | Radebaugh et al. | |
| 11,348,582 | B2 | 5/2022 | Lindahl | |
| 11,388,291 | B2 | 7/2022 | Van Os et al. | |
| 11,756,548 | B1 | 9/2023 | Perkins et al. | |
| 2004/0006460 | A1 * | 1/2004 | Katayama | G06F 16/332<br>707/E17.062 |
| 2006/0095266 | A1 | 5/2006 | McA'Nulty et al. | |
| 2007/0265832 | A1 * | 11/2007 | Bauman | G06F 40/242<br>704/10 |
| 2009/0182702 | A1 | 7/2009 | Miller | |
| 2009/0284471 | A1 | 11/2009 | Longe et al. | |
| 2010/0070517 | A1 | 3/2010 | Ghosh et al. | |
| 2010/0241418 | A1 | 9/2010 | Maeda et al. | |
| 2011/0131038 | A1 | 6/2011 | Oyaizu et al. | |
| 2011/0288852 | A1 | 11/2011 | Dymetman et al. | |
| 2011/0306304 | A1 | 12/2011 | Forutanpour et al. | |
| 2012/0265528 | A1 | 10/2012 | Gruber et al. | |
| 2013/0117022 | A1 | 5/2013 | Chen et al. | |
| 2013/0246050 | A1 | 9/2013 | Yu et al. | |
| 2014/0164533 | A1 | 6/2014 | Lynch et al. | |
| 2014/0316764 | A1 | 10/2014 | Ayan et al. | |
| 2014/0350933 | A1 | 11/2014 | Bak et al. | |
| 2015/0006182 | A1 | 1/2015 | Schmidt | |
| 2015/0106096 | A1 * | 4/2015 | Toopran | G10L 15/193<br>704/244 |
| 2015/0161108 | A1 * | 6/2015 | Back | G06F 40/56<br>704/9 |
| 2015/0286627 | A1 | 10/2015 | Chang et al. | |
| 2015/0286710 | A1 | 10/2015 | Chang et al. | |
| 2016/0066360 | A1 * | 3/2016 | Vinegrad | H04W 4/80<br>455/450 |
| 2016/0078860 | A1 | 3/2016 | Paulik et al. | |
| 2016/0171980 | A1 | 6/2016 | Liddell et al. | |
| 2016/0313958 | A1 * | 10/2016 | Guadarrama | G06F 3/1407 |
| 2016/0335138 | A1 | 11/2016 | Surti et al. | |
| 2016/0342317 | A1 | 11/2016 | Lim et al. | |
| 2016/0342803 | A1 * | 11/2016 | Goodridge | G06F 21/6218 |
| 2016/0358603 | A1 * | 12/2016 | Azam | G10L 15/26 |
| 2016/0358605 | A1 | 12/2016 | Ganong et al. | |
| 2016/0379626 | A1 | 12/2016 | Deisher et al. | |
| 2017/0092278 | A1 | 3/2017 | Evermann et al. | |
| 2017/0133007 | A1 | 5/2017 | Drewes | |
| 2017/0358303 | A1 | 12/2017 | Walker et al. | |
| 2017/0365251 | A1 * | 12/2017 | Park | G10L 15/063 |
| 2018/0246776 | A1 | 8/2018 | Auvenshine et al. | |
| 2018/0260680 | A1 | 9/2018 | Finkelstein et al. | |
| 2018/0315427 | A1 | 11/2018 | Kwon et al. | |
| 2018/0336893 | A1 * | 11/2018 | Robinson | G06F 3/167 |
| 2019/0172465 | A1 * | 6/2019 | Lee | G06F 3/167 |
| 2019/0361729 | A1 | 11/2019 | Gruber et al. | |
| 2020/0042334 | A1 | 2/2020 | Radebaugh et al. | |
| 2020/0142714 | A1 * | 5/2020 | Navarro | G06F 9/44526 |
| 2020/0251111 | A1 * | 8/2020 | Temkin | G06F 16/2423 |
| 2020/0327895 | A1 | 10/2020 | Gruber et al. | |
| 2020/0356610 | A1 * | 11/2020 | Coimbra | G06F 16/957 |
| 2020/0357387 | A1 * | 11/2020 | Prabhavalkar | G06N 3/044 |
| 2020/0411002 | A1 * | 12/2020 | Lee | G06F 11/3423 |
| 2021/0210089 | A1 * | 7/2021 | Ma | G06F 3/167 |
| 2022/0050661 | A1 * | 2/2022 | Lange | G06V 20/00 |
| 2022/0050876 | A1 | 2/2022 | Kang et al. | |
| 2022/0084511 | A1 | 3/2022 | Nickson et al. | |
| 2022/0093098 | A1 * | 3/2022 | Samal | G06F 3/167 |
| 2022/0229991 | A1 | 7/2022 | Duong et al. | |
| 2023/0206912 | A1 | 6/2023 | Piersol et al. | |
| 2023/0344537 | A1 | 10/2023 | Ingebretsen et al. | |
| 2023/0351149 | A1 | 11/2023 | Yu et al. | |
| 2023/0368783 | A1 | 11/2023 | Marchi et al. | |
| 2023/0368787 | A1 | 11/2023 | Sumner et al. | |
| 2023/0368791 | A1 | 11/2023 | Walker et al. | |

(56) References Cited

U.S. PATENT DOCUMENTS

| | | | | |
|---|---|---|---|---|
| 2023/0395067 | A1* | 12/2023 | Perkins | G06F 9/44505 |
| 2023/0409283 | A1 | 12/2023 | Gruber et al. | |
| 2024/0096321 | A1 | 3/2024 | Naik et al. | |
| 2025/0342828 | A1 | 11/2025 | Piersol et al. | |

FOREIGN PATENT DOCUMENTS

| | | | |
|---|---|---|---|
| CN | 102663016 | A | 9/2012 |
| CN | 102934467 | A | 2/2013 |
| CN | 103226949 | A | 7/2013 |
| CN | 104183144 | A | 12/2014 |
| CN | 108604449 | A | 9/2018 |
| CN | 104183144 | a | 10/2023 |
| EP | 2575128 | A2 | 4/2013 |
| EP | 2639792 | A1 | 9/2013 |
| EP | 3200185 | A1 | 8/2017 |
| EP | 3346400 | A1 | 7/2018 |
| JP | 2013-80476 | A | 5/2013 |
| JP | 2015-528140 | A | 9/2015 |
| KR | 10-2015-0013631 | A | 2/2015 |
| RU | 2353068 | C2 | 4/2009 |
| TW | 201027515 | A | 7/2010 |
| WO | 2013/137503 | A1 | 9/2013 |
| WO | 2013/173504 | A1 | 11/2013 |
| WO | 2014/197635 | A2 | 12/2014 |
| WO | 2016/209444 | A1 | 12/2016 |
| WO | 2022/047214 | A2 | 3/2022 |

OTHER PUBLICATIONS

Office Action received for European Patent Application No. 21777901.6, mailed on Feb. 24, 2025, 9 pages.

Chihani et al., "A User-Centric Context-Aware Mobile Assistant", 2013 17th International Conference on Intelligence in Next Generation Networks (ICIN), IEEE Explore, 2013, pp. 110-117.

Ermolina et al., "Voice-Controlled Intelligent Personal Assistants in Health Care: International Delphi Study", Journal of Medical Internet Research, 2021. Online Available at: doi: 10.2196/25312., Apr. 9, 2021, 20 pages.

Gu et al., "Alohomora: Motion-Based Hotword Detection in Head-Mounted Displays", IEEE Internet of Things Journal, vol. 7, No. 1, Jan. 2020, pp. 611-620.

Pradhan et al., "Understanding and Managing Notifications", IEEE Infocom 2017 - IEEE Conference on Computer Communications, 2017, 9 pages.

White et al., "Task completion detection: A study in the context of intelligent systems.", Proceedings of the 42nd International ACM SIGIR Conference on Research and Development in Information Retrieval, Jul. 21-25, 2019, pp. 405-414.

Yeh et al., "Dialog modeling in audiobook synthesis", Retrieved on Sep. 27, 2023, 6 pages.

Zhou et al., "Using Paralinguistic Information to Disambiguate User Intentions for Distinguishing Phrase Structure and Sarcasm in Spoken Dialog Systems", IEEE Spoken Language Technology Workshop (SLT), Jan. 19, 2021, pp. 1020-1027.

Applicant-Initiated Interview Summary received for U.S. Appl. No. 18/114,877, mailed on May 9, 2025, 4 pages.

Intention to Grant received for European Patent Application No. 23169461.3, mailed on Apr. 4, 2025, 9 pages.

Non-Final Office Action received for U.S. Appl. No. 18/114,877, mailed on Apr. 21, 2025, 12 pages.

International Preliminary Report on Patentability received for PCT Patent Application No. PCT/US2023/017908, mailed on Dec. 12, 2024, 16 pages.

Extended European Search Report received for European Patent Application No. 25192888.3, mailed on Nov. 11, 2025, 12 pages.

Advisory Action received for U.S. Appl. No. 17/946,977, mailed on Dec. 13, 2023, 3 pages.

Advisory Action received for U.S. Appl. No. 17/946,977, mailed on Mar. 20, 2023, 5 pages.

Applicant-Initiated Interview Summary received for U.S. Appl. No. 17/946,977, mailed on Jan. 30, 2023, 3 pages.

Applicant-Initiated Interview Summary received for U.S. Appl. No. 17/946,977, mailed on Mar. 15, 2023, 3 pages.

Applicant-Initiated Interview Summary received for U.S. Appl. No. 17/946,977, mailed on Nov. 22, 2023, 3 pages.

Ashbrook Daniel L., "Enabling Mobile Micro interactions", Retrieved from the Internet: URL: http://danielashbrook.com/wp-content/uploads/2012/06/2009-Ashbrook-Thesis.pdf, May 2010, 186 pages.

Bell Jason, "Machine Learning Hands-On for Developers and Technical Professionals", Wiley, Nov. 3, 2014, 82 pages.

Bodapati et al., "Neural Word Decomposition Models for Abusive Language Detection", Proceedings of the Third Workshop on Abusive Language Online, Aug. 1, 2019, pp. 135-145.

Chen et al., "Progressive Joint Modeling in Unsupervised Single-Channel Overlapped Speech Recognition", IEEE/ACM Transactions on Audio, Speech, And Language Processing, vol. 26, No. 1, Jan. 2018, pp. 184-196.

Corrected Notice of Allowance received for U.S. Appl. No. 17/946,977, mailed on Apr. 3, 2024, 2 pages.

Coulouris et al., "Distributed Systems: Concepts and Design (Fifth Edition)", Addison-Wesley, May 7, 2011, 391 pages.

Czech Lucas, "A System for Recognizing Natural Spelling of English Words", Diploma Thesis, Karlsruhe Institute of Technology, May 7, 2014, 107 pages.

Eder et al., "At the Lower End of Language—Exploring the Vulgar and Obscene Side of German", Proceedings of the Third Workshop on Abusive Language Online, Florence, Italy, Aug. 1, 2019, pp. 119-128.

Examiner Initiated Interview Summary received for U.S. Appl. No. 17/946,977, mailed on Sep. 22, 2023, 2 pages.

Extended European Search Report received for European Patent Application No. 23169461.3, mailed on Oct. 4, 2023, 11 pages.

Final Office Action received for U.S. Appl. No. 17/946,977, mailed on Feb. 8, 2023, 29 pages.

Final Office Action received for U.S. Appl. No. 17/946,977, mailed on Oct. 31, 2023, 35 pages.

Google Codelabs, "Extend Dynamic Shortcuts to Google Assistant with App Actions (Beta)", Available on: https://web.archive.org/web/20220524223852/https://codelabs.developers.google.com/codelabs/appactions-dynamic-shortcuts, May 24, 2022, 25 pages.

Gupta Naresh, "Inside Bluetooth Low Energy", Artech House, Mar. 1, 2013, 274 pages.

Henderson et al., "Efficient Natural Language Response Suggestion for Smart Reply", Available Online at: https://static.googleusercontent.com/media/research.google.com/en//pubs/archive/1846e8a466c079eae7e90727e27caf5f98f10e0c.pdf, 2017, 15 pages.

International Preliminary Report on Patentability received for PCT Patent Application No. PCT/US2021/048036, mailed on Mar. 9, 2023, 24 pages.

International Search Report and Written Opinion received for PCT Patent Application No. PCT/US2021/048036, mailed on Mar. 25, 2022, 30 pages.

International Search Report and Written Opinion received for PCT Patent Application No. PCT/US2023/017908, mailed on Jul. 19, 2023, 22 pages.

Invitation to Pay Additional Fees received for PCT Patent Application No. PCT/US2021/048036, mailed on Dec. 8, 2021, 12 pages.

Jefford et al., "Professional BizTalk Server 2006", Wrox, May 7, 2007, 398 pages.

Muller et al., "A Taxonomy for Information Linking in Augmented Reality", AVR 2016, Part I, LNCS 9768, 2016, pp. 368-387.

Navigli Roberto, "Word Sense Disambiguation: A Survey", ACM Computing Surveys, vol. 41, No. 2, Article 10, Feb. 2009, 69 pages.

Non-Final Office Action received for U.S. Appl. No. 17/946,977, mailed on Jan. 23, 2023, 25 pages.

Non-Final Office Action received for U.S. Appl. No. 17/946,977, mailed on Jul. 25, 2023, 29 pages.

Non-Final Office Action received for U.S. Appl. No. 17/946,977, mailed on Nov. 28, 2022, 25 pages.

Notice of Allowance received for U.S. Appl. No. 17/946,977, mailed on Jan. 31, 2024, 16 pages.

(56) References Cited

OTHER PUBLICATIONS

Phoenix Solutions, Inc., "Declaration of Christopher Schmandt Regarding the MIT Galaxy System", West Interactive Corp., a Delaware Corporation, Document 40, Jul. 2, 2010, 162 pages.
Rowland et al., "Designing Connected Products: UX for the Consumer Internet of Things", O'Reilly, May 31, 2015, 452 pages.
Santos et al., "Fighting Offensive Language on Social Media with Unsupervised Text Style Transfer", Proceedings of the 56th Annual Meeting of the Association for Computational Linguistics (vol. 2: Short Papers), Melbourne, Australia, May 20, 2018, 6 pages.
Senior et al., "Improving DNN Speaker Independence With I-Vector Inputs", ICASSP, 2014, pp. 225-229.
Seroter et al., "SOA Patterns with BizTalk Server 2013 and Microsoft Azure", Second Edition, Packt Publishing, Jun. 30, 2015, 454 pages.
Speicher et al., "What is Mixed Reality?", In Proceedings of the 2019 CHI Conference on Human Factors in Computing Systems (CHI '19). ACM, Article 537, Glasgow, Scotland, UK, online available at: https://dl.acm.org/doi/pdf/10.1145/3290605.3300767, May 4-9, 2019, 15 pages.
Sperber et al., "Self-attentional models for lattice inputs", in Proceedings of the 57th Annual Meeting of the Association for Computational Linguistics, Florence, Italy, Association for Computational Linguistics., Jun. 4, 2019, 13 pages.
SRI, "SRI Speech: Products: Software Development Kits: EduSpeak", available at <http://web.archive.org/web/20090828084033/http://www.speechatsri.com/products/eduspeak>shtml, retrieved on Jun. 20, 2013, pp. 1-2.
Stent et al., "Geo-Centric Language Models for Local Business Voice Search", AT&T Labs—Research, 2009, pp. 389-396.
Sundaram et al., "Latent Perceptual Mapping with Data-Driven Variable-Length Acoustic Units for Template-Based Speech Recognition", ICASSP 2012, Mar. 2012, pp. 4125-4128.
Sundermeyer et al., "From feedforward to recurrent LSTM neural networks for language modeling.", IEEE Transactions to Audio, Speech, and Language Processing, vol. 23, No. 3, Mar. 2015, pp. 517-529.
Tur et al., "The CALO Meeting Assistant System", IEEE Transactions on Audio, Speech, and Language Processing, vol. 18, No. 6, Aug. 2010, pp. 1601-1611.
Wikipedia, "Speech Recognition", available at <http://en.wikipedia.org/wiki/Speech_recognition>, retrieved on Sep. 14, 2011, 12 pages.
Wu et al., "Monophone-based background modeling for two-stage on device wake word detection", in 2018 IEEE International Conference on Acoustics, Speech and Signal Processing (ICASSP), Apr. 2018, 5 pages.
Xiang et al., "Correcting Phoneme Recognition Errors in Learning Word Pronunciation through Speech Interaction", Speech Communication, vol. 55, No. 1, Jan. 1, 2013, pp. 190-203.
Xu et al., "Speech-Based Interactive Games for Language Learning: Reading, Translation, and Question-Answering", Computational Linguistics and Chinese Language Processing, vol. 14, No. 2, Jun. 2009, pp. 133-160.
Yan et al., "A scalable approach to using DNN-derived features in GMM-HMM based acoustic modeling for LVCSR", 14th Annual Conference of the International Speech Communication Association, InterSpeech 2013, Aug. 2013, pp. 104-108.
Corrected Notice of Allowance received for U.S. Appl. No. 18/114,877, mailed on Jul. 9, 2025, 6 pages.
Notice of Allowance received for U.S. Appl. No. 18/114,877, mailed on Jun. 24, 2025, 9 pages.
Office Action received for European Patent Application No. 25192888.3, mailed on Feb. 20, 2026, 5 pages.

* cited by examiner

APPLICATION VOCABULARY INTEGRATION WITH A DIGITAL ASSISTANT

CROSS-REFERENCE TO RELATED APPLICATIONS

This application is a continuation of U.S. patent application Ser. No. 17/946,977, entitled "APPLICATION VOCABULARY INTEGRATION WITH A DIGITAL ASSISTANT," and filed Sep. 16, 2022, which claims priority to U.S. Provisional Application No. 63/348,965, entitled "APPLICATION VOCABULARY INTEGRATION WITH A DIGITAL ASSISTANT," and filed Jun. 3, 2022, the contents of which are hereby incorporated by reference in their entirety.

FIELD

This relates generally to intelligent automated assistants and, more specifically, to registering application terminology for use with an intelligent automated assistant.

BACKGROUND

Intelligent automated assistants (or digital assistants) can provide a beneficial interface between human users and electronic devices. Such assistants can allow users to interact with devices or systems using natural language in spoken and/or text forms. For example, a user can provide a speech input containing a user request to a digital assistant operating on an electronic device. The digital assistant can interpret the user's intent from the speech input and operationalize the user's intent into tasks. The tasks can then be performed by executing one or more services of the electronic device, and a relevant output responsive to the user request can be returned to the user.

An electronic device implementing a digital assistant (e.g., a mobile phone, a laptop, a tablet, or the like) may have applications (e.g., first- and third-party software programs) installed, which can greatly expand the content and functionality available to a user. However, integrating the additional application content and functionality with the digital assistant so a user can interact with the application using natural language can be difficult and inefficient. For example, the terminology for application content and functionality may be "out of vocabulary" for the digital assistant's natural-language processing system. As another example, even if a digital assistant understands a natural-language input, the digital assistant may not understand how to operationalize the user intent using the application content and functionality.

SUMMARY

Example methods are disclosed herein. An example method includes, at an electronic device having one or more processors, obtaining, from a software application, a first vocabulary entry for the software application; registering the first vocabulary entry with a knowledge base for a digital assistant of the electronic device; and, while the software application is running: receiving a request from the software application to register a second vocabulary entry for the software application; and registering the second vocabulary entry with the knowledge base for the digital assistant.

Example non-transitory computer-readable media are disclosed herein. An example non-transitory computer-readable storage medium stores one or more programs. The one or more programs comprise instructions, which when executed by one or more processors of an electronic device, cause the electronic device to obtain, from a software application, a first vocabulary entry for the software application; register the first vocabulary entry with a knowledge base for a digital assistant of the electronic device; and, while the software application is running: receive a request from the software application to register a second vocabulary entry for the software application; and register the second vocabulary entry with the knowledge base for the digital assistant.

Example electronic devices are disclosed herein. An example electronic device comprises one or more processors; a memory; and one or more programs, where the one or more programs are stored in the memory and configured to be executed by the one or more processors, the one or more programs including instructions for obtaining, from a software application, a first vocabulary entry for the software application; registering the first vocabulary entry with a knowledge base for a digital assistant of the electronic device; and, while the software application is running: receiving a request from the software application to register a second vocabulary entry for the software application; and registering the second vocabulary entry with the knowledge base for the digital assistant.

An example electronic device comprises means for obtaining, from a software application, a first vocabulary entry for the software application; registering the first vocabulary entry with a knowledge base for a digital assistant of the electronic device; and, while the software application is running: receiving a request from the software application to register a second vocabulary entry for the software application; and registering the second vocabulary entry with the knowledge base for the digital assistant.

Example methods are disclosed herein. An example method includes, at an electronic device having one or more processors, obtaining, from a software application, an application vocabulary for the software application, wherein the vocabulary includes at least a vocabulary entry of a first type and a vocabulary entry of a second type; registering the application vocabulary to a knowledge base for a digital assistant of the electronic device; receiving a user input; determining whether the user input corresponds to a first vocabulary entry of the application vocabulary; and, in accordance with a determination that at least a first portion of the user input matches the first vocabulary entry, causing the software application to perform a first action based on the first vocabulary entry.

Example non-transitory computer-readable media are disclosed herein. An example non-transitory computer-readable storage medium stores one or more programs. The one or more programs comprise instructions, which when executed by one or more processors of an electronic device, cause the electronic device to obtain, from a software application, an application vocabulary for the software application, wherein the vocabulary includes at least a vocabulary entry of a first type and a vocabulary entry of a second type; register the application vocabulary to a knowledge base for a digital assistant of the electronic device; receive a user input; determine whether the user input corresponds to a first vocabulary entry of the application vocabulary; and, in accordance with a determination that at least a first portion of the user input matches the first vocabulary entry, cause the software application to perform a first action based on the first vocabulary entry.

Example electronic devices are disclosed herein. An example electronic device comprises one or more processors; a memory; and one or more programs, where the one or more programs are stored in the memory and configured to be executed by the one or more processors, the one or more programs including instructions for obtaining, from a software application, an application vocabulary for the software application, wherein the vocabulary includes at least a vocabulary entry of a first type and a vocabulary entry of a second type; registering the application vocabulary to a knowledge base for a digital assistant of the electronic device; receiving a user input; determining whether the user input corresponds to a first vocabulary entry of the application vocabulary; and, in accordance with a determination that at least a first portion of the user input matches the first vocabulary entry, causing the software application to perform a first action based on the first vocabulary entry.

An example electronic device comprises means for obtaining, from a software application, an application vocabulary for the software application, wherein the vocabulary includes at least a vocabulary entry of a first type and a vocabulary entry of a second type; registering the application vocabulary to a knowledge base for a digital assistant of the electronic device; receiving a user input; determining whether the user input corresponds to a first vocabulary entry of the application vocabulary; and, in accordance with a determination that at least a first portion of the user input matches the first vocabulary entry, causing the software application to perform a first action based on the first vocabulary entry.

Registering application terminology for use with a digital assistant, as described herein, provides an efficient and accurate way to integrate application content and functionality with a digital assistant system. For example, separately registering application vocabulary entries of a first type and application vocabulary entries of a second type allows the application vocabulary to be selectively and efficiently updated. Additionally, registering and processing application terminology, as described herein, allows a user to access the content and functionality provided by software applications using the intuitive and efficient natural-language interface of the digital assistant.

DETAILED DESCRIPTION

Figure 1:
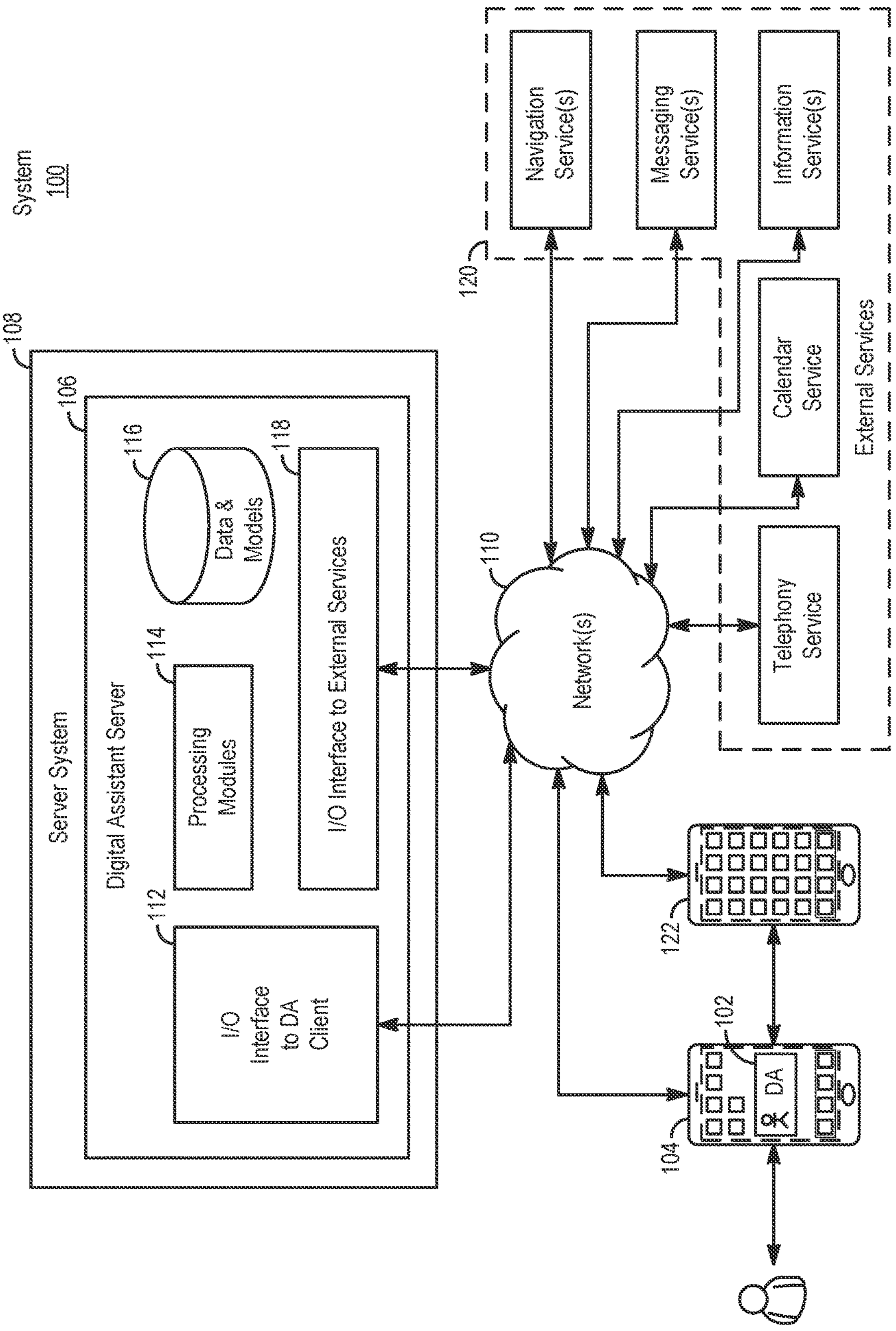
FIG. 1 is a block diagram illustrating a system and environment for implementing a digital assistant, according to various examples.

In the following description of examples, reference is made to the accompanying drawings in which are shown by way of illustration specific examples that can be practiced. It is to be understood that other examples can be used and structural changes can be made without departing from the scope of the various examples.

An intelligent automated assistant may integrate application content and functionality by obtaining and registering application vocabulary. For instance, the intelligent automated assistant may initiate obtaining a first vocabulary entry from an application, such as a static vocabulary entry for a class (e.g., programming concept) handled by the application, and register the first vocabulary entry to a knowledge base for the intelligent automated assistant. Additionally, the intelligent automated assistant may receive a “push” request from the application to register a second vocabulary entry, such as a dynamic vocabulary entry for another class handled by the application, and register the second vocabulary entry to the knowledge base. Upon receiving a user input, the intelligent automated assistant determines whether the user input corresponds to any of the registered application vocabulary entries, for example, finding a match to the user input based on metadata associated with the vocabulary entries in the knowledge base. When a matching vocabulary entry is found, the intelligent automated assistant causes the application to perform an action based on the vocabulary entry.

Although the following description uses terms “first,” “second,” etc. to describe various elements, these elements should not be limited by the terms. These terms are only used to distinguish one element from another. For example, a first input could be termed a second input, and, similarly, a second input could be termed a first input, without departing from the scope of the various described examples. The first input and the second input are both inputs and, in some cases, are separate and different inputs.

The terminology used in the description of the various described examples herein is for the purpose of describing particular examples only and is not intended to be limiting. As used in the description of the various described examples and the appended claims, the singular forms “a,” “an,” and “the” are intended to include the plural forms as well, unless the context clearly indicates otherwise. It will also be understood that the term “and/or” as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

1. System and Environment

FIG. 1 illustrates a block diagram of system 100 according to various examples. In some examples, system 100 implements a digital assistant. The terms "digital assistant," "virtual assistant," "intelligent automated assistant," or "automatic digital assistant" refer to any information processing system that interprets natural language input in spoken and/or textual form to infer user intent, and performs actions based on the inferred user intent. For example, to act on an inferred user intent, the system performs one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form.

Specifically, a digital assistant is capable of accepting a user request at least partially in the form of a natural language command, request, statement, narrative, and/or inquiry. Typically, the user request seeks either an informational answer or performance of a task by the digital assistant. A satisfactory response to the user request includes a provision of the requested informational answer, a performance of the requested task, or a combination of the two. For example, a user asks the digital assistant a question, such as "Where am I right now?" Based on the user's current location, the digital assistant answers, "You are in Central Park near the west gate." The user also requests the performance of a task, for example, "Please invite my friends to my girlfriend's birthday party next week." In response, the digital assistant can acknowledge the request by saying "Yes, right away," and then send a suitable calendar invite on behalf of the user to each of the user's friends listed in the user's electronic address book. During performance of a requested task, the digital assistant sometimes interacts with the user in a continuous dialogue involving multiple exchanges of information over an extended period of time. There are numerous other ways of interacting with a digital assistant to request information or performance of various tasks. In addition to providing verbal responses and taking programmed actions, the digital assistant also provides responses in other visual or audio forms, e.g., as text, alerts, music, videos, animations, etc.

As shown in FIG. 1, in some examples, a digital assistant is implemented according to a client-server model. The digital assistant includes client-side portion 102 (hereafter "DA client 102") executed on user device 104 and server-side portion 106 (hereafter "DA server 106") executed on server system 108. DA client 102 communicates with DA server 106 through one or more networks 110. DA client 102 provides client-side functionalities such as user-facing input and output processing and communication with DA server 106. DA server 106 provides server-side functionalities for any number of DA clients 102 each residing on a respective user device 104.

In some examples, DA server 106 includes client-facing I/O interface 112, one or more processing modules 114, data and models 116, and I/O interface to external services 118. The client-facing I/O interface 112 facilitates the client-facing input and output processing for DA server 106. One or more processing modules 114 utilize data and models 116 to process speech input and determine the user's intent based on natural language input. Further, one or more processing modules 114 perform task execution based on inferred user intent. In some examples, DA server 106 communicates with external services 120 through network(s) 110 for task completion or information acquisition. I/O interface to external services 118 facilitates such communications.

User device 104 can be any suitable electronic device. In some examples, user device 104 is a portable multifunctional device (e.g., device 200, described below with reference to FIG. 2A), a multifunctional device (e.g., device 400, described below with reference to FIG. 4), or a personal electronic device (e.g., device 600, described below with reference to FIGS. 6A-6B). A portable multifunctional device is, for example, a mobile telephone that also contains other functions, such as PDA and/or music player functions. Specific examples of portable multifunction devices include the Apple Watch@, iPhone®, iPod Touch®, and iPad® devices from Apple Inc. of Cupertino, California. Other examples of portable multifunction devices include, without limitation, earphones/headphones, speakers, and laptop or tablet computers. Further, in some examples, user device 104 is a non-portable multifunctional device. In particular, user device 104 is a desktop computer, a game console, a speaker, a television, or a television set-top box. In some examples, user device 104 includes a touch-sensitive surface (e.g., touch screen displays and/or touchpads). Further, user device 104 optionally includes one or more other physical user-interface devices, such as a physical keyboard, a mouse, and/or a joystick. Various examples of electronic devices, such as multifunctional devices, are described below in greater detail.

Examples of communication network(s) 110 include local area networks (LAN) and wide area networks (WAN), e.g., the Internet. Communication network(s) 110 is implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more standalone data processing apparatus or a distributed network of computers. In some examples, server system 108 also employs various virtual devices and/or services of third-party service providers (e.g., third-party cloud service providers) to provide the underlying computing resources and/or infrastructure resources of server system 108.

In some examples, user device 104 communicates with DA server 106 via second user device 122. Second user device 122 is similar or identical to user device 104. For example, second user device 122 is similar to devices 200, 400, or 600 described below with reference to FIGS. 2A, 4, and 6A-6B. User device 104 is configured to communicatively couple to second user device 122 via a direct communication connection, such as Bluetooth, NFC, BTLE, or the like, or via a wired or wireless network, such as a local Wi-Fi network. In some examples, second user device 122 is configured to act as a proxy between user device 104 and DA server 106. For example, DA client 102 of user device 104 is configured to transmit information (e.g., a user request received at user device 104) to DA server 106 via second user device 122. DA server 106 processes the information and returns relevant data (e.g., data content responsive to the user request) to user device 104 via second user device 122.

In some examples, user device 104 is configured to communicate abbreviated requests for data to second user device 122 to reduce the amount of information transmitted from user device 104. Second user device 122 is configured to determine supplemental information to add to the abbreviated request to generate a complete request to transmit to DA server 106. This system architecture can advantageously allow user device 104 having limited communication capabilities and/or limited battery power (e.g., a watch or a similar compact electronic device) to access services provided by DA server 106 by using second user device 122, having greater communication capabilities and/or battery power (e.g., a mobile phone, laptop computer, tablet computer, or the like), as a proxy to DA server 106. While only two user devices 104 and 122 are shown in FIG. 1, it should be appreciated that system 100, in some examples, includes any number and type of user devices configured in this proxy configuration to communicate with DA server 106.

Although the digital assistant shown in FIG. 1 includes both a client-side portion (e.g., DA client 102) and a server-side portion (e.g., DA server 106), in some examples, the functions of a digital assistant are implemented as a standalone application installed on a user device. In addition, the divisions of functionalities between the client and server portions of the digital assistant can vary in different implementations. For instance, in some examples, the DA client is a thin-client that provides only user-facing input and output processing functions, and delegates all other functionalities of the digital assistant to a backend server.

2. Electronic Devices

Figure 2A:
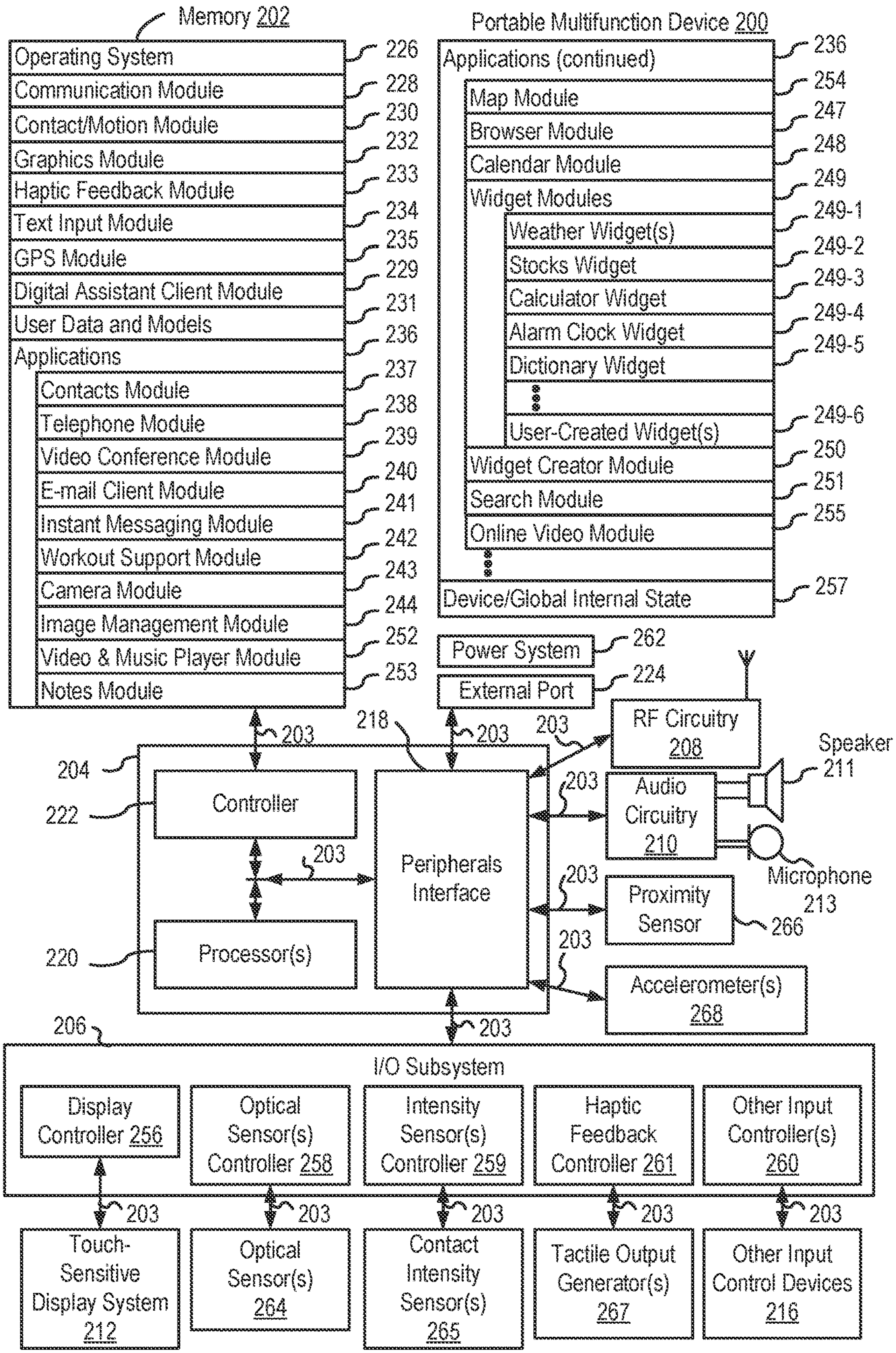
FIG. 2A is a block diagram illustrating a portable multifunction device implementing the client-side portion of a digital assistant, according to various examples.

Attention is now directed toward embodiments of electronic devices for implementing the client-side portion of a digital assistant. FIG. 2A is a block diagram illustrating portable multifunction device 200 with touch-sensitive display system 212 in accordance with some embodiments. Touch-sensitive display 212 is sometimes called a "touch screen" for convenience and is sometimes known as or called a "touch-sensitive display system." Device 200 includes memory 202 (which optionally includes one or more computer-readable storage mediums), memory controller 222, one or more processing units (CPUs) 220, peripherals interface 218, RF circuitry 208, audio circuitry 210, speaker 211, microphone 213, input/output (I/O) subsystem 206, other input control devices 216, and external port 224. Device 200 optionally includes one or more optical sensors 264. Device 200 optionally includes one or more contact intensity sensors 265 for detecting intensity of contacts on device 200 (e.g., a touch-sensitive surface such as touch-sensitive display system 212 of device 200). Device 200 optionally includes one or more tactile output generators 267 for generating tactile outputs on device 200 (e.g., generating tactile outputs on a touch-sensitive surface such as touch-sensitive display system 212 of device 200 or touchpad 455 of device 400). These components optionally communicate over one or more communication buses or signal lines 203.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 200 is only one example of a portable multifunction device, and that device 200 optionally has more or fewer components than shown, optionally combines two or more components, or optionally has a different configuration or arrangement of the components. The various components shown in FIG. 2A are implemented in hardware, software, or a combination of both hardware and software, including one or more signal processing and/or application-specific integrated circuits.

Memory 202 includes one or more computer-readable storage mediums. The computer-readable storage mediums are, for example, tangible and non-transitory. Memory 202 includes high-speed random access memory and also includes non-volatile memory, such as one or more magnetic disk storage devices, flash memory devices, or other non-volatile solid-state memory devices. Memory controller 222 controls access to memory 202 by other components of device 200.

In some examples, a non-transitory computer-readable storage medium of memory 202 is used to store instructions (e.g., for performing aspects of processes described below) for use by or in connection with an instruction execution system, apparatus, or device, such as a computer-based system, processor-containing system, or other system that can fetch the instructions from the instruction execution system, apparatus, or device and execute the instructions. In other examples, the instructions (e.g., for performing aspects of the processes described below) are stored on a non-transitory computer-readable storage medium (not shown) of the server system 108 or are divided between the non-transitory computer-readable storage medium of memory 202 and the non-transitory computer-readable storage medium of server system 108.

Peripherals interface 218 is used to couple input and output peripherals of the device to CPU 220 and memory 202. The one or more processors 220 run or execute various software programs and/or sets of instructions stored in memory 202 to perform various functions for device 200 and to process data. In some embodiments, peripherals interface 218, CPU 220, and memory controller 222 are implemented on a single chip, such as chip 204. In some other embodiments, they are implemented on separate chips.

RF (radio frequency) circuitry 208 receives and sends RF signals, also called electromagnetic signals. RF circuitry 208 converts electrical signals to/from electromagnetic signals and communicates with communications networks and other communications devices via the electromagnetic signals. RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 208 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 210, speaker 211, and microphone 213 provide an audio interface between a user and device 200. Audio circuitry 210 receives audio data from peripherals interface 218, converts the audio data to an electrical signal, and transmits the electrical signal to speaker 211. Speaker 211 converts the electrical signal to human-audible sound waves. Audio circuitry 210 also receives electrical signals converted by microphone 213 from sound waves. Audio circuitry 210 converts the electrical signal to audio data and transmits the audio data to peripherals interface 218 for processing. Audio data are retrieved from and/or transmitted to memory 202 and/or RF circuitry 208 by peripherals interface 218. In some embodiments, audio circuitry 210 also includes a headset jack (e.g., 312, FIG. 3). The headset jack provides an interface between audio circuitry 210 and removable audio input/output peripherals, such as output-only headphones or a headset with both output (e.g., a headphone for one or both ears) and input (e.g., a microphone).

I/O subsystem 206 couples input/output peripherals on device 200, such as touch screen 212 and other input control devices 216, to peripherals interface 218. I/O subsystem 206 optionally includes display controller 256, optical sensor controller 258, intensity sensor controller 259, haptic feedback controller 261, and one or more input controllers 260 for other input or control devices. The one or more input controllers 260 receive/send electrical signals from/to other input control devices 216. The other input control devices 216 optionally include physical buttons (e.g., push buttons, rocker buttons, etc.), dials, slider switches, joysticks, click wheels, and so forth. In some alternate embodiments, input controller(s) 260 are, optionally, coupled to any (or none) of the following: a keyboard, an infrared port, a USB port, and a pointer device such as a mouse. The one or more buttons (e.g., 308, FIG. 3) optionally include an up/down button for volume control of speaker 211 and/or microphone 213. The one or more buttons optionally include a push button (e.g., 306, FIG. 3).

A quick press of the push button disengages a lock of touch screen 212 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 306) turns power to device 200 on or off. The user is able to customize a functionality of one or more of the buttons. Touch screen 212 is used to implement virtual or soft buttons and one or more soft keyboards.

Touch-sensitive display 212 provides an input interface and an output interface between the device and a user. Display controller 256 receives and/or sends electrical signals from/to touch screen 212. Touch screen 212 displays visual output to the user. The visual output includes graphics, text, icons, video, and any combination thereof (collectively termed "graphics"). In some embodiments, some or all of the visual output correspond to user-interface objects.

Touch screen 212 has a touch-sensitive surface, sensor, or set of sensors that accepts input from the user based on haptic and/or tactile contact. Touch screen 212 and display controller 256 (along with any associated modules and/or sets of instructions in memory 202) detect contact (and any movement or breaking of the contact) on touch screen 212 and convert the detected contact into interaction with user-interface objects (e.g., one or more soft keys, icons, web pages, or images) that are displayed on touch screen 212. In an exemplary embodiment, a point of contact between touch screen 212 and the user corresponds to a finger of the user.

Touch screen 212 uses LCD (liquid crystal display) technology, LPD (light emitting polymer display) technology, or LED (light emitting diode) technology, although other display technologies may be used in other embodiments. Touch screen 212 and display controller 256 detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 212. In an exemplary embodiment, projected mutual capacitance sensing technology is used, such as that found in the iPhone® and iPod Touch® from Apple Inc. of Cupertino, California.

A touch-sensitive display in some embodiments of touch screen 212 is analogous to the multi-touch sensitive touchpads described in the following U.S. Pat. No. 6,323,846 (Westerman et al.), 6,570,557 (Westerman et al.), and/or 6,677,932 (Westerman), and/or U.S. Patent Publication 2002/0015024A1, each of which is hereby incorporated by reference in its entirety. However, touch screen 212 displays visual output from device 200, whereas touch-sensitive touchpads do not provide visual output.

A touch-sensitive display in some embodiments of touch screen 212 is as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 212 has, for example, a video resolution in excess of 100 dpi. In some embodiments, the touch screen has a video resolution of approximately 160 dpi. The user makes contact with touch screen 212 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 200 includes a touchpad (not shown) for activating or deactivating particular functions. In some embodiments, the touchpad is a touch-sensitive area of the device that, unlike the touch screen, does not display visual output. The touchpad is a touch-sensitive surface that is separate from touch screen 212 or an extension of the touch-sensitive surface formed by the touch screen.

Device 200 also includes power system 262 for powering the various components. Power system 262 includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 200 also includes one or more optical sensors 264. FIG. 2A shows an optical sensor coupled to optical sensor controller 258 in I/O subsystem 206. Optical sensor 264 includes charge-coupled device (CCD) or complementary metal-oxide semiconductor (CMOS) phototransistors. Optical sensor 264 receives light from the environment, projected through one or more lenses, and converts the light to data representing an image. In conjunction with imaging module 243 (also called a camera module), optical sensor 264 captures still images or video. In some embodiments, an optical sensor is located on the back of device 200, opposite touch screen display 212 on the front of the device so that the touch screen display is used as a viewfinder for still and/or video image acquisition. In some embodiments, an optical sensor is located on the front of the device so that the user's image is obtained for video conferencing while the user views the other video conference participants on the touch screen display. In some embodiments, the position of optical sensor 264 can be changed by the user (e.g., by rotating the lens and the sensor in the device housing) so that a single optical sensor 264 is used along with the touch screen display for both video conferencing and still and/or video image acquisition.

Device 200 optionally also includes one or more contact intensity sensors 265. FIG. 2A shows a contact intensity sensor coupled to intensity sensor controller 259 in I/O subsystem 206. Contact intensity sensor 265 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 265 receives contact intensity information (e.g., pressure information or a proxy for pressure information) from the environment. In some embodiments, at least one contact intensity sensor is collocated with, or proximate to, a touch-sensitive surface (e.g., touch-sensitive display system 212). In some embodiments, at least one contact intensity sensor is located on the back of device 200, opposite touch screen display 212, which is located on the front of device 200.

Device 200 also includes one or more proximity sensors 266. FIG. 2A shows proximity sensor 266 coupled to peripherals interface 218. Alternately, proximity sensor 266 is coupled to input controller 260 in I/O subsystem 206. Proximity sensor 266 is performed as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 212 when the multifunction device is placed near the user's ear (e.g., when the user is making a phone call).

Device 200 optionally also includes one or more tactile output generators 267. FIG. 2A shows a tactile output generator coupled to haptic feedback controller 261 in I/O subsystem 206. Tactile output generator 267 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 265 receives tactile feedback generation instructions from haptic feedback module 233 and generates tactile outputs on device 200 that are capable of being sensed by a user of device 200. In some embodiments, at least one tactile output generator is collocated with, or proximate to, a touch-sensitive surface (e.g., touch-sensitive display system 212) and, optionally, generates a tactile output by moving the touch-sensitive surface vertically (e.g., in/out of a surface of device 200) or laterally (e.g., back and forth in the same plane as a surface of device 200). In some embodiments, at least one tactile output generator sensor is located on the back of device 200, opposite touch screen display 212, which is located on the front of device 200.

Device 200 also includes one or more accelerometers 268. FIG. 2A shows accelerometer 268 coupled to peripherals interface 218. Alternately, accelerometer 268 is coupled to an input controller 260 in I/O subsystem 206. Accelerometer 268 performs, for example, as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 200 optionally includes, in addition to accelerometer(s) 268, a magnetometer (not shown) and a GPS (or GLONASS or other global navigation system) receiver (not shown) for obtaining information concerning the location and orientation (e.g., portrait or landscape) of device 200.

Figure 4:
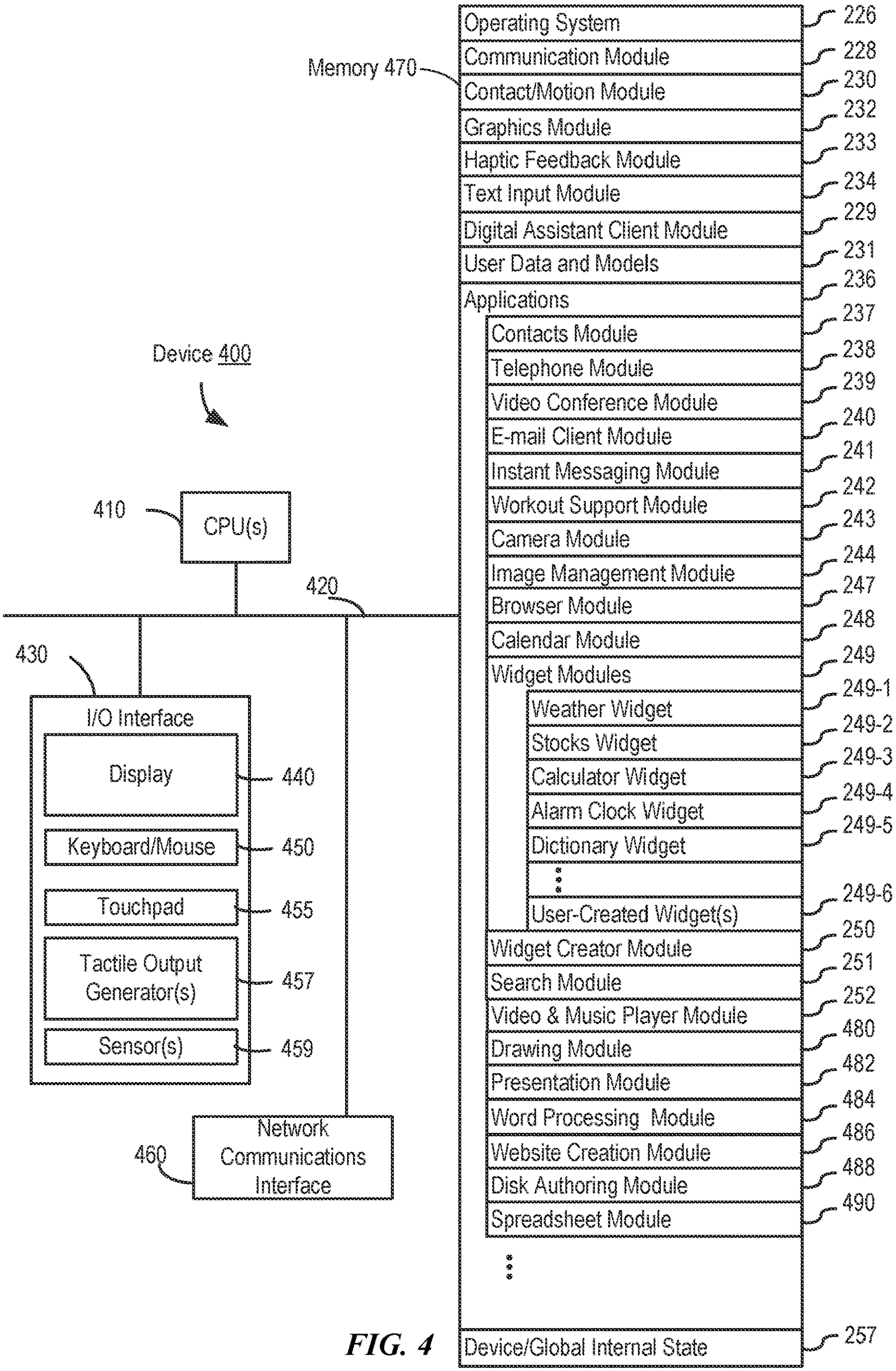
FIG. 4 is a block diagram of an exemplary multifunction device with a display and a touch-sensitive surface, according to various examples.

In some embodiments, the software components stored in memory 202 include operating system 226, communication module (or set of instructions) 228, contact/motion module (or set of instructions) 230, graphics module (or set of instructions) 232, text input module (or set of instructions) 234, Global Positioning System (GPS) module (or set of instructions) 235, Digital Assistant Client Module 229, and applications (or sets of instructions) 236. Further, memory 202 stores data and models, such as user data and models 231. Furthermore, in some embodiments, memory 202 (FIG. 2A) or 470 (FIG. 4) stores device/global internal state 257, as shown in FIGS. 2A and 4. Device/global internal state 257 includes one or more of: active application state, indicating which applications, if any, are currently active; display state, indicating what applications, views or other information occupy various regions of touch screen display 212; sensor state, including information obtained from the device's various sensors and input control devices 216; and location information concerning the device's location and/or attitude.

Operating system 226 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 228 facilitates communication with other devices over one or more external ports 224 and also includes various software components for handling data received by RF circuitry 208 and/or external port 224. External port 224 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 230 optionally detects contact with touch screen 212 (in conjunction with display controller 256) and other touch-sensitive devices (e.g., a touchpad or physical click wheel). Contact/motion module 230 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 230 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 230 and display controller 256 detect contact on a touchpad.

In some embodiments, contact/motion module 230 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 200). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 230 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 232 includes various known software components for rendering and displaying graphics on touch screen 212 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 232 stores data representing graphics to be used. Each graphic is, optionally, assigned a corresponding code. Graphics module 232 receives, from applications etc., one or more codes specifying graphics to be displayed along with, if necessary, coordinate data and other graphic property data, and then generates screen image data to output to display controller 256.

Haptic feedback module 233 includes various software components for generating instructions used by tactile output generator(s) 267 to produce tactile outputs at one or more locations on device 200 in response to user interactions with device 200.

Text input module 234, which is, in some examples, a component of graphics module 232, provides soft keyboards for entering text in various applications (e.g., contacts module 237, e-mail client module 240, IM module 241, browser module 247, and any other application that needs text input).

GPS module 235 determines the location of the device and provides this information for use in various applications (e.g., to telephone module 238 for use in location-based dialing; to camera module 243 as picture/video metadata; and to applications that provide location-based services such as weather widgets, local yellow page widgets, and map/navigation widgets).

Digital assistant client module 229 includes various client-side digital assistant instructions to provide the client-side functionalities of the digital assistant. For example, digital assistant client module 229 is capable of accepting voice input (e.g., speech input), text input, touch input, and/or gestural input through various user interfaces (e.g., microphone 213, accelerometer(s) 268, touch-sensitive display system 212, optical sensor(s) 264, other input control devices 216, etc.) of portable multifunction device 200. Digital assistant client module 229 is also capable of providing output in audio (e.g., speech output), visual, and/or tactile forms through various output interfaces (e.g., speaker 211, touch-sensitive display system 212, tactile output generator(s) 267, etc.) of portable multifunction device 200. For example, output is provided as voice, sound, alerts, text messages, menus, graphics, videos, animations, vibrations, and/or combinations of two or more of the above. During operation, digital assistant client module 229 communicates with DA server 106 using RF circuitry 208.

User data and models 231 include various data associated with the user (e.g., user-specific vocabulary data, user preference data, user-specified name pronunciations, data from the user's electronic address book, to-do lists, shopping lists, etc.) to provide the client-side functionalities of the digital assistant. Further, user data and models 231 include various models (e.g., speech recognition models, statistical language models, natural language processing models, ontology, task flow models, service models, etc.) for processing user input and determining user intent.

In some examples, digital assistant client module 229 utilizes the various sensors, subsystems, and peripheral devices of portable multifunction device 200 to gather additional information from the surrounding environment of the portable multifunction device 200 to establish a context associated with a user, the current user interaction, and/or the current user input. In some examples, digital assistant client module 229 provides the contextual information or a subset thereof with the user input to DA server 106 to help infer the user's intent. In some examples, the digital assistant also uses the contextual information to determine how to prepare and deliver outputs to the user. Contextual information is referred to as context data.

In some examples, the contextual information that accompanies the user input includes sensor information, e.g., lighting, ambient noise, ambient temperature, images or videos of the surrounding environment, etc. In some examples, the contextual information can also include the physical state of the device, e.g., device orientation, device location, device temperature, power level, speed, acceleration, motion patterns, cellular signals strength, etc. In some examples, information related to the software state of DA server 106, e.g., running processes, installed programs, past and present network activities, background services, error logs, resources usage, etc., and of portable multifunction device 200 is provided to DA server 106 as contextual information associated with a user input.

In some examples, the digital assistant client module 229 selectively provides information (e.g., user data 231) stored on the portable multifunction device 200 in response to requests from DA server 106. In some examples, digital assistant client module 229 also elicits additional input from the user via a natural language dialogue or other user interfaces upon request by DA server 106. Digital assistant client module 229 passes the additional input to DA server

106 to help DA server 106 in intent deduction and/or fulfillment of the user's intent expressed in the user request.

A more detailed description of a digital assistant is described below with reference to FIGS. 7A-7C. It should be recognized that digital assistant client module 229 can include any number of the sub-modules of digital assistant module 726 described below.

Applications 236 include the following modules (or sets of instructions), or a subset or superset thereof:

- Contacts module 237 (sometimes called an address book or contact list);
- Telephone module 238;
- Video conference module 239;
- E-mail client module 240;
- Instant messaging (IM) module 241;
- Workout support module 242;
- Camera module 243 for still and/or video images;
- Image management module 244;
- Video player module;
- Music player module;
- Browser module 247;
- Calendar module 248;
- Widget modules 249, which includes, in some examples, one or more of: weather widget 249-1, stocks widget 249-2, calculator widget 249-3, alarm clock widget 249-4, dictionary widget 249-5, and other widgets obtained by the user, as well as user-created widgets 249-6;
- Widget creator module 250 for making user-created widgets 249-6;
- Search module 251;
- Video and music player module 252, which merges video player module and music player module;
- Notes module 253;
- Map module 254; and/or
- Online video module 255.

Examples of other applications 236 that are stored in memory 202 include other word processing applications, other image editing applications, drawing applications, presentation applications, JAVA-enabled applications, encryption, digital rights management, voice recognition, and voice replication.

In conjunction with touch screen 212, display controller 256, contact/motion module 230, graphics module 232, and text input module 234, contacts module 237 are used to manage an address book or contact list (e.g., stored in application internal state 292 of contacts module 237 in memory 202 or memory 470), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 238, video conference module 239, e-mail client module 240, or IM module 241; and so forth.

In conjunction with RF circuitry 208, audio circuitry 210, speaker 211, microphone 213, touch screen 212, display controller 256, contact/motion module 230, graphics module 232, and text input module 234, telephone module 238 are used to enter a sequence of characters corresponding to a telephone number, access one or more telephone numbers in contacts module 237, modify a telephone number that has been entered, dial a respective telephone number, conduct a conversation, and disconnect or hang up when the conversation is completed. As noted above, the wireless communication uses any of a plurality of communications standards, protocols, and technologies.

In conjunction with RF circuitry 208, audio circuitry 210, speaker 211, microphone 213, touch screen 212, display controller 256, optical sensor 264, optical sensor controller 258, contact/motion module 230, graphics module 232, text input module 234, contacts module 237, and telephone module 238, video conference module 239 includes executable instructions to initiate, conduct, and terminate a video conference between a user and one or more other participants in accordance with user instructions.

In conjunction with RF circuitry 208, touch screen 212, display controller 256, contact/motion module 230, graphics module 232, and text input module 234, e-mail client module 240 includes executable instructions to create, send, receive, and manage e-mail in response to user instructions. In conjunction with image management module 244, e-mail client module 240 makes it very easy to create and send e-mails with still or video images taken with camera module 243.

In conjunction with RF circuitry 208, touch screen 212, display controller 256, contact/motion module 230, graphics module 232, and text input module 234, the instant messaging module 241 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 208, touch screen 212, display controller 256, contact/motion module 230, graphics module 232, text input module 234, GPS module 235, map module 254, and music player module, workout support module 242 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 212, display controller 256, optical sensor(s) 264, optical sensor controller 258, contact/motion module 230, graphics module 232, and image management module 244, camera module 243 includes executable instructions to capture still images or video (including a video stream) and store them into memory 202, modify characteristics of a still image or video, or delete a still image or video from memory 202.

In conjunction with touch screen 212, display controller 256, contact/motion module 230, graphics module 232, text input module 234, and camera module 243, image management module 244 includes executable instructions to arrange, modify (e.g., edit), or otherwise manipulate, label, delete, present (e.g., in a digital slide show or album), and store still and/or video images.

In conjunction with RF circuitry 208, touch screen 212, display controller 256, contact/motion module 230, graphics module 232, and text input module 234, browser module 247 includes executable instructions to browse the Internet in accordance with user instructions, including searching, linking to, receiving, and displaying web pages or portions thereof, as well as attachments and other files linked to web pages.

In conjunction with RF circuitry 208, touch screen 212, display controller 256, contact/motion module 230, graphics module 232, text input module 234, e-mail client module 240, and browser module 247, calendar module 248 includes executable instructions to create, display, modify, and store calendars and data associated with calendars (e.g., calendar entries, to-do lists, etc.) in accordance with user instructions.

In conjunction with RF circuitry 208, touch screen 212, display controller 256, contact/motion module 230, graphics module 232, text input module 234, and browser module 247, widget modules 249 are mini-applications that can be downloaded and used by a user (e.g., weather widget 249-1, stocks widget 249-2, calculator widget 249-3, alarm clock widget 249-4, and dictionary widget 249-5) or created by the user (e.g., user-created widget 249-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 208, touch screen 212, display controller 256, contact/motion module 230, graphics module 232, text input module 234, and browser module 247, the widget creator module 250 are used by a user to create widgets (e.g., turning a user-specified portion of a web page into a widget).

In conjunction with touch screen 212, display controller 256, contact/motion module 230, graphics module 232, and text input module 234, search module 251 includes executable instructions to search for text, music, sound, image, video, and/or other files in memory 202 that match one or more search criteria (e.g., one or more user-specified search terms) in accordance with user instructions.

In conjunction with touch screen 212, display controller 256, contact/motion module 230, graphics module 232, audio circuitry 210, speaker 211, RF circuitry 208, and browser module 247, video and music player module 252 includes executable instructions that allow the user to download and play back recorded music and other sound files stored in one or more file formats, such as MP3 or AAC files, and executable instructions to display, present, or otherwise play back videos (e.g., on touch screen 212 or on an external, connected display via external port 224). In some embodiments, device 200 optionally includes the functionality of an MP3 player, such as an iPod (trademark of Apple Inc.).

In conjunction with touch screen 212, display controller 256, contact/motion module 230, graphics module 232, and text input module 234, notes module 253 includes executable instructions to create and manage notes, to-do lists, and the like in accordance with user instructions.

In conjunction with RF circuitry 208, touch screen 212, display controller 256, contact/motion module 230, graphics module 232, text input module 234, GPS module 235, and browser module 247, map module 254 are used to receive, display, modify, and store maps and data associated with maps (e.g., driving directions, data on stores and other points of interest at or near a particular location, and other location-based data) in accordance with user instructions.

In conjunction with touch screen 212, display controller 256, contact/motion module 230, graphics module 232, audio circuitry 210, speaker 211, RF circuitry 208, text input module 234, e-mail client module 240, and browser module 247, online video module 255 includes instructions that allow the user to access, browse, receive (e.g., by streaming and/or download), play back (e.g., on the touch screen or on an external, connected display via external port 224), send an e-mail with a link to a particular online video, and otherwise manage online videos in one or more file formats, such as H.264. In some embodiments, instant messaging module 241, rather than e-mail client module 240, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules can be combined or otherwise rearranged in various embodiments. For example, video player module can be combined with music player module into a single module (e.g., video and music player module 252, FIG. 2A). In some embodiments, memory 202 stores a subset of the modules and data structures identified above. Furthermore, memory 202 stores additional modules and data structures not described above.

In some embodiments, device 200 is a device where operation of a predefined set of functions on the device is performed exclusively through a touch screen and/or a touchpad. By using a touch screen and/or a touchpad as the primary input control device for operation of device 200, the number of physical input control devices (such as push buttons, dials, and the like) on device 200 is reduced.

The predefined set of functions that are performed exclusively through a touch screen and/or a touchpad optionally include navigation between user interfaces. In some embodiments, the touchpad, when touched by the user, navigates device 200 to a main, home, or root menu from any user interface that is displayed on device 200. In such embodiments, a "menu button" is implemented using a touchpad. In some other embodiments, the menu button is a physical push button or other physical input control device instead of a touchpad.

Figure 2B:
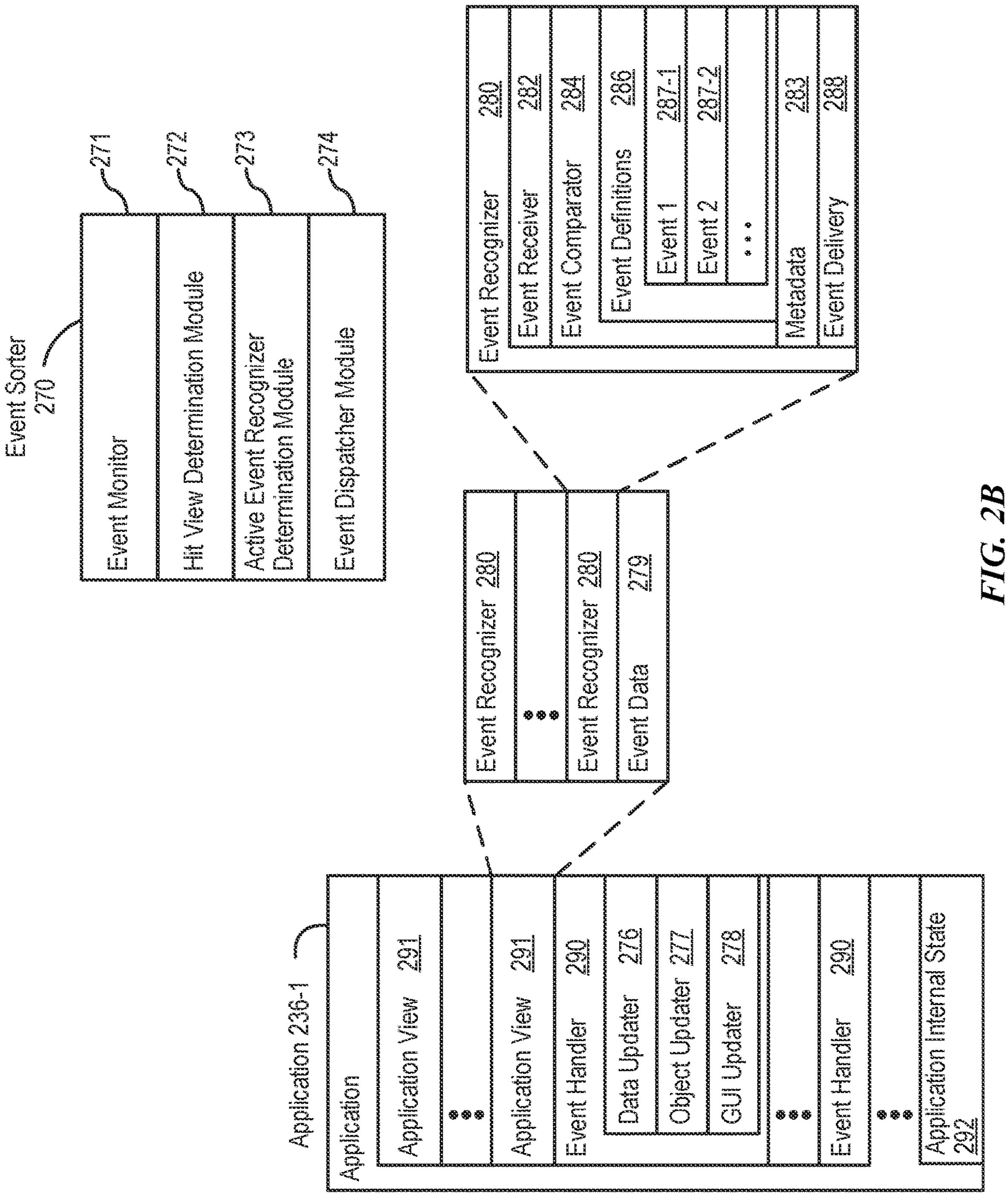
FIG. 2B is a block diagram illustrating exemplary components for event handling, according to various examples.

FIG. 2B is a block diagram illustrating exemplary components for event handling in accordance with some embodiments. In some embodiments, memory 202 (FIG. 2A) or 470 (FIG. 4) includes event sorter 270 (e.g., in operating system 226) and a respective application 236-1 (e.g., any of the aforementioned applications 237-251, 255, 480-490).

Event sorter 270 receives event information and determines the application 236-1 and application view 291 of application 236-1 to which to deliver the event information. Event sorter 270 includes event monitor 271 and event dispatcher module 274. In some embodiments, application 236-1 includes application internal state 292, which indicates the current application view(s) displayed on touch-sensitive display 212 when the application is active or executing. In some embodiments, device/global internal state 257 is used by event sorter 270 to determine which application(s) is (are) currently active, and application internal state 292 is used by event sorter 270 to determine application views 291 to which to deliver event information.

In some embodiments, application internal state 292 includes additional information, such as one or more of: resume information to be used when application 236-1 resumes execution, user interface state information that indicates information being displayed or that is ready for display by application 236-1, a state queue for enabling the user to go back to a prior state or view of application 236-1, and a redo/undo queue of previous actions taken by the user.

Event monitor 271 receives event information from peripherals interface 218. Event information includes information about a sub-event (e.g., a user touch on touch-sensitive display 212, as part of a multi-touch gesture). Peripherals interface 218 transmits information it receives from I/O subsystem 206 or a sensor, such as proximity sensor 266, accelerometer(s) 268, and/or microphone 213 (through audio circuitry 210). Information that peripherals interface 218 receives from I/O subsystem 206 includes information from touch-sensitive display 212 or a touch-sensitive surface.

In some embodiments, event monitor 271 sends requests to the peripherals interface 218 at predetermined intervals. In response, peripherals interface 218 transmits event information. In other embodiments, peripherals interface 218 transmits event information only when there is a significant event (e.g., receiving an input above a predetermined noise threshold and/or for more than a predetermined duration).

In some embodiments, event sorter 270 also includes a hit view determination module 272 and/or an active event recognizer determination module 273.

Hit view determination module 272 provides software procedures for determining where a sub-event has taken place within one or more views when touch-sensitive display 212 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected correspond to programmatic levels within a programmatic or view hierarchy of the application. For example, the lowest level view in which a touch is detected is called the hit view, and the set of events that are recognized as proper inputs is determined based, at least in part, on the hit view of the initial touch that begins a touch-based gesture.

Hit view determination module 272 receives information related to sub events of a touch-based gesture. When an application has multiple views organized in a hierarchy, hit view determination module 272 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 272, the hit view typically receives all sub-events related to the same touch or input source for which it was identified as the hit view.

Active event recognizer determination module 273 determines which view or views within a view hierarchy should receive a particular sequence of sub-events. In some embodiments, active event recognizer determination module 273 determines that only the hit view should receive a particular sequence of sub-events. In other embodiments, active event recognizer determination module 273 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 274 dispatches the event information to an event recognizer (e.g., event recognizer 280). In embodiments including active event recognizer determination module 273, event dispatcher module 274 delivers the event information to an event recognizer determined by active event recognizer determination module 273. In some embodiments, event dispatcher module 274 stores in an event queue the event information, which is retrieved by a respective event receiver 282.

In some embodiments, operating system 226 includes event sorter 270. Alternatively, application 236-1 includes event sorter 270. In yet other embodiments, event sorter 270 is a stand-alone module, or a part of another module stored in memory 202, such as contact/motion module 230.

In some embodiments, application 236-1 includes a plurality of event handlers 290 and one or more application views 291, each of which includes instructions for handling touch events that occur within a respective view of the application's user interface. Each application view 291 of the application 236-1 includes one or more event recognizers 280. Typically, a respective application view 291 includes a plurality of event recognizers 280. In other embodiments, one or more of event recognizers 280 are part of a separate module, such as a user interface kit (not shown) or a higher level object from which application 236-1 inherits methods and other properties. In some embodiments, a respective event handler 290 includes one or more of: data updater 276, object updater 277, GUI updater 278, and/or event data 279 received from event sorter 270. Event handler 290 utilizes or calls data updater 276, object updater 277, or GUI updater 278 to update the application internal state 292. Alternatively, one or more of the application views 291 include one or more respective event handlers 290. Also, in some embodiments, one or more of data updater 276, object updater 277, and GUI updater 278 are included in a respective application view 291.

A respective event recognizer 280 receives event information (e.g., event data 279) from event sorter 270 and identifies an event from the event information. Event recognizer 280 includes event receiver 282 and event comparator 284. In some embodiments, event recognizer 280 also includes at least a subset of: metadata 283, and event delivery instructions 288 (which include sub-event delivery instructions).

Event receiver 282 receives event information from event sorter 270. The event information includes information about a sub-event, for example, a touch or a touch movement. Depending on the sub-event, the event information also includes additional information, such as location of the sub-event. When the sub-event concerns motion of a touch, the event information also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 284 compares the event information to predefined event or sub-event definitions and, based on the comparison, determines an event or sub event, or determines or updates the state of an event or sub-event. In some embodiments, event comparator 284 includes event definitions 286. Event definitions 286 contain definitions of events (e.g., predefined sequences of sub-events), for example, event 1 (287-1), event 2 (287-2), and others. In some embodiments, sub-events in an event (287) include, for example, touch begin, touch end, touch movement, touch cancellation, and multiple touching. In one example, the definition for event 1 (287-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (287-2) is a dragging on a displayed object. The dragging, for example, comprises a touch (or contact) on the displayed object for a predetermined phase, a movement of the touch across touch-sensitive display 212, and liftoff of the touch (touch end). In some embodiments, the event also includes information for one or more associated event handlers 290.

In some embodiments, event definition 287 includes a definition of an event for a respective user-interface object. In some embodiments, event comparator 284 performs a hit test to determine which user-interface object is associated with a sub-event. For example, in an application view in which three user-interface objects are displayed on touch-sensitive display 212, when a touch is detected on touch-sensitive display 212, event comparator 284 performs a hit test to determine which of the three user-interface objects is associated with the touch (sub-event). If each displayed object is associated with a respective event handler 290, the event comparator uses the result of the hit test to determine which event handler 290 should be activated. For example, event comparator 284 selects an event handler associated with the sub-event and the object triggering the hit test.

In some embodiments, the definition for a respective event (287) also includes delayed actions that delay delivery of the event information until after it has been determined whether the sequence of sub-events does or does not correspond to the event recognizer's event type.

When a respective event recognizer 280 determines that the series of sub-events do not match any of the events in event definitions 286, the respective event recognizer 280 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 280 includes metadata 283 with configurable properties, flags, and/or lists that indicate how the event delivery system should perform sub-event delivery to actively involved event recognizers. In some embodiments, metadata 283 includes configurable properties, flags, and/or lists that indicate how event recognizers interact, or are enabled to interact, with one another. In some embodiments, metadata 283 includes configurable properties, flags, and/or lists that indicate whether sub-events are delivered to varying levels in the view or programmatic hierarchy.

In some embodiments, a respective event recognizer 280 activates event handler 290 associated with an event when one or more particular sub-events of an event are recognized. In some embodiments, a respective event recognizer 280 delivers event information associated with the event to event handler 290. Activating an event handler 290 is distinct from sending (and deferred sending) sub-events to a respective hit view. In some embodiments, event recognizer 280 throws a flag associated with the recognized event, and event handler 290 associated with the flag catches the flag and performs a predefined process.

In some embodiments, event delivery instructions 288 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 276 creates and updates data used in application 236-1. For example, data updater 276 updates the telephone number used in contacts module 237, or stores a video file used in video player module. In some embodiments, object updater 277 creates and updates objects used in application 236-1. For example, object updater 277 creates a new user-interface object or updates the position of a user-interface object. GUI updater 278 updates the GUI. For example, GUI updater 278 prepares display information and sends it to graphics module 232 for display on a touch-sensitive display.

In some embodiments, event handler(s) 290 includes or has access to data updater 276, object updater 277, and GUI updater 278. In some embodiments, data updater 276, object updater 277, and GUI updater 278 are included in a single module of a respective application 236-1 or application view 291. In other embodiments, they are included in two or more software modules.

It shall be understood that the foregoing discussion regarding event handling of user touches on touch-sensitive displays also applies to other forms of user inputs to operate multifunction devices 200 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 3:
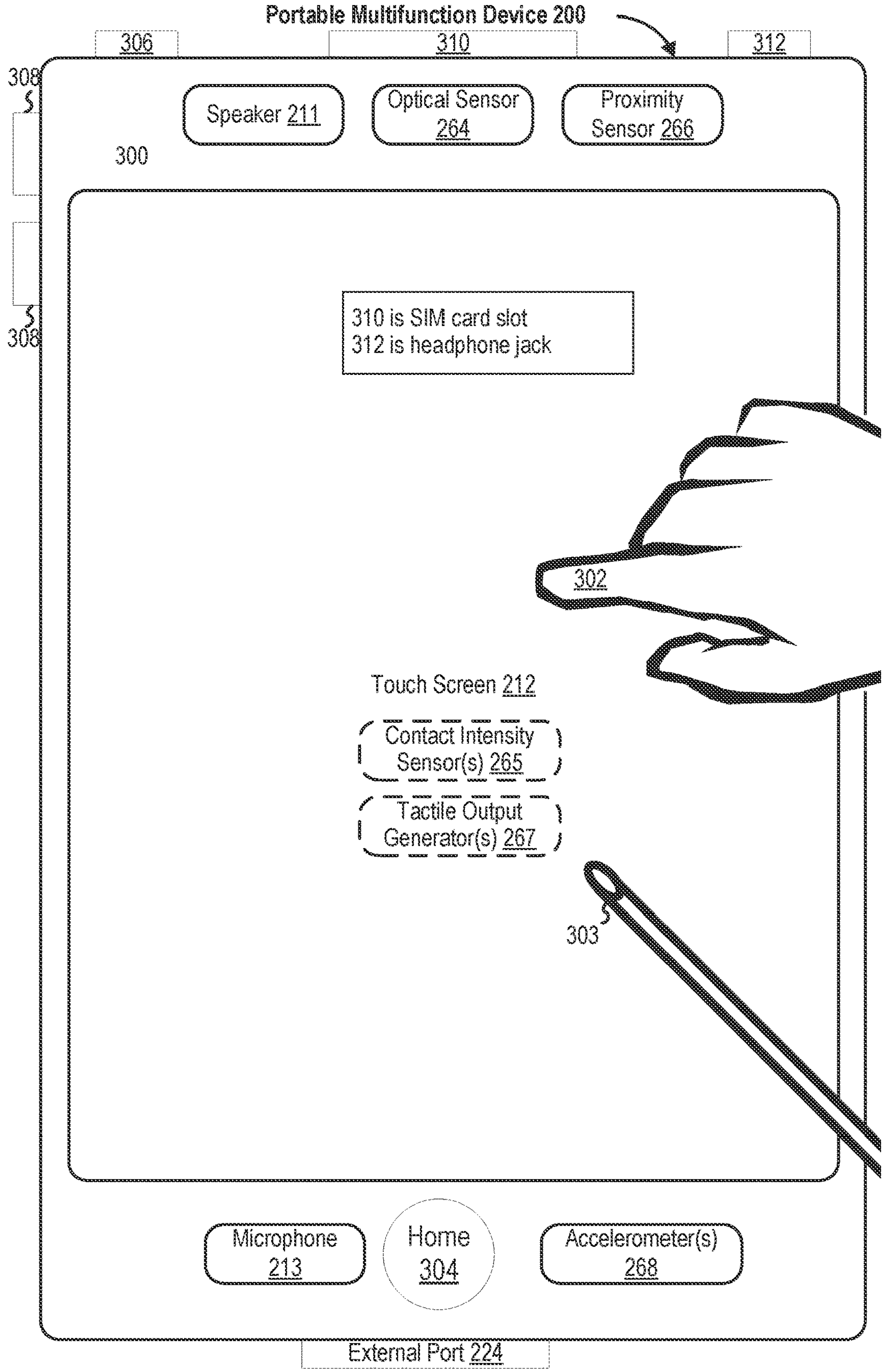
FIG. 3 illustrates a portable multifunction device implementing the client-side portion of a digital assistant, according to various examples.

FIG. 3 illustrates a portable multifunction device 200 having a touch screen 212 in accordance with some embodiments. The touch screen optionally displays one or more graphics within user interface (UI) 300. In this embodiment, as well as others described below, a user is enabled to select one or more of the graphics by making a gesture on the graphics, for example, with one or more fingers 302 (not drawn to scale in the figure) or one or more styluses 303 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 200. In some implementations or circumstances, inadvertent contact with a graphic does not select the graphic. For example, a swipe gesture that sweeps over an application icon optionally does not select the corresponding application when the gesture corresponding to selection is a tap.

Device 200 also includes one or more physical buttons, such as "home" or menu button 304. As described previously, menu button 304 is used to navigate to any application 236 in a set of applications that is executed on device 200. Alternatively, in some embodiments, the menu button is implemented as a soft key in a GUI displayed on touch screen 212.

In one embodiment, device 200 includes touch screen 212, menu button 304, push button 306 for powering the device on/off and locking the device, volume adjustment button(s) 308, subscriber identity module (SIM) card slot 310, headset jack 312, and docking/charging external port 224. Push button 306 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 200 also accepts verbal input for activation or deactivation of some functions through microphone 213. Device 200 also, optionally, includes one or more contact intensity sensors 265 for detecting intensity of contacts on touch screen 212 and/or one or more tactile output generators 267 for generating tactile outputs for a user of device 200.

FIG. 4 is a block diagram of an exemplary multifunction device with a display and a touch-sensitive surface in accordance with some embodiments. Device 400 need not be portable. In some embodiments, device 400 is a laptop computer, a desktop computer, a tablet computer, a multimedia player device, a navigation device, an educational device (such as a child's learning toy), a gaming system, or a control device (e.g., a home or industrial controller). Device 400 typically includes one or more processing units (CPUs) 410, one or more network or other communications interfaces 460, memory 470, and one or more communication buses 420 for interconnecting these components. Communication buses 420 optionally include circuitry (sometimes called a chipset) that interconnects and controls communications between system components. Device 400 includes input/output (I/O) interface 430 comprising display 440, which is typically a touch screen display. I/O interface 430 also optionally includes a keyboard and/or mouse (or other pointing device) 450 and touchpad 455, tactile output generator 457 for generating tactile outputs on device 400 (e.g., similar to tactile output generator(s) 267 described above with reference to FIG. 2A), sensors 459 (e.g., optical, acceleration, proximity, touch-sensitive, and/or contact intensity sensors similar to contact intensity sensor(s) 265 described above with reference to FIG. 2A). Memory 470 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 470 optionally includes one or more storage devices remotely located from CPU(s) 410. In some embodiments, memory 470 stores programs, modules, and data structures analogous to the programs, modules, and data structures stored in memory 202 of portable multifunction device 200 (FIG. 2A), or a subset thereof. Furthermore, memory 470 optionally stores additional programs, modules, and data structures not present in memory 202 of portable multifunction device 200. For example, memory 470 of device 400 optionally stores drawing module 480, presentation module 482, word processing module 484, website creation module 486, disk authoring module 488, and/or spreadsheet module 490, while memory 202 of portable multifunction device 200 (FIG. 2A) optionally does not store these modules.

Each of the above-identified elements in FIG. 4 is, in some examples, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are combined or otherwise rearranged in various embodiments. In some embodiments, memory 470 stores a subset of the modules and data structures identified above. Furthermore, memory 470 stores additional modules and data structures not described above.

Attention is now directed towards embodiments of user interfaces that can be implemented on, for example, portable multifunction device 200.

Figure 5A:
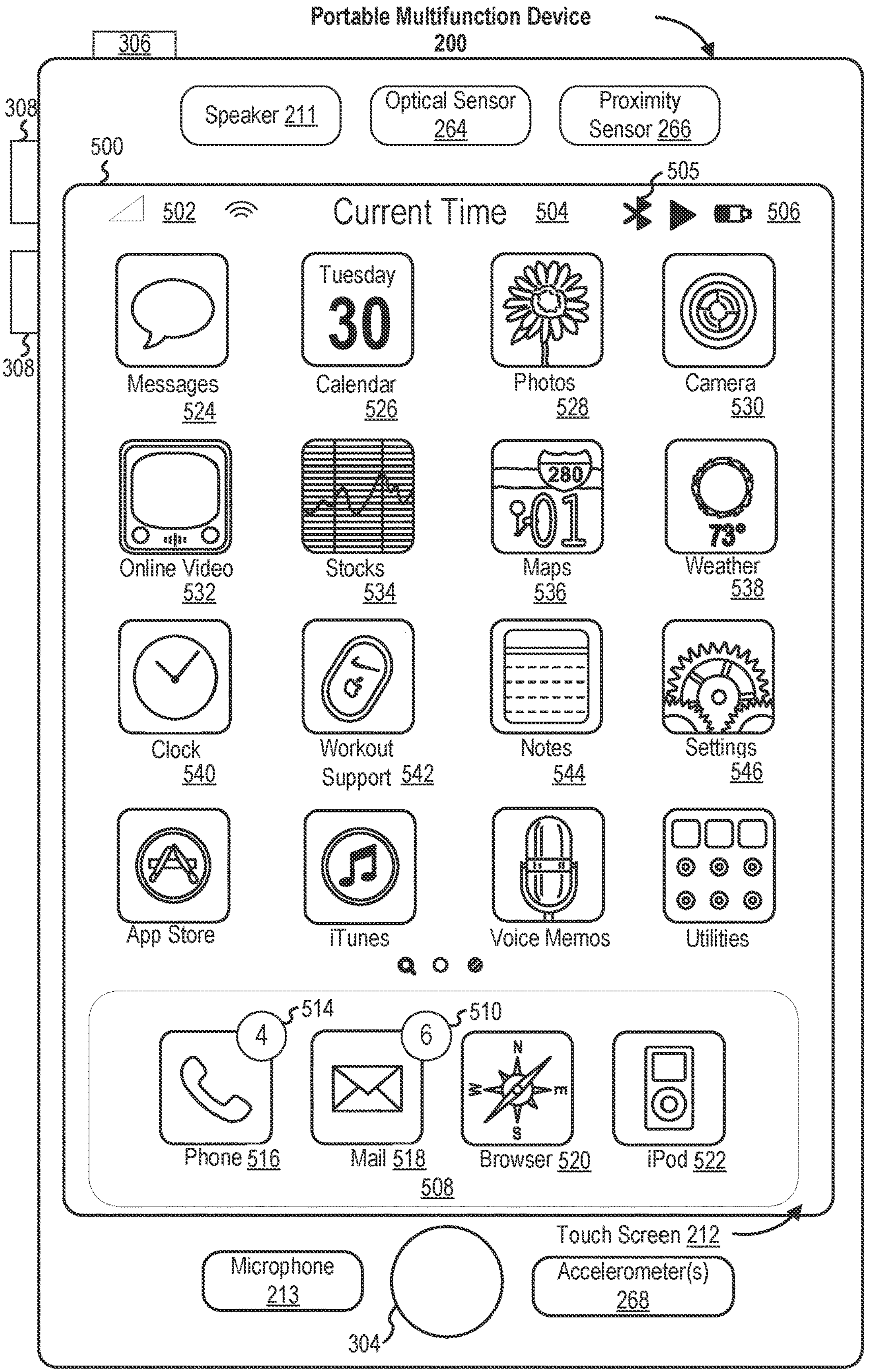
FIG. 5A illustrates an exemplary user interface for a menu of applications on a portable multifunction device, according to various examples.

FIG. 5A illustrates an exemplary user interface for a menu of applications on portable multifunction device 200 in accordance with some embodiments. Similar user interfaces are implemented on device 400. In some embodiments, user interface 500 includes the following elements, or a subset or superset thereof:

- Signal strength indicator(s) 502 for wireless communication(s), such as cellular and Wi-Fi signals;
- Time 504;
- Bluetooth indicator 505;
- Battery status indicator 506;
- Tray 508 with icons for frequently used applications, such as:
  - Icon 516 for telephone module 238, labeled "Phone," which optionally includes an indicator 514 of the number of missed calls or voicemail messages;
  - Icon 518 for e-mail client module 240, labeled "Mail," which optionally includes an indicator 510 of the number of unread e-mails;
  - Icon 520 for browser module 247, labeled "Browser;" and
  - Icon 522 for video and music player module 252, also referred to as iPod (trademark of Apple Inc.) module 252, labeled "iPod;" and
- Icons for other applications, such as:
  - Icon 524 for IM module 241, labeled "Messages;"
  - Icon 526 for calendar module 248, labeled "Calendar;"
  - Icon 528 for image management module 244, labeled "Photos;"
  - Icon 530 for camera module 243, labeled "Camera;"
  - Icon 532 for online video module 255, labeled "Online Video;"
  - Icon 534 for stocks widget 249-2, labeled "Stocks;"
  - Icon 536 for map module 254, labeled "Maps;"
  - Icon 538 for weather widget 249-1, labeled "Weather;"
  - Icon 540 for alarm clock widget 249-4, labeled "Clock;"
  - Icon 542 for workout support module 242, labeled "Workout Support;"
  - Icon 544 for notes module 253, labeled "Notes;" and
  - Icon 546 for a settings application or module, labeled "Settings," which provides access to settings for device 200 and its various applications 236.

It should be noted that the icon labels illustrated in FIG. 5A are merely exemplary. For example, icon 522 for video and music player module 252 is optionally labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 5B:
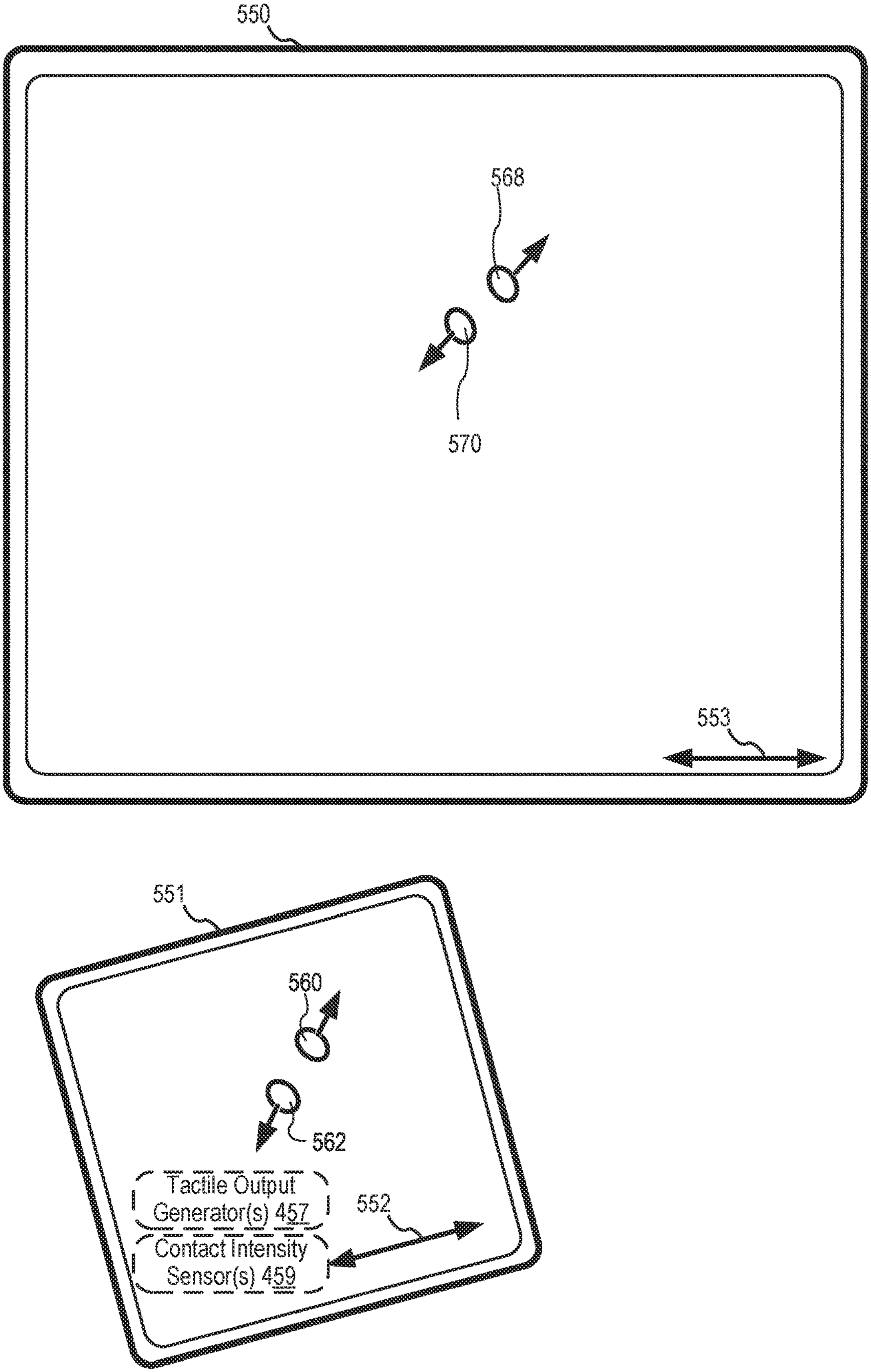
FIG. 5B illustrates an exemplary user interface for a multifunction device with a touch-sensitive surface that is separate from the display, according to various examples.

FIG. 5B illustrates an exemplary user interface on a device (e.g., device 400, FIG. 4) with a touch-sensitive surface 551 (e.g., a tablet or touchpad 455, FIG. 4) that is separate from the display 550 (e.g., touch screen display 212). Device 400 also, optionally, includes one or more contact intensity sensors (e.g., one or more of sensors 459) for detecting intensity of contacts on touch-sensitive surface 551 and/or one or more tactile output generators 457 for generating tactile outputs for a user of device 400.

Although some of the examples which follow will be given with reference to inputs on touch screen display 212 (where the touch-sensitive surface and the display are combined), in some embodiments, the device detects inputs on a touch-sensitive surface that is separate from the display, as shown in FIG. 5B. In some embodiments, the touch-sensitive surface (e.g., 551 in FIG. 5B) has a primary axis (e.g., 552 in FIG. 5B) that corresponds to a primary axis (e.g., 553 in FIG. 5B) on the display (e.g., 550). In accordance with these embodiments, the device detects contacts (e.g., 560 and 562 in FIG. 5B) with the touch-sensitive surface 551 at locations that correspond to respective locations on the display (e.g., in FIG. 5B, 560 corresponds to 568 and 562 corresponds to 570). In this way, user inputs (e.g., contacts 560 and 562, and movements thereof) detected by the device on the touch-sensitive surface (e.g., 551 in FIG. 5B) are used by the device to manipulate the user interface on the display (e.g., 550 in FIG. 5B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 6A:
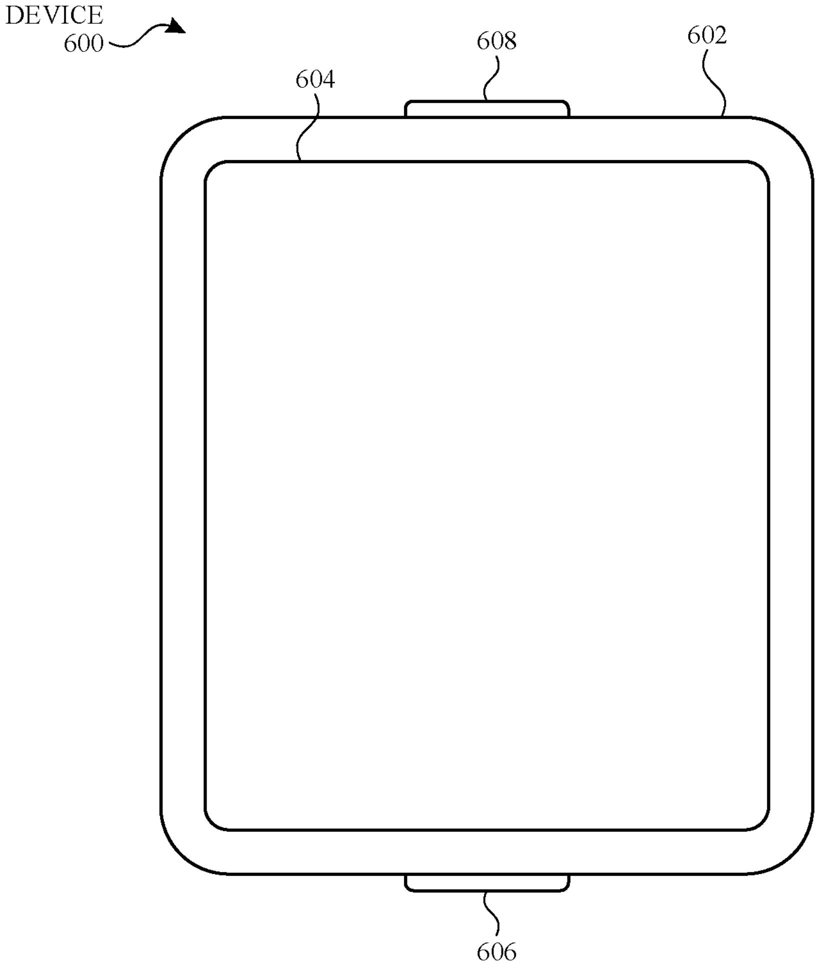
FIG. 6A illustrates a personal electronic device, according to various examples.

FIG. 6A illustrates exemplary personal electronic device 600. Device 600 includes body 602. In some embodiments, device 600 includes some or all of the features described with respect to devices 200 and 400 (e.g., FIGS. 2A-4). In some embodiments, device 600 has touch-sensitive display screen 604, hereafter touch screen 604. Alternatively, or in addition to touch screen 604, device 600 has a display and a touch-sensitive surface. As with devices 200 and 400, in some embodiments, touch screen 604 (or the touch-sensitive surface) has one or more intensity sensors for detecting intensity of contacts (e.g., touches) being applied. The one or more intensity sensors of touch screen 604 (or the touch-sensitive surface) provide output data that represents the intensity of touches. The user interface of device 600 responds to touches based on their intensity, meaning that touches of different intensities can invoke different user interface operations on device 600.

Techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 600 has one or more input mechanisms 606 and 608. Input mechanisms 606 and 608, if included, are physical. Examples of physical input mechanisms include push buttons and rotatable mechanisms. In some embodiments, device 600 has one or more attachment mechanisms. Such attachment mechanisms, if included, can permit attachment of device 600 with, for example, hats, eyewear, earrings, necklaces, shirts, jackets, bracelets, watch straps, chains, trousers, belts, shoes, purses, backpacks, and so forth. These attachment mechanisms permit device 600 to be worn by a user.

Figure 6B:
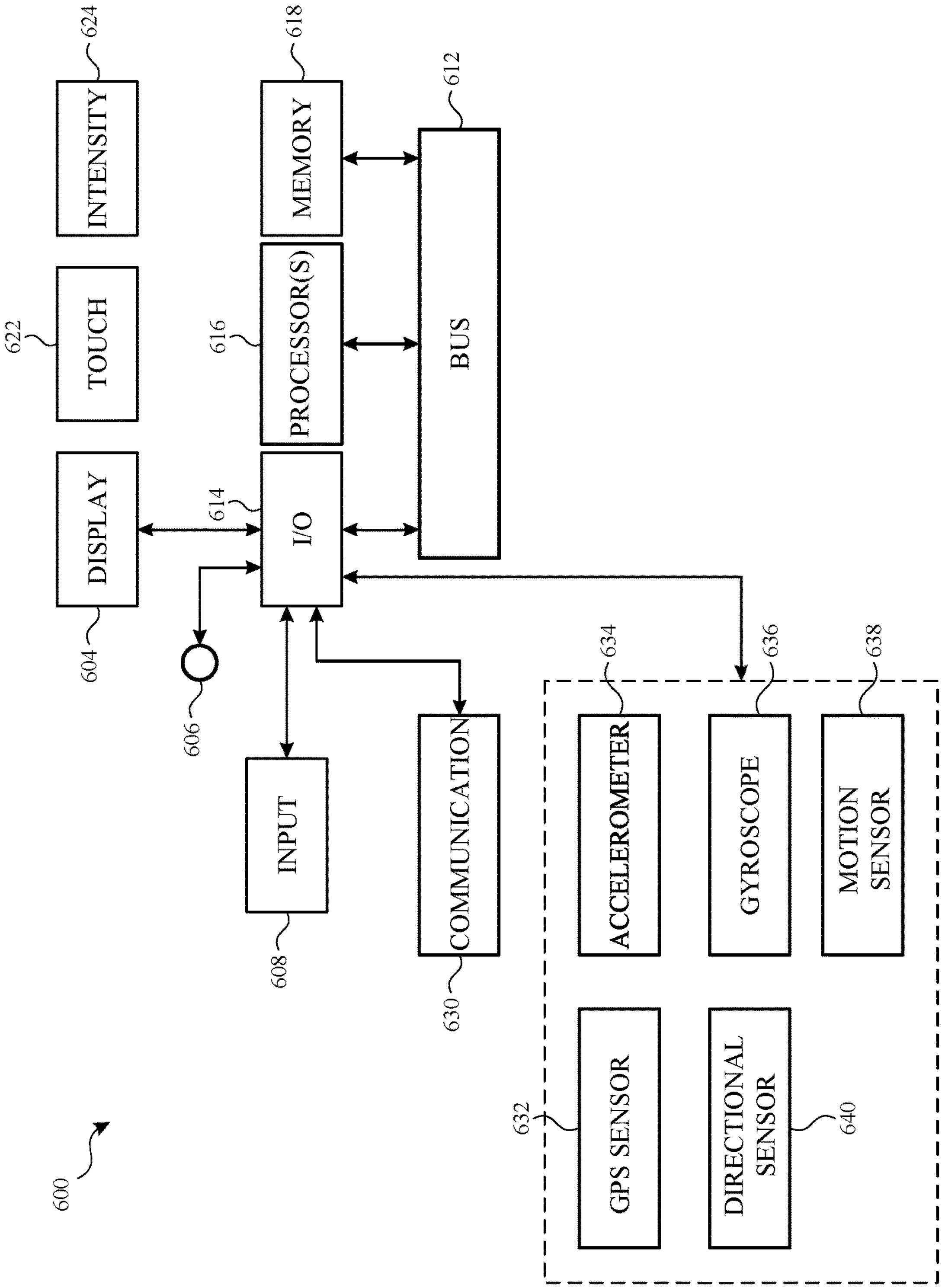
FIG. 6B is a block diagram illustrating a personal electronic device, according to various examples.

FIG. 6B depicts exemplary personal electronic device 600. In some embodiments, device 600 includes some or all of the components described with respect to FIGS. 2A, 2B, and 4. Device 600 has bus 612 that operatively couples I/O section 614 with one or more computer processors 616 and memory 618. I/O section 614 is connected to display 604, which can have touch-sensitive component 622 and, optionally, touch-intensity sensitive component 624. In addition, I/O section 614 is connected with communication unit 630 for receiving application and operating system data, using Wi-Fi, Bluetooth, near field communication (NFC), cellular, and/or other wireless communication techniques. Device 600 includes input mechanisms 606 and/or 608. Input mechanism 606 is a rotatable input device or a depressible and rotatable input device, for example. Input mechanism 608 is a button, in some examples.

Input mechanism 608 is a microphone, in some examples. Personal electronic device 600 includes, for example, various sensors, such as GPS sensor 632, accelerometer 634, directional sensor 640 (e.g., compass), gyroscope 636, motion sensor 638, and/or a combination thereof, all of which are operatively connected to I/O section 614.

Memory 618 of personal electronic device 600 is a non-transitory computer-readable storage medium, for storing computer-executable instructions, which, when executed by one or more computer processors 616, for example, cause the computer processors to perform the techniques and processes described below. The computer-executable instructions, for example, are also stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. Personal electronic device 600 is not limited to the components and configuration of FIG. 6B, but can include other or additional components in multiple configurations.

As used here, the term "affordance" refers to a user-interactive graphical user interface object that is, for example, displayed on the display screen of devices 200, 400, and/or 600 (FIGS. 2A, 4, and 6A-6B). For example, an image (e.g., icon), a button, and text (e.g., hyperlink) each constitutes an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 455 in FIG. 4 or touch-sensitive surface 551 in FIG. 5B) while the cursor is over a particular user interface element (e.g., a button, window, slider or other user interface element), the particular user interface element is adjusted in accordance with the detected input. In some implementations that include a touch screen display (e.g., touch-sensitive display system 212 in FIG. 2A or touch screen 212 in FIG. 5A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface receives a continuous swipe contact transitioning from a start location and reaching an end location, at which point the intensity of the contact increases. In this example, the characteristic intensity of the contact at the end location is based on only a portion of the continuous swipe contact, and not the entire swipe contact (e.g., only the portion of the swipe contact at the end location). In some embodiments, a smoothing algorithm is applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

3. Digital Assistant System

Figure 7A:
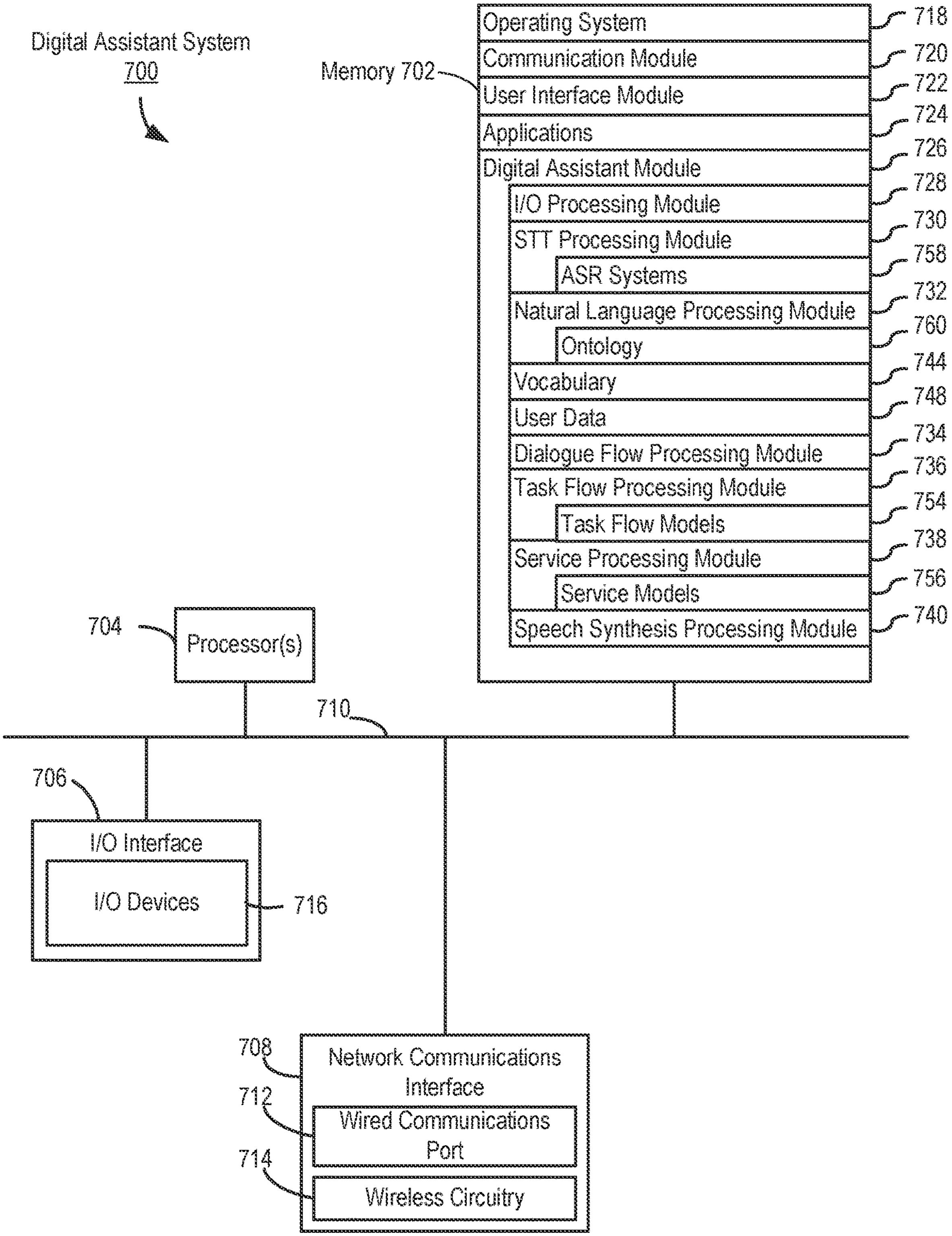
FIG. 7A is a block diagram illustrating a digital assistant system or a server portion thereof, according to various examples.

FIG. 7A illustrates a block diagram of digital assistant system 700 in accordance with various examples. In some examples, digital assistant system 700 is implemented on a standalone computer system. In some examples, digital assistant system 700 is distributed across multiple computers. In some examples, some of the modules and functions of the digital assistant are divided into a server portion and a client portion, where the client portion resides on one or more user devices (e.g., devices 104, 122, 200, 400, 600, or 1002) and communicates with the server portion (e.g., server system 108) through one or more networks, e.g., as shown in FIG. 1. In some examples, digital assistant system 700 is an implementation of server system 108 (and/or DA server 106) shown in FIG. 1. It should be noted that digital assistant system 700 is only one example of a digital assistant system, and that digital assistant system 700 can have more or fewer components than shown, can combine two or more components, or can have a different configuration or arrangement of the components. The various components shown in FIG. 7A are implemented in hardware, software instructions for execution by one or more processors, firmware, including one or more signal processing and/or application specific integrated circuits, or a combination thereof.

Digital assistant system 700 includes memory 702, one or more processors 704, input/output (I/O) interface 706, and network communications interface 708. These components can communicate with one another over one or more communication buses or signal lines 710.

In some examples, memory 702 includes a non-transitory computer-readable medium, such as high-speed random access memory and/or a non-volatile computer-readable storage medium (e.g., one or more magnetic disk storage devices, flash memory devices, or other non-volatile solid-state memory devices).

In some examples, I/O interface 706 couples input/output devices 716 of digital assistant system 700, such as displays, keyboards, touch screens, and microphones, to user interface module 722. I/O interface 706, in conjunction with user interface module 722, receives user inputs (e.g., voice input, keyboard inputs, touch inputs, etc.) and processes them accordingly. In some examples, e.g., when the digital assistant is implemented on a standalone user device, digital assistant system 700 includes any of the components and I/O communication interfaces described with respect to devices 200, 400, or 600 in FIGS. 2A, 4, 6A-6B, respectively. In some examples, digital assistant system 700 represents the server portion of a digital assistant implementation, and can interact with the user through a client-side portion residing on a user device (e.g., devices 104, 200, 400, or 600).

In some examples, the network communications interface 708 includes wired communication port(s) 712 and/or wireless transmission and reception circuitry 714. The wired communication port(s) receives and send communication signals via one or more wired interfaces, e.g., Ethernet, Universal Serial Bus (USB), FIREWIRE, etc. The wireless circuitry 714 receives and sends RF signals and/or optical signals from/to communications networks and other communications devices. The wireless communications use any of a plurality of communications standards, protocols, and technologies, such as GSM, EDGE, CDMA, TDMA, Bluetooth, Wi-Fi, VoIP, Wi-MAX, or any other suitable communication protocol. Network communications interface 708 enables communication between digital assistant system 700 with networks, such as the Internet, an intranet, and/or a wireless network, such as a cellular telephone network, a wireless local area network (LAN), and/or a metropolitan area network (MAN), and other devices.

In some examples, memory 702, or the computer-readable storage media of memory 702, stores programs, modules, instructions, and data structures including all or a subset of: operating system 718, communications module 720, user interface module 722, one or more applications 724, and digital assistant module 726. In particular, memory 702, or the computer-readable storage media of memory 702, stores instructions for performing the processes described below. One or more processors 704 execute these programs, modules, and instructions, and reads/writes from/to the data structures.

Operating system 718 (e.g., Darwin, RTXC, LINUX, UNIX, iOS, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

Communications module 720 facilitates communications between digital assistant system 700 with other devices over network communications interface 708. For example, communications module 720 communicates with RF circuitry 208 of electronic devices such as devices 200, 400, and 600 shown in FIGS. 2A, 4, 6A-6B, respectively. Communications module 720 also includes various components for handling data received by wireless circuitry 714 and/or wired communications port 712.

User interface module 722 receives commands and/or inputs from a user via I/O interface 706 (e.g., from a keyboard, touch screen, pointing device, controller, and/or microphone), and generate user interface objects on a display. User interface module 722 also prepares and delivers outputs (e.g., speech, sound, animation, text, icons, vibrations, haptic feedback, light, etc.) to the user via the I/O interface 706 (e.g., through displays, audio channels, speakers, touch-pads, etc.).

Applications 724 include programs and/or modules that are configured to be executed by one or more processors 704. For example, if the digital assistant system is implemented on a standalone user device, applications 724 include user applications, such as games, a calendar application, a navigation application, or an email application. If digital assistant system 700 is implemented on a server, applications 724 include resource management applications, diagnostic applications, or scheduling applications, for example.

Memory 702 also stores digital assistant module 726 (or the server portion of a digital assistant). In some examples, digital assistant module 726 includes the following submodules, or a subset or superset thereof: input/output processing module 728, speech-to-text (STT) processing module 730, natural language processing module 732, dialogue flow processing module 734, task flow processing module 736, service processing module 738, and speech synthesis processing module 740. Each of these modules has access to one or more of the following systems or data and models of the digital assistant module 726, or a subset or superset thereof: ontology 760, vocabulary index 744, user data 748, task flow models 754, service models 756, and ASR systems 758.

In some examples, using the processing modules, data, and models implemented in digital assistant module 726, the digital assistant can perform at least some of the following: converting speech input into text; identifying a user's intent expressed in a natural language input received from the user; actively eliciting and obtaining information needed to fully infer the user's intent (e.g., by disambiguating words, games, intentions, etc.); determining the task flow for fulfilling the inferred intent; and executing the task flow to fulfill the inferred intent.

Figure 7B:
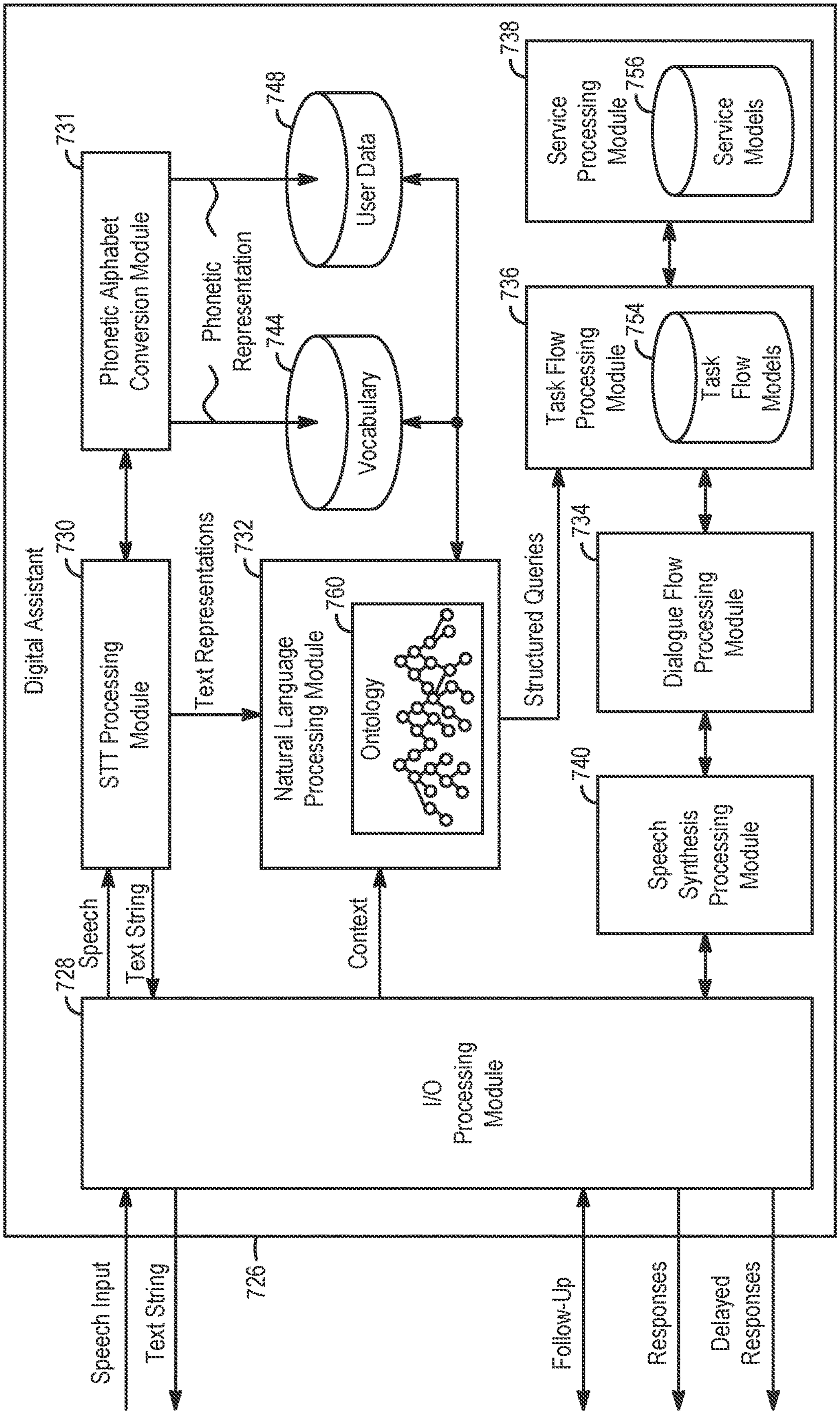
FIG. 7B illustrates the functions of the digital assistant shown in FIG. 7A, according to various examples.

In some examples, as shown in FIG. 7B, I/O processing module 728 interacts with the user through I/O devices 716 in FIG. 7A or with a user device (e.g., devices 104, 200, 400, or 600) through network communications interface 708 in FIG. 7A to obtain user input (e.g., a speech input) and to provide responses (e.g., as speech outputs) to the user input. I/O processing module 728 optionally obtains contextual information associated with the user input from the user device, along with or shortly after the receipt of the user input. The contextual information includes user-specific data, vocabulary, and/or preferences relevant to the user input. In some examples, the contextual information also includes software and hardware states of the user device at the time the user request is received, and/or information related to the surrounding environment of the user at the time that the user request was received. In some examples, I/O processing module 728 also sends follow-up questions to, and receive answers from, the user regarding the user request. When a user request is received by I/O processing module 728 and the user request includes speech input, I/O processing module 728 forwards the speech input to STT processing module 730 (or speech recognizer) for speech-to-text conversions.

STT processing module 730 includes one or more ASR systems 758. The one or more ASR systems 758 can process the speech input that is received through I/O processing module 728 to produce a recognition result. Each ASR system 758 includes a front-end speech pre-processor. The front-end speech pre-processor extracts representative features from the speech input. For example, the front-end speech pre-processor performs a Fourier transform on the speech input to extract spectral features that characterize the speech input as a sequence of representative multi-dimensional vectors. Further, each ASR system 758 includes one or more speech recognition models (e.g., acoustic models and/or language models) and implements one or more speech recognition engines. Examples of speech recognition models include Hidden Markov Models, Gaussian-Mixture Models, Deep Neural Network Models, n-gram language models, and other statistical models. Examples of speech recognition engines include the dynamic time warping based engines and weighted finite-state transducers (WFST) based engines. The one or more speech recognition models and the one or more speech recognition engines are used to process the extracted representative features of the front-end speech pre-processor to produce intermediate recognitions results (e.g., phonemes, phonemic strings, and sub-words), and ultimately, text recognition results (e.g., words, word strings, or sequence of tokens). In some examples, the speech input is processed at least partially by a third-party service or on the user's device (e.g., device 104, 200, 400, or 600) to produce the recognition result. Once STT processing module 730 produces recognition results containing a text string (e.g., words, or sequence of words, or sequence of tokens), the recognition result is passed to natural language processing module 732 for intent deduction. In some examples, STT processing module 730 produces multiple candidate text representations of the speech input. Each candidate text representation is a sequence of words or tokens corresponding to the speech input. In some examples, each candidate text representation is associated with a speech recognition confidence score. Based on the speech recognition confidence scores, STT processing module 730 ranks the candidate text representations and provides the n-best (e.g., n highest ranked) candidate text representation(s) to natural language processing module 732 for intent deduction, where n is a predetermined integer greater than zero. For example, in one example, only the highest ranked (n=1) candidate text representation is passed to natural language processing module 732 for intent deduction. In another example, the five highest ranked (n=5) candidate text representations are passed to natural language processing module 732 for intent deduction.

More details on the speech-to-text processing are described in U.S. Utility application Ser. No. 13/236,942 for "Consolidating Speech Recognition Results," filed on Sep. 20, 2011, the entire disclosure of which is incorporated herein by reference.

In some examples, STT processing module 730 includes and/or accesses a vocabulary of recognizable words via phonetic alphabet conversion module 731. Each vocabulary word is associated with one or more candidate pronunciations of the word represented in a speech recognition phonetic alphabet. In particular, the vocabulary of recognizable words includes a word that is associated with a plurality of candidate pronunciations. For example, the vocabulary includes the word "tomato" that is associated with the candidate pronunciations of /tə'meɪɾoʊ/and /tə'mɑtoʊ/. Further, vocabulary words are associated with custom candidate pronunciations that are based on previous speech inputs from the user. Such custom candidate pronunciations are stored in STT processing module 730 and are associated with a particular user via the user's profile on the device. In some examples, the candidate pronunciations for words are determined based on the spelling of the word and one or more linguistic and/or phonetic rules. In some examples, the candidate pronunciations are manually generated, e.g., based on known canonical pronunciations.

In some examples, the candidate pronunciations are ranked based on the commonness of the candidate pronunciation. For example, the candidate pronunciation /tə'meɪɾoʊ/ is ranked higher than /tə'mɑtoʊ/, because the former is a more commonly used pronunciation (e.g., among all users, for users in a particular geographical region, or for any other appropriate subset of users). In some examples, candidate pronunciations are ranked based on whether the candidate pronunciation is a custom candidate pronunciation associated with the user. For example, custom candidate pronunciations are ranked higher than canonical candidate pronunciations. This can be useful for recognizing proper nouns having a unique pronunciation that deviates from canonical pronunciation. In some examples, candidate pronunciations are associated with one or more speech characteristics, such as geographic origin, nationality, or ethnicity. For example, the candidate pronunciation /tə'meɪɾoʊ/ is associated with the United States, whereas the candidate pronunciation /tə'mɑtoʊ/ is associated with Great Britain. Further, the rank of the candidate pronunciation is based on one or more characteristics (e.g., geographic origin, nationality, ethnicity, etc.) of the user stored in the user's profile on the device. For example, it can be determined from the user's profile that the user is associated with the United States. Based on the user being associated with the United States, the candidate pronunciation /tə'meɪɾoʊ/ (associated with the United States) is ranked higher than the candidate pronunciation /tə'mɑtoʊ/ (associated with Great Britain). In some examples, one of the ranked candidate pronunciations is selected as a predicted pronunciation (e.g., the most likely pronunciation).

When a speech input is received, STT processing module 730 is used to determine the phonemes corresponding to the speech input (e.g., using an acoustic model), and then attempt to determine words that match the phonemes (e.g., using a language model). For example, if STT processing module 730 first identifies the sequence of phonemes /tə'meɪɾoʊ/ corresponding to a portion of the speech input, it can then determine, based on vocabulary index 744, that this sequence corresponds to the word "tomato."

In some examples, STT processing module 730 uses approximate matching techniques to determine words in an utterance. Thus, for example, the STT processing module 730 determines that the sequence of phonemes /tə'meɪɾoʊ/ corresponds to the word "tomato," even if that particular sequence of phonemes is not one of the candidate sequence of phonemes for that word.

Natural language processing module 732 ("natural language processor") of the digital assistant takes the n-best candidate text representation(s) ("word sequence(s)" or "token sequence(s)") generated by STT processing module 730, and attempts to associate each of the candidate text representations with one or more "actionable intents" recognized by the digital assistant. An "actionable intent" (or "user intent") represents a task that can be performed by the digital assistant, and can have an associated task flow implemented in task flow models 754. The associated task flow is a series of programmed actions and steps that the digital assistant takes in order to perform the task. The scope of a digital assistant's capabilities is dependent on the number and variety of task flows that have been implemented and stored in task flow models 754, or in other words, on the number and variety of "actionable intents" that the digital assistant recognizes. The effectiveness of the digital assistant, however, also dependents on the assistant's ability to infer the correct "actionable intent(s)" from the user request expressed in natural language.

In some examples, in addition to the sequence of words or tokens obtained from STT processing module 730, natural language processing module 732 also receives contextual information associated with the user request, e.g., from I/O processing module 728. The natural language processing module 732 optionally uses the contextual information to clarify, supplement, and/or further define the information contained in the candidate text representations received from STT processing module 730. The contextual information includes, for example, user preferences, hardware, and/or software states of the user device, sensor information collected before, during, or shortly after the user request, prior interactions (e.g., dialogue) between the digital assistant and the user, and the like. As described herein, contextual information is, in some examples, dynamic, and changes with time, location, content of the dialogue, and other factors.

In some examples, the natural language processing is based on, e.g., ontology 760. Ontology 760 is a hierarchical structure containing many nodes, each node representing either an "actionable intent" or a "property" relevant to one or more of the "actionable intents" or other "properties." As noted above, an "actionable intent" represents a task that the digital assistant is capable of performing, i.e., it is "actionable" or can be acted on. A "property" represents a parameter associated with an actionable intent or a sub-aspect of another property. A linkage between an actionable intent node and a property node in ontology 760 defines how a parameter represented by the property node pertains to the task represented by the actionable intent node.

In some examples, ontology 760 is made up of actionable intent nodes and property nodes. Within ontology 760, each actionable intent node is linked to one or more property nodes either directly or through one or more intermediate property nodes. Similarly, each property node is linked to one or more actionable intent nodes either directly or through one or more intermediate property nodes. For example, as shown in FIG. 7C, ontology 760 includes a "restaurant reservation" node (i.e., an actionable intent node). Property nodes "restaurant," "date/time" (for the reservation), and "party size" are each directly linked to the actionable intent node (i.e., the "restaurant reservation" node).

Figure 7C:
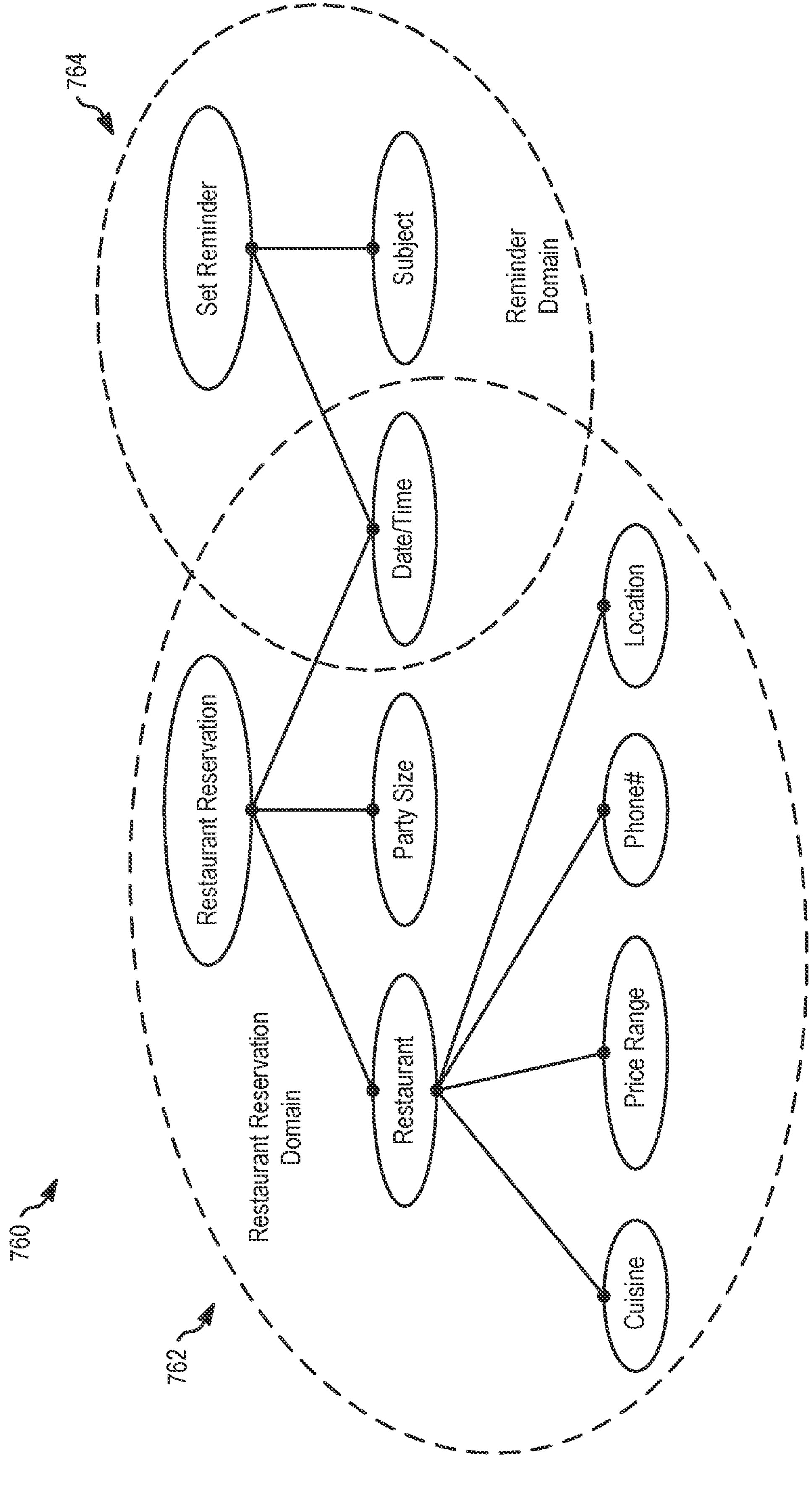
FIG. 7C illustrates a portion of an ontology, according to various examples.

In addition, property nodes "cuisine," "price range," "phone number," and "location" are sub-nodes of the property node "restaurant," and are each linked to the "restaurant reservation" node (i.e., the actionable intent node) through the intermediate property node "restaurant." For another example, as shown in FIG. 7C, ontology 760 also includes a "set reminder" node (i.e., another actionable intent node). Property nodes "date/time" (for setting the reminder) and "subject" (for the reminder) are each linked to the "set reminder" node. Since the property "date/time" is relevant to both the task of making a restaurant reservation and the task of setting a reminder, the property node "date/time" is linked to both the "restaurant reservation" node and the "set reminder" node in ontology 760.

An actionable intent node, along with its linked property nodes, is described as a "domain." In the present discussion, each domain is associated with a respective actionable intent, and refers to the group of nodes (and the relationships there between) associated with the particular actionable intent. For example, ontology 760 shown in FIG. 7C includes an example of restaurant reservation domain 762 and an example of reminder domain 764 within ontology 760. The restaurant reservation domain includes the actionable intent node "restaurant reservation," property nodes "restaurant," "date/time," and "party size," and sub-property nodes "cuisine," "price range," "phone number," and "location." Reminder domain 764 includes the actionable intent node "set reminder," and property nodes "subject" and "date/time." In some examples, ontology 760 is made up of many domains. Each domain shares one or more property nodes with one or more other domains. For example, the "date/time" property node is associated with many different domains (e.g., a scheduling domain, a travel reservation domain, a movie ticket domain, etc.), in addition to restaurant reservation domain 762 and reminder domain 764.

While FIG. 7C illustrates two example domains within ontology 760, other domains include, for example, "find a movie," "initiate a phone call," "find directions," "schedule a meeting," "send a message," and "provide an answer to a question," "read a list," "providing navigation instructions," "provide instructions for a task" and so on. A "send a message" domain is associated with a "send a message" actionable intent node, and further includes property nodes such as "recipient(s)," "message type," and "message body." The property node "recipient" is further defined, for example, by the sub-property nodes such as "recipient name" and "message address."

In some examples, ontology 760 includes all the domains (and hence actionable intents) that the digital assistant is capable of understanding and acting upon. In some examples, ontology 760 is modified, such as by adding or removing entire domains or nodes, or by modifying relationships between the nodes within the ontology 760.

In some examples, nodes associated with multiple related actionable intents are clustered under a "super domain" in ontology 760. For example, a "travel" super-domain includes a cluster of property nodes and actionable intent nodes related to travel. The actionable intent nodes related to travel includes "airline reservation," "hotel reservation," "car rental," "get directions," "find points of interest," and so on. The actionable intent nodes under the same super domain (e.g., the "travel" super domain) have many property nodes in common. For example, the actionable intent nodes for "airline reservation," "hotel reservation," "car rental," "get directions," and "find points of interest" share one or more of the property nodes "start location," "destination," "departure date/time," "arrival date/time," and "party size."

In some examples, each node in ontology 760 is associated with a set of words and/or phrases that are relevant to the property or actionable intent represented by the node. The respective set of words and/or phrases associated with each node are the so-called "vocabulary" associated with the node. The respective set of words and/or phrases associated with each node are stored in vocabulary index 744 in association with the property or actionable intent represented by the node. For example, returning to FIG. 7B, the vocabulary associated with the node for the property of "restaurant" includes words such as "food," "drinks," "cuisine," "hungry," "eat," "pizza," "fast food," "meal," and so on. For another example, the vocabulary associated with the node for the actionable intent of "initiate a phone call" includes words and phrases such as "call," "phone," "dial," "ring," "call this number," "make a call to," and so on. The vocabulary index 744 optionally includes words and phrases in different languages.

Natural language processing module 732 receives the candidate text representations (e.g., text string(s) or token sequence(s)) from STT processing module 730, and for each candidate representation, determines what nodes are implicated by the words in the candidate text representation. In some examples, if a word or phrase in the candidate text representation is found to be associated with one or more nodes in ontology 760 (via vocabulary index 744), the word or phrase "triggers" or "activates" those nodes. Based on the quantity and/or relative importance of the activated nodes, natural language processing module 732 selects one of the actionable intents as the task that the user intended the digital assistant to perform. In some examples, the domain that has the most "triggered" nodes is selected. In some examples, the domain having the highest confidence value (e.g., based on the relative importance of its various triggered nodes) is selected. In some examples, the domain is selected based on a combination of the number and the importance of the triggered nodes. In some examples, additional factors are considered in selecting the node as well, such as whether the digital assistant has previously correctly interpreted a similar request from a user.

User data 748 includes user-specific information, such as user-specific vocabulary, user preferences, user address, user's default and secondary languages, user's contact list, and other short-term or long-term information for each user. In some examples, natural language processing module 732 uses the user-specific information to supplement the information contained in the user input to further define the user intent. For example, for a user request "invite my friends to my birthday party," natural language processing module 732 is able to access user data 748 to determine who the "friends" are and when and where the "birthday party" would be held, rather than requiring the user to provide such information explicitly in his/her request.

It should be recognized that in some examples, natural language processing module 732 is implemented using one or more machine learning mechanisms (e.g., neural networks). In particular, the one or more machine learning mechanisms are configured to receive a candidate text representation and contextual information associated with the candidate text representation. Based on the candidate text representation and the associated contextual information, the one or more machine learning mechanisms are configured to determine intent confidence scores over a set of candidate actionable intents. Natural language processing module 732 can select one or more candidate actionable intents from the set of candidate actionable intents based on the determined intent confidence scores. In some examples, an ontology (e.g., ontology 760) is also used to select the one or more candidate actionable intents from the set of candidate actionable intents.

Other details of searching an ontology based on a token string are described in U.S. Utility application Ser. No. 12/341,743 for "Method and Apparatus for Searching Using An Active Ontology," filed Dec. 22, 2008, the entire disclosure of which is incorporated herein by reference.

In some examples, once natural language processing module 732 identifies an actionable intent (or domain) based on the user request, natural language processing module 732 generates a structured query to represent the identified actionable intent. In some examples, the structured query includes parameters for one or more nodes within the domain for the actionable intent, and at least some of the parameters are populated with the specific information and requirements specified in the user request. For example, the user says "Make me a dinner reservation at a sushi place at 7." In this case, natural language processing module 732 is able to correctly identify the actionable intent to be "restaurant reservation" based on the user input. According to the ontology, a structured query for a "restaurant reservation" domain includes parameters such as {Cuisine}, {Time}, {Date}, {Party Size}, and the like. In some examples, based on the speech input and the text derived from the speech input using STT processing module 730, natural language processing module 732 generates a partial structured query for the restaurant reservation domain, where the partial structured query includes the parameters {Cuisine="Sushi" } and {Time="7 pm" }. However, in this example, the user's utterance contains insufficient information to complete the structured query associated with the domain. Therefore, other necessary parameters such as {Party Size} and {Date} are not specified in the structured query based on the information currently available. In some examples, natural language processing module 732 populates some parameters of the structured query with received contextual information. For example, in some examples, if the user requested a sushi restaurant "near me," natural language processing module 732 populates a {location} parameter in the structured query with GPS coordinates from the user device.

In some examples, natural language processing module 732 identifies multiple candidate actionable intents for each candidate text representation received from STT processing module 730. Further, in some examples, a respective structured query (partial or complete) is generated for each identified candidate actionable intent. Natural language processing module 732 determines an intent confidence score for each candidate actionable intent and ranks the candidate actionable intents based on the intent confidence scores. In some examples, natural language processing module 732 passes the generated structured query (or queries), including any completed parameters, to task flow processing module 736 ("task flow processor"). In some examples, the structured query (or queries) for the m-best (e.g., m highest ranked) candidate actionable intents are provided to task flow processing module 736, where m is a predetermined integer greater than zero. In some examples, the structured query (or queries) for the m-best candidate actionable intents are provided to task flow processing module 736 with the corresponding candidate text representation(s).

Other details of inferring a user intent based on multiple candidate actionable intents determined from multiple candidate text representations of a speech input are described in U.S. Utility application Ser. No. 14/298,725 for "System and Method for Inferring User Intent From Speech Inputs," filed Jun. 6, 2014, the entire disclosure of which is incorporated herein by reference.

Task flow processing module 736 is configured to receive the structured query (or queries) from natural language processing module 732, complete the structured query, if necessary, and perform the actions required to "complete" the user's ultimate request. In some examples, the various procedures necessary to complete these tasks are provided in task flow models 754. In some examples, task flow models 754 include procedures for obtaining additional information from the user and task flows for performing actions associated with the actionable intent.

As described above, in order to complete a structured query, task flow processing module 736 needs to initiate additional dialogue with the user in order to obtain additional information, and/or disambiguate potentially ambiguous utterances. When such interactions are necessary, task flow processing module 736 invokes dialogue flow processing module 734 to engage in a dialogue with the user. In some examples, dialogue flow processing module 734 determines how (and/or when) to ask the user for the additional information and receives and processes the user responses. The questions are provided to and answers are received from the users through I/O processing module 728. In some examples, dialogue flow processing module 734 presents dialogue output to the user via audio and/or visual output, and receives input from the user via spoken or physical (e.g., clicking) responses. Continuing with the example above, when task flow processing module 736 invokes dialogue flow processing module 734 to determine the "party size" and "date" information for the structured query associated with the domain "restaurant reservation," dialogue flow processing module 734 generates questions such as "For how many people?" and "On which day?" to pass to the user. Once answers are received from the user, dialogue flow processing module 734 then populates the structured query with the missing information, or pass the information to task flow processing module 736 to complete the missing information from the structured query.

Once task flow processing module 736 has completed the structured query for an actionable intent, task flow processing module 736 proceeds to perform the ultimate task associated with the actionable intent. Accordingly, task flow processing module 736 executes the steps and instructions in the task flow model according to the specific parameters contained in the structured query. For example, the task flow model for the actionable intent of "restaurant reservation" includes steps and instructions for contacting a restaurant and actually requesting a reservation for a particular party size at a particular time. For example, using a structured query such as: {restaurant reservation, restaurant=ABC Caf6, date=May 12, 2012, time=7 pm, party size=5}, task flow processing module 736 performs the steps of: (1) logging onto a server of the ABC Caf6 or a restaurant reservation system such as OPENTABLE®, (2) entering the date, time, and party size information in a form on the website, (3) submitting the form, and (4) making a calendar entry for the reservation in the user's calendar.

In some examples, task flow processing module 736 employs the assistance of service processing module 738 ("service processing module") to complete a task requested in the user input or to provide an informational answer requested in the user input. For example, service processing module 738 acts on behalf of task flow processing module 736 to make a phone call, set a calendar entry, invoke a map search, invoke or interact with other user applications installed on the user device, and invoke or interact with third-party services (e.g., a restaurant reservation portal, a social networking website, a banking portal, etc.). In some examples, the protocols and application programming interfaces (API) required by each service are specified by a respective service model among service models 756. Service processing module 738 accesses the appropriate service model for a service and generates requests for the service in accordance with the protocols and APIs required by the service according to the service model.

For example, if a restaurant has enabled an online reservation service, the restaurant submits a service model specifying the necessary parameters for making a reservation and the APIs for communicating the values of the necessary parameter to the online reservation service. When requested by task flow processing module 736, service processing module 738 establishes a network connection with the online reservation service using the web address stored in the service model, and sends the necessary parameters of the reservation (e.g., time, date, party size) to the online reservation interface in a format according to the API of the online reservation service.

In some examples, natural language processing module 732, dialogue flow processing module 734, and task flow processing module 736 are used collectively and iteratively to infer and define the user's intent, obtain information to further clarify and refine the user intent, and finally generate a response (i.e., an output to the user, or the completion of a task) to fulfill the user's intent. The generated response is a dialogue response to the speech input that at least partially fulfills the user's intent. Further, in some examples, the generated response is output as a speech output. In these examples, the generated response is sent to speech synthesis processing module 740 (e.g., speech synthesizer) where it can be processed to synthesize the dialogue response in speech form. In yet other examples, the generated response is data content relevant to satisfying a user request in the speech input.

In examples where task flow processing module 736 receives multiple structured queries from natural language processing module 732, task flow processing module 736 initially processes the first structured query of the received structured queries to attempt to complete the first structured query and/or execute one or more tasks or actions represented by the first structured query. In some examples, the first structured query corresponds to the highest ranked actionable intent. In other examples, the first structured query is selected from the received structured queries based on a combination of the corresponding speech recognition confidence scores and the corresponding intent confidence scores. In some examples, if task flow processing module 736 encounters an error during processing of the first structured query (e.g., due to an inability to determine a necessary parameter), the task flow processing module 736 can proceed to select and process a second structured query of the received structured queries that corresponds to a lower ranked actionable intent. The second structured query is selected, for example, based on the speech recognition confidence score of the corresponding candidate text representation, the intent confidence score of the corresponding candidate actionable intent, a missing necessary parameter in the first structured query, or any combination thereof.

Speech synthesis processing module 740 is configured to synthesize speech outputs for presentation to the user. Speech synthesis processing module 740 synthesizes speech outputs based on text provided by the digital assistant. For example, the generated dialogue response is in the form of a text string. Speech synthesis processing module 740 converts the text string to an audible speech output. Speech synthesis processing module 740 uses any appropriate speech synthesis technique in order to generate speech outputs from text, including, but not limited, to concatenative synthesis, unit selection synthesis, diphone synthesis, domain-specific synthesis, formant synthesis, articulatory synthesis, hidden Markov model (HMM) based synthesis, and sinewave synthesis. In some examples, speech synthesis processing module 740 is configured to synthesize individual words based on phonemic strings corresponding to the words. For example, a phonemic string is associated with a word in the generated dialogue response. The phonemic string is stored in metadata associated with the word. Speech synthesis processing module 740 is configured to directly process the phonemic string in the metadata to synthesize the word in speech form.

In some examples, instead of (or in addition to) using speech synthesis processing module 740, speech synthesis is performed on a remote device (e.g., the server system 108), and the synthesized speech is sent to the user device for output to the user. For example, this can occur in some implementations where outputs for a digital assistant are generated at a server system. And because server systems generally have more processing power or resources than a user device, it is possible to obtain higher quality speech outputs than would be practical with client-side synthesis.

Additional details on digital assistants can be found in the U.S. Utility application Ser. No. 12/987,982, entitled "Intelligent Automated Assistant," filed Jan. 10, 2011, and U.S. Utility application Ser. No. 13/251,088, entitled "Generating and Processing Task Items That Represent Tasks to Perform," filed Sep. 30, 2011, the entire disclosures of which are incorporated herein by reference.

4. Process for Registering

Figure 8A:
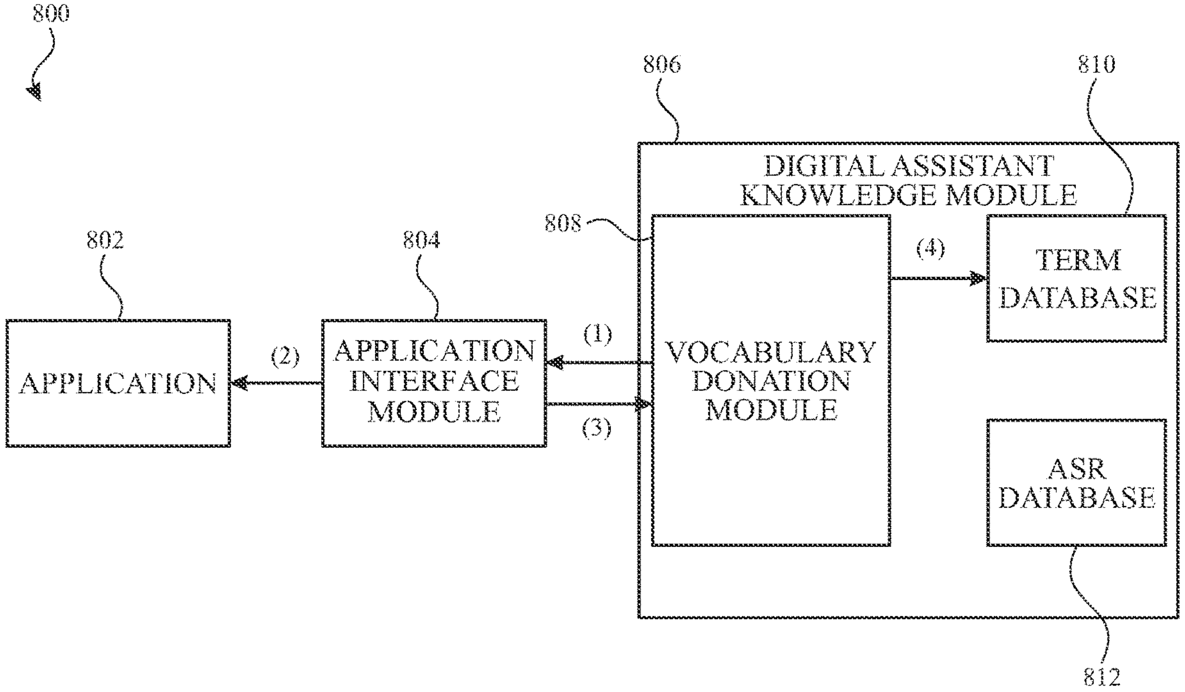
FIGS. 8A-8B illustrate systems for registering application terminology for use with a digital assistant, according to various examples.
Figure 8B:
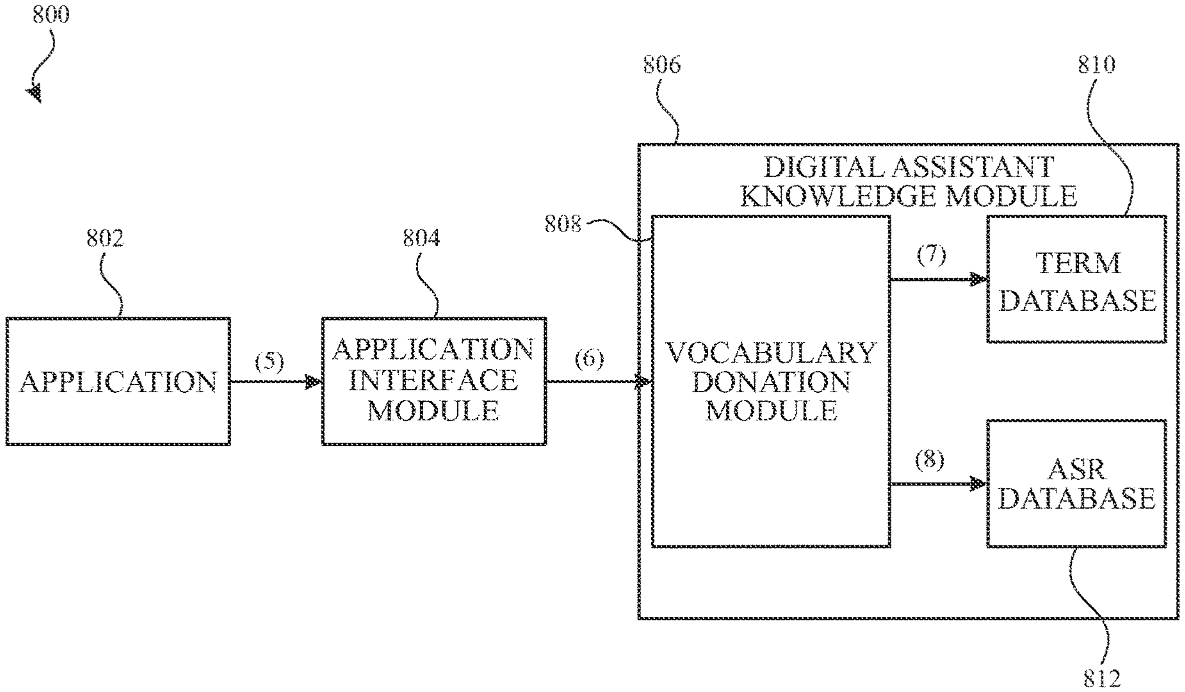

FIGS. 8A-8B illustrate system 800 for registering application terminology for use with a digital assistant, according to various examples. System 800 may be implemented, for example, using one or more electronic devices implementing a digital assistant (e.g., digital assistant system 700). In some embodiments, system 800 is implemented using a client-server system (e.g., system 100), and the functions of system 800 are divided up in any manner between one or more server devices (e.g., DA server 106) and a client device. In other embodiments, the functions of system 800 are divided up between one or more servers and multiple client devices (e.g., a mobile phone and a smart watch). Thus, while some functions of system 800 are described herein as being performed by particular devices of a client-server system, it will be appreciated that system 800 is not so limited. In other examples, system 800 is implemented using only a client device (e.g., user device 104) or only multiple client devices. In system 800, some functions are, optionally, combined, the order of some functions is, optionally, changed, and some functions are, optionally, omitted. In some examples, additional functions may be performed in combination with the described functions of system 800.

System 800 may be implemented using hardware, software, or a combination of hardware and software to carry out the principles discussed herein. Further, system 800 is exemplary, and thus system 800 can have more or fewer components than shown, can combine two or more components, or can have a different configuration or arrangement of the components. Further, although the below discussion describes functions being performed at a single component of system 800, it is to be understood that such functions can be performed at other components of system 800 and that such functions can be performed at more than one component of system 800. System 800 may be used to implement method 900 as described with respect to FIGS. 9A-9B, below.

Referring to FIGS. 8A-8B, system 800 includes one or more software applications (e.g., first- and third-party applications) including application 802. In some embodiments, application 802 is installed or is in the process of being installed on an electronic device implementing system 800. Software applications such as application 802 provide additional content and functionality to a user of an electronic device. For example, a reader application provides content such as books, audiobooks, or documents, and provides functionality such as opening/presenting media, media playback, purchasing media, or searching media. As another example, a voice recording application provides content such as a voice recordings (e.g., voice notes or voice memos), and provides functionality such as recording (e.g., file creation and content recording), playback, editing, and organization. Other example applications include productivity applications (with content such as documents, presentations, spreadsheets, and so forth, and functionality such as text editing, formatting, data analysis, and so forth), media applications (with content such as music, podcasts, videos, and so forth, and functionality such as searching, playback, and library organization), food ordering applications (with content such as restaurant listings and menu items, and functionality such as searching restaurant information, placing takeout orders, and placing delivery orders), and so forth.

System 800 further includes digital assistant knowledge module 806. For example, digital assistant knowledge module 806 manages a knowledge base for a digital assistant (e.g., digital assistant module 726 of digital assistant system 700, described above), which includes a vocabulary used by the digital assistant to interpret and operationalize natural-language user inputs, such as spoken or typed user inputs to the digital assistant. Digital assistant knowledge module 806 includes vocabulary donation module 808, term database 810, and automatic speech recognition (ASR) database 812. Vocabulary donation module 808 manages "donations" (e.g., additions or contributions) of vocabulary entries related to application content and functionality to the digital assistant knowledge base from the applications such as application 802. Term database 810, and automatic speech recognition (ASR) database 812 allow the digital assistant to search for the application vocabulary once donated and registered.

System 800 further includes application interface module 804, which serves as an interface linking digital assistant knowledge module 806 and the one or more applications including application 802. For example, as described in further detail below, vocabulary donation module 808 can request a vocabulary donation from application 802 via application interface module 804, and/or application 802 can make a vocabulary donation to the digital assistant using application interface module 804.

Application vocabulary may include vocabulary entries for classes handled by the one or more applications including application 802. In some embodiments, the classes handled by the one or more applications are programming concepts understood by the one or more applications, such as entities (e.g., a book entity or a voice memo entity), enumerations (e.g., a tab or page in an application or a setting of the application), or actions (e.g., self-contained tasks an application can perform, such as opening a book entity or creating a voice memo entity). For example, if application 802 is a reader application, its corresponding application vocabulary may include entries for general entities such as a book, an audiobook, an article, or a document, as well as specific instances of those concepts (e.g., individual books, audiobooks, articles, and documents in a user-specific or online library), and enumerations such as tabs of the application (e.g., Reading Now, Library, Book Store) or tags for the content (e.g., favorited, in progress, or finished tags for book entities). As another example, a word processing application may be associated with vocabulary for a word entity and an italics text formatting enumeration.

Application vocabulary may be classified as either static or dynamic, referring to how the meaning of the vocabulary tends to change with respect to the one or more applications including application 802. For example, application 802 is unlikely to change its understanding (e.g., handling) of the vocabulary "book," at least on the time scale of an application update schedule (e.g., days, weeks, or months), so a vocabulary entry for a book entity type may be a static vocabulary entry. On the other hand, a specific book may be added to (or removed from) application 802 at any time, so a vocabulary entry for specific book may be a dynamic vocabulary entry. FIG. 8A illustrates the donation of a static vocabulary entry for application 802 to digital assistant knowledge module 806 using system 800 according to some examples, and FIG. 8B illustrates the donation of a dynamic vocabulary entry for application 802 to digital assistant knowledge module 806 using system 800 according to some examples.

As illustrated in FIG. 8A, vocabulary donation module 808 obtains the first (e.g., static) vocabulary entry from application 802. The first vocabulary entry represents a first class (e.g., a first programming concept) handled by application 802, such as an entity, enumeration, or action understood by the application, and in particular, a first class that tends to remain static in meaning with respect to application 802. For example, the first vocabulary entry may be a static vocabulary entry for the "book" entity type (e.g., books in general, as opposed to a specific book) handled by application 802 (e.g., a reader application). Although the digital assistant may understand the general meaning of books, for instance, using a non-application-specific vocabulary, obtaining the first vocabulary entry allows the digital assistant to specifically understand the book entity type handled by application 802.

The first vocabulary entry for application 802 may include a first identifier of the first class handled by application 802. For example, the first vocabulary entry may include the identifier "BookEntity" used by application 802 to identify the book entity type. The first vocabulary entry obtained from application 802 may also include at least a first synonym for the first identifier. For example, the synonyms may include words and phrases a human user could understand and speak to refer to the class, such as synonyms "novel," "volume," or "book" (e.g., as opposed to "BookEntity," which a user is unlikely to say in a natural-language input). In some embodiments, the first vocabulary entry may include other metadata obtained from application 802, such as related vocabulary entries (e.g., vocabulary for specific instances of books) or related context (e.g., other applications that can handle the book entity type, related terminology such as "bookmark" or "chapter," etc.).

The first vocabulary entry may be associated with one or more commands of application 802. For example, the vocabulary entry for the book entity type may be associated with reader application commands for adding to a library, adding to a collection, opening, deleting, and so forth. The associated commands may be included in the first vocabulary entry as metadata obtained with the first vocabulary entry, as discussed above.

Vocabulary donation module 808 of digital assistant knowledge module 808 obtains the first vocabulary entry via application interface module 804. In some embodiments, the digital assistant initiates obtaining the first vocabulary entry, for instance, by making a vocabulary donation request (as indicated by arrow 1, shown in FIG. 8A) via application interface module 804. In response, application interface module 804 retrieves the first vocabulary entry from application 802 (as indicated by arrow 2) and passes the first vocabulary entry to vocabulary donation module 808 (as indicated by arrow 3) for registration. For example, application interface module 804 may retrieve the first vocabulary entry for application 802 from a first data file of application 802, such as a static vocabulary library distributed with application 802's installation and/or update materials. As a static vocabulary library will tend to remain unchanged for application 802, as discussed above, the first data file may include predetermined synonyms or other metadata for the application concepts that have been selected (e.g., expertly curated) by the application developers. Application interface module 804 extracts the vocabulary entries from the first data file in order to obtain an initial donation of static vocabulary entries from application 802 to pass to vocabulary donation module 808.

In some embodiments, vocabulary donation module 808 obtains the first vocabulary entry from application 802 in response to receiving a user input relating to application 802, such as a request to install application 802, a request to update application 802, or a request to launch application 802 (e.g., when application 802 is installed but not currently running). Accordingly, vocabulary donation module 808 may begin obtaining the first vocabulary entry before application 802 is installed, for instance, as part of the application installation process, or once application 802 has been installed, for instance, as part of an application refresh process.

Once the first (e.g., static) vocabulary entry has been obtained, vocabulary donation module 808 registers the first vocabulary entry with digital assistant knowledge module 806. In some embodiments, as part of registering the first vocabulary entry with digital assistant knowledge module 806, vocabulary donation module 808 indexes the first vocabulary entry (as indicated by arrow 4, shown in FIG. 8A) in term database 810. Indexing the first vocabulary entry in term database 810 allows the digital assistant to search for the first vocabulary entry, for instance, based on the identifier, synonyms, metadata, and the like.

Vocabulary donation module 808 may register first metadata in association with the first vocabulary entry. For example, the first metadata may provide context for the digital assistant understanding of the first vocabulary entry. In some embodiments, the first metadata may include metadata obtained from application 802 (e.g., metadata included the first data file). In some embodiments, the first metadata may include metadata determined by vocabulary donation module 808, such as the identity of application 802, the identity of other applications able to handle the first class, or related vocabulary entries. For example, the first metadata associated with the vocabulary entry for the book entity type may include the identity of application 802 (e.g., the donating application), metadata received from application 802 (e.g., the synonyms for the book entity, handling information, related commands), related vocabulary entries (e.g., instances of the book entity, such as specific books), the identity of other applications capable of handling the book entity type (e.g., a document viewer application), and so forth.

Registering the first (e.g., static) vocabulary entry with digital assistant knowledge module 806 allows the digital assistant to use (e.g., recognize and understand) the first (e.g., static) vocabulary entry for application 802 when processing natural-language user inputs. For example, upon receiving a natural-language user input such as "What novel am I currently reading," the digital assistant may search for the token "novel" in term database 810 and determine that it matches a synonym for the book entity of application 802. Accordingly, the digital assistant can interpret and operationalize the user input in context of application 802's content and functionality, for instance, retrieving information about a book-type entity that the user has been reading with application 802. In some embodiments, once registered, the first vocabulary entry acts as a persistent reference to the first class, such that the digital assistant can understand user inputs relating to the class even when application 802 is not running or active.

As illustrated in FIG. 8B, vocabulary donation module 808 receives a request from application 802 (as indicated by arrow 5, shown in FIG. 8B) to register the second (e.g., dynamic) vocabulary entry. Like the first vocabulary entry, the second vocabulary entry represents a second class (e.g., a second programming concept) handled by application 802, such as an entity, enumeration, or action understood by the application. For example, the first vocabulary entry may be a dynamic vocabulary entry for a specific instance of the book entity, "The Underground Railroad," handled by application 802.

The second vocabulary entry for application 802 may include a second identifier of the second class handled by application 802. For example, the second vocabulary entry may include the identifier "TheUndergroundRailroad" used by application 802 to identify the specific book instance. In some embodiments, the second vocabulary entry may include other metadata provided by application 802 relating to the class, such as related vocabulary entries or handling information. Additionally, the second vocabulary entry may be associated with one or more commands of application 802. For example, the second vocabulary entry for the specific book instance "The Underground Railroad" may be associated with commands for adding to a library, adding to a collection, opening, deleting, and so forth using the reader application. The associated commands may be included in the second vocabulary entry as metadata obtained with the second vocabulary entry, as discussed above.

Vocabulary donation module 808 receives the request to register the second vocabulary entry from application 802 (as indicated by arrow 6) via application interface module 804. In some embodiments, the second vocabulary entry (e.g., including the second identifier and associated metadata) is included in the request from application 802. For example, application 802 may make an application programming interface (API) call for donating vocabulary, where the second vocabulary entry (e.g., including the second identifier and associated metadata) is provided by application 802 as a parameter (e.g., object) of the API call. The API call can be invoked directly by application 802 or by a daemon (e.g., a background program) for application 802. In turn, application interface module 804 passes the second vocabulary entry to vocabulary donation module 808.

In some embodiments, the second (e.g., dynamic) vocabulary entry is included in an ordered set of dynamic vocabulary entries. For example, application 802 may maintain a dynamic vocabulary corpus, for instance, with vocabulary entries for all of the dynamic classes handled by application 802, such as the specific instances books, audiobooks, and documents in an online or local library for the reader application (including the second vocabulary entry for "The Underground Railroad"). Updates the dynamic vocabulary corpus (e.g., additions of new books, deletions from the library, updated metadata, and so forth) made by application 802 may trigger the application to send a request to register (or re-register) ordered set of dynamic vocabulary entries (including the second vocabulary entry for "The Underground Railroad").

This set of dynamic vocabulary entries may be relatively large and may update on a frequent or unpredictable basis (e.g., as discussed above with respect to the static/dynamic distinction). Accordingly, in some embodiments, application 802 orders (e.g., prioritizes) the vocabulary entries included in the set, such that the scope of the overall dynamic vocabulary donation can be controlled by digital assistant knowledge module 806. For example, digital assistant knowledge module 806 may restrict each of the one or more applications to a vocabulary allocation of 1,000 entries or fewer. Accordingly, upon receiving a request to register the ordered set of dynamic vocabulary entries from application 802, application interface module 804 may only pass vocabulary entries that have an order index of 1,000 or less (e.g., whether the vocabulary entries are in the top 1,000 prioritized vocabulary entries) to vocabulary donation module 808 to register.

After receiving the request to register the second (e.g., dynamic) vocabulary entry, vocabulary donation module 808 registers the second vocabulary entry with digital assistant knowledge module 806. That is, as with the first (e.g., static) vocabulary entry, vocabulary donation module 808 may incorporate the second vocabulary entry into a vocabulary for the digital assistant.

As described with respect to the first vocabulary entry, vocabulary donation module 808 may register second metadata in association with the second vocabulary entry. For example, as with the first metadata, the second metadata may provide context for the digital assistant understanding of the second vocabulary entry, including the identity of application 802, metadata received from application 802, related vocabulary entries, and so forth.

In some embodiments, the second metadata includes automatic speech recognition (ASR) data, which the digital assistant can use to recognize the second vocabulary entry from a natural-language speech input. For example, unlike the first (e.g., static) vocabulary entry, which may include ASR data provided by application 802 (e.g., as part of a curated data file), vocabulary donation module 808 determines (e.g., generates) the ASR metadata for the second vocabulary entry. In addition to including pronunciation information, the ASR metadata determined for the second vocabulary entry may include contextual information, for instance, indicating that the term "The Underground Railroad" is more likely to occur in proximity to the word "read" than the word "paint."

In some embodiments, as part of registering the second vocabulary entry with digital assistant knowledge module 806, vocabulary donation module 808 indexes the second vocabulary entry in term database 810 (as indicated by arrow 7) and in ASR database 812 (as indicated by arrow 8). Like the first vocabulary entry, indexing the second vocabulary entry in term database 810 allows the digital assistant to search for the second vocabulary entry, for instance, based on the second identifier, second metadata, and the like. Indexing the second vocabulary entry in ASR database may promote (e.g., boost) recognition of the second vocabulary entry when performing an ASR or NLP process. For example, indexing the second vocabulary entry in ASR database may increase the likelihood of recognizing the words "The Underground Railroad" in combination and/or in proximity to the word "read" based on the ASR metadata generated by vocabulary donation module 808.

Registering the second (e.g., dynamic) vocabulary entry with digital assistant knowledge module 806 allows the digital assistant to use (e.g., recognize and understand) the second vocabulary entry for application 802 when processing natural-language user inputs. For example, upon receiving a natural-language user input such as "Hey Siri, open 'The Underground Railroad,'" the digital assistant may process the user input using ASR database 812 and/or search for the token(s) "The Underground Railroad" in term database 810 to determine that it matches a specific book entity known to application 802. Accordingly, the digital assistant can interpret and operationalize the user input in context of application 802's content and functionality, for instance, causing application 802 to open the specific book entity "The Underground Railroad."

The operations described above with reference to FIGS. 8A-8B are optionally implemented by components depicted in FIGS. 1-4, 6A-6B, and 7A-7C. For example, the operations of system 800 may be implemented by one or more electronic devices (e.g., 104, 122, 200, 400, 600) such as one implementing system 700. It would be clear to a person having ordinary skill in the art how other processes are implemented based on the components depicted in FIGS. 1-4, 6A-6B, and 7A-7C.

Figure 9A:
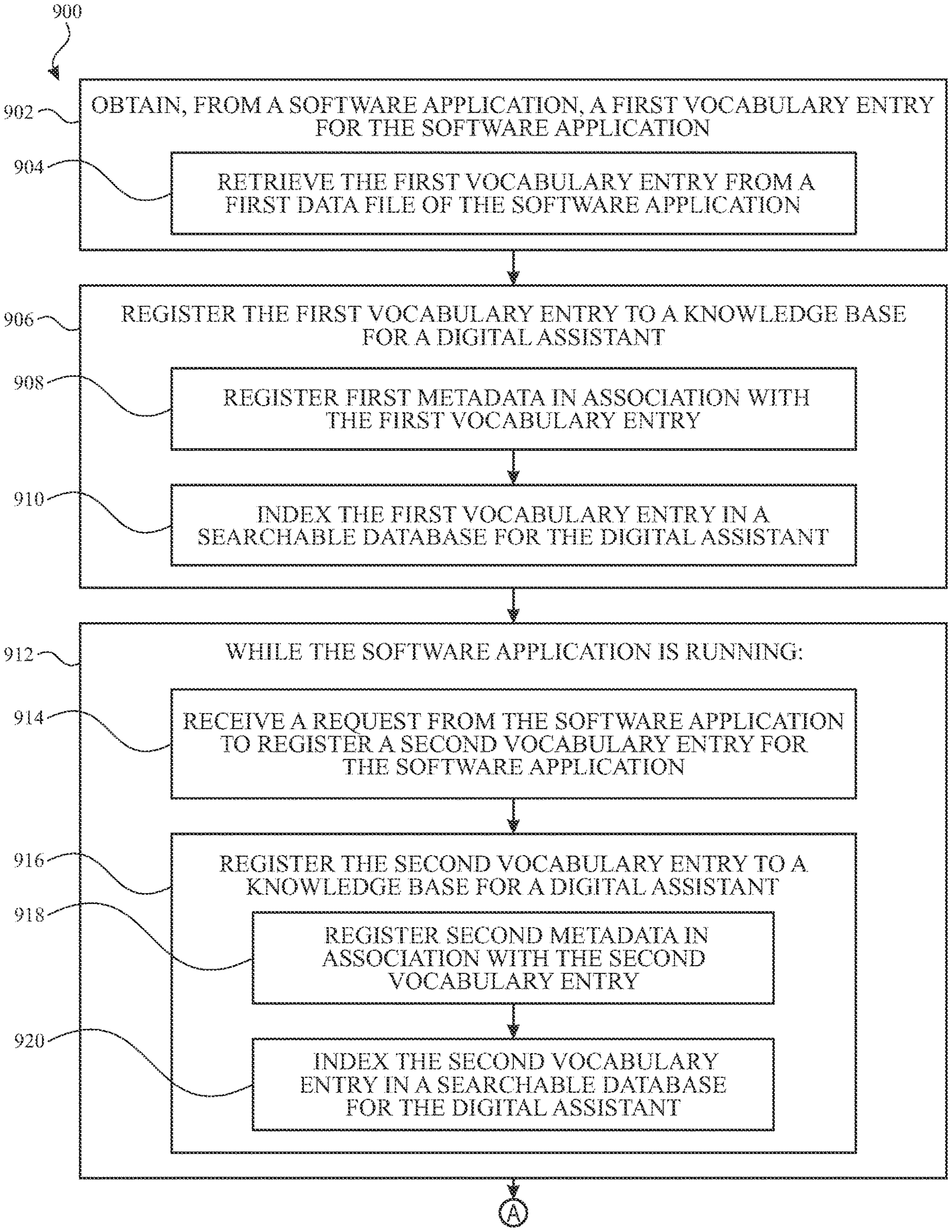
FIGS. 9A-9B illustrate a flow chart for registering application terminology for use with a digital assistant, according to various examples.
Figure 9B:
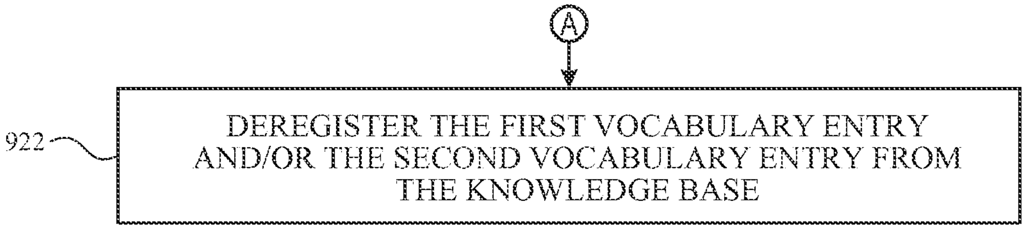

FIGS. 9A-9B is a flow diagram illustrating method 900 for registering application terminology for use with a digital assistant in accordance with some embodiments. Method 900 may be performed using one or more electronic devices (e.g., device 104, device 200, device 600) with one or more processors and memory. In some embodiments, method 900 is performed using a client-server system, with the operations of method 900 divided up in any manner between the client device(s) (e.g., 104, 200, 600) and the server. Some operations in method 900 are, optionally, combined, the orders of some operations are, optionally, changed, and some operations are, optionally, omitted.

At block 902, a first vocabulary entry for a software application is obtained from the software application. In some embodiments, the first vocabulary entry represents a first class handled by the software application. In some embodiments, the first class handled by the software application is a first programming concept understood by the software application, such as an entity (e.g., an object instance or object type), enumeration (e.g., a predefined variable), and/or action (e.g., for performing a command or task). For example, a first vocabulary entry representing a book type entity may be obtained from a reader application; a first vocabulary entry representing an audio recording type entity may be obtained from a voice recording application; or a first vocabulary entry representing a folder type entity may be obtained from a file explorer application.

In some embodiments, vocabulary entries may be classified by type as either static or dynamic vocabulary, and the first vocabulary entry is a static vocabulary entry. For example, static vocabulary for a reader application may include vocabulary entries for a book entity type, a library tab enumeration, or the like. As another example, static vocabulary for a recording application may include vocabulary entries for a recording entity type, a favorites folder entity of the application, or the like. In comparison to dynamic vocabulary, static vocabulary is assumed to remain stable on the time scale of an application update schedule. For example, the way the recording-type entity is handled by or understood by the voice recording application, or the way the library tab enumeration is handled by or understood by the reader application, will tend to remain unchanged, at least in between updates to the applications.

In some embodiments, obtaining the first vocabulary entry for the software application includes, at block 904, retrieving the first vocabulary entry from a first data file of the software application. For example, the software application's installation or update package may include a standardized vocabulary data file for static application vocabulary, including the second vocabulary entry, that can be read (e.g., by application interface module 804) in order to extract the second vocabulary entry and metadata associated with the second vocabulary entry In some embodiments, the first vocabulary entry includes a first identifier of the first class handled by the software application. For example, the first vocabulary entry may include the identifier "RecordingEntity" used by the voice recording application to identify the recording entity type. As another example, the first vocabulary entry may include the identifier "LibraryEnum" used by the reader application to identify the "Library" tab of the application.

In some embodiments, the first vocabulary entry further includes at least a first synonym for the first identifier. For example, the first vocabulary entry may include one or more natural-language words or phrases (e.g., human-readable and -speakable strings) corresponding to the first class, such as "recording," "voice note," "voice memo," and/or "dictation" for the recording entity type of the voice recording application (e.g., as opposed to the first identifier, "RecordingEntity," which is unlikely to be included in a natural-language speech input). As noted above, in some embodiments, the first vocabulary is a static vocabulary entry. Since static vocabulary changes relatively infrequently (at least on the time scale of an application update schedule), the one or more synonyms for the first identifier may be expertly developed, e.g., by the application developers, and included in the first data file obtained from the application for use in the application vocabulary.

In some embodiments, the first vocabulary entry is associated with at least a first command for the software application. For example, the first command may be a task or action that can be performed by the software application on, with, or in relation to the first class. For the recording entity type, the first vocabulary entry may be associated with a first command to create a new instance of the recording entity type using the voice recording application. As another example, for the library tab enumeration, the first vocabulary entry may be associated with a first command to open the reader application to the library tab. In some embodiments, the first vocabulary entry may be associated with multiple commands for the first application (including the first command for the first application). For example, the first vocabulary entry for the recording entity type may be associated with any or all actions the voice recording application can take with respect to instances of the recording entity type, such as playing, pausing, opening, editing, or deleting. In some embodiments, the first command associated with the first vocabulary entry may be included in the first data file of the software application, for instance, as part of a selected (e.g., expertly-curated) library of commands compatible with the first class represented by the first vocabulary entry.

In some embodiments, block 902 (obtaining the first vocabulary entry for the software application) is initiated by a digital assistant (e.g., digital assistant module 726 of digital assistant system 700) of the electronic device implementing method 900. For example, the digital assistant can make a request to a digital assistant-application interface (e.g., application interface module 804) to read the first data file of the software application and extract the first vocabulary entry (and/or other static vocabulary entries) for the digital assistant to register.

In some embodiments, block 902 (obtaining the first vocabulary entry for the software application) is performed in response to receiving a user input requesting to install the software application. For example, the first data file for the software application may be included in installation materials and read as part of the installation process in order to extract an initial vocabulary donation including the first vocabulary entry. In some embodiments, obtaining the first vocabulary entry for the software application is performed in response to updating the software application, for instance, including the first data file in update materials for the software application. As noted above, in some embodiments, the first vocabulary is a static vocabulary entry, and as such, registering (or re-registering) the first vocabulary entry as part of the software application installation and update process will generally capture any changes to the software application's static vocabulary.

In some embodiments, the software application is already installed on the electronic device implementing method 900, e.g., prior to performing blocks 902-904. Accordingly, in some embodiments, block 902 (obtaining the first vocabulary entry for the software application) is performed in response to launching the software application. For example, the static vocabulary for the software application, including the first vocabulary entry, may be extracted (e.g., from the first data file) when a user launches the software application, such that the initial launch after installation triggers an initial static vocabulary registration, and subsequent launches trigger a "refresh" of the static vocabulary entries (as described in further detail below).

At block 906, the first vocabulary entry is registered to a knowledge base for the digital assistant. For example, the knowledge base may include a vocabulary used by the digital assistant to interpret and operationalize natural-language user inputs (e.g., vocabulary 744 of digital assistant module 726), such as spoken or typed user inputs to the digital assistant. Accordingly, once registered to the knowledge base, the digital assistant can interpret and operationalize natural-language user inputs using the first vocabulary entry. In some embodiments, if the first class of the first vocabulary entry was not previously known to the digital assistant, registering the first vocabulary entry includes adding the first vocabulary entry to the knowledge base (e.g., for the first time). In some embodiments, registering the first vocabulary entry includes updating the first vocabulary entry in the knowledge base. For example, registering a version of the first vocabulary entry for a recording entity type that was obtained while updating the voice recording application may include updating a previous version of the first vocabulary entry (e.g., a version of the first vocabulary entry obtained and registered when the voice recording application was initially installed). As another example, registering a version of the first vocabulary entry for the recording entity type may include updating a version of the first vocabulary entry that had previously been obtained from a different application (e.g., a video editing application that also uses the recording entity type).

In some embodiments, registering the first vocabulary entry includes, at block 908, registering first metadata in association with the first vocabulary entry. In some embodiments, the first metadata associated with the first vocabulary entry may include the identifier for the first class; the one or more synonyms; the at least first command associated with the first vocabulary entry; the identity of the application (or applications) that donated the first vocabulary entry; related vocabulary entries; automatic speech recognition (ASR) data; or any other information that would assist the digital assistant in interpreting and operationalizing a user input with respect to the first vocabulary entry. For example, first metadata associated with the first vocabulary entry for the recording entity type may include the identifier "RecordingEntity," synonyms (e.g., "recording," "voice note," "voice memo," "dictation," and so forth), the identity of the recording application and the video editing application that handle the recording entity type, the command to create a voice recording, and so forth. In some embodiments, at least a part of the metadata associated with the first (e.g., static) vocabulary entry may be obtained from the software application, e.g., as part of the first data file selected (e.g., expertly-curated) by the application developers for the static application vocabulary.

In some embodiments, registering the first vocabulary entry includes, at block 910, indexing the first vocabulary entry in a searchable database for the digital assistant. For example, the first vocabulary entry for the recording entity type may be indexed along with the associated first metadata. Accordingly, the digital assistant can query the searchable database to find one or more matching vocabulary entries for a natural-language user input based on the vocabulary entries' identifiers, synonyms, associated commands, and/or associated metadata.

While the software application is running at block 912 (e.g., after the application is installed and has been launched), at block 914, a request is received from the software application to register a second vocabulary entry for the software application. As with the first vocabulary entry, in some embodiments, the second vocabulary entry represents a second class handled by the software application, such as an entity, enumeration, and/or action. For example, a second vocabulary entry representing the book "The Underground Railroad" may be included in a request from the reader application; a second vocabulary entry representing a recording titled "Voice Note 2" may be included in a request from the voice recording application; or a second vocabulary entry representing a folder called "Cat Photos" may be included in a request from the file explorer application.

In embodiments where vocabulary entries are classified by type as either static or dynamic vocabulary entry, the second vocabulary entry is a dynamic vocabulary entry. As with the first vocabulary entry, in some embodiments, the second class handled by the software application is a second programming concept understood by the software application. In comparison to static vocabulary entries, in some embodiments, dynamic vocabulary entries for an application may include vocabulary for classes that are created, modified, or deleted frequently or unpredictably. For example, vocabulary entries for books (e.g., specific instances of the book entity type, such as "The Underground Railroad") in a local or online library of the reader application may be added, modified, or deleted by the user or by an administrator of the library at any time. As another example, vocabulary entries for recordings (e.g., specific instances of the recording entity type, such as "Voice Note 2") may be created (and named) by the user.

As described with respect to the first vocabulary entry, in some embodiments, the second vocabulary entry includes a second identifier of the second class handled by the software application. For example, the second vocabulary entry may include the identifier "VoiceNote2" to identify the specific instance of a recording titled "Voice Note 2" for the voice recording application. As another example, the second vocabulary entry may include the identifier "TheUndergroundRailroad" to identify the specific book titled "The Underground Railroad" for the reader application. In some embodiments, unlike the first (e.g., static) vocabulary entry, the second (e.g., dynamic) vocabulary entry may not include predetermined synonyms (e.g., synonyms selected by the application developers). For example, given the dynamic nature of the vocabulary, the application developer may not have the capacity to expertly tool synonyms (e.g., for a large online library) or appropriate synonyms may not exist for the class (e.g., for user-generated or proper names, such as "Voice Note 2" or "The Underground Railroad").

As described with respect to the first vocabulary entry, in some embodiments, the second vocabulary entry is associated with at least a second command for the software application. For example, the second command may be associated with a task or action that can be performed by the software application on, with, or in relation to the second class. For the recording "Voice Note 2," the second vocabulary entry may be associated with a second command to play, edit, or delete the recording with the voice recording application.

In some embodiments, the second vocabulary entry (e.g., including the second identifier, associated commands, and/ or any other related metadata provided by the application) is included in the request received from the software application (e.g., provided by the software application). For example, the request from the software application received at block 914 is received may be an application programming interface (API) call for donating vocabulary. The second vocabulary entry may be provided by the application as a parameter (e.g., an object) of the API call. In some embodiments, the API call to donate the second vocabulary entry can be made by the software application directly, or by a daemon (e.g., a background program) for the software application.

In some embodiments, the request from the software application received at block 914 is initiated by the software application (e.g., rather than by the digital assistant). For example, as described above, dynamic vocabulary entries for an application may include vocabulary for classes that are created, modified, or deleted frequently or unpredictably. Accordingly, rather than wait for the digital assistant to extract any new or updated dynamic vocabulary entries (e.g., as part of an application update), the software application may "push" dynamic vocabulary donations to the digital assistant as those additions and updates are made.

In some embodiments, the second (e.g., dynamic) vocabulary entry is included in an ordered set of vocabulary entries. For example, rather than donating the individual second vocabulary entry for the recording "Voice Note 2," the voice recording application may provide a corpus of dynamic vocabulary entries including entries for all specific recordings included in the voice recording application library. As another example, rather than donating the individual second vocabulary entry for the book "The Underground Railroad," the reader application may provide a corpus of dynamic vocabulary entries including a plurality of entries for the books, audiobooks, and documents included in a local or online library. In these embodiments, the corpus of dynamic vocabulary entries may be ordered (e.g., prioritized) by the software application in order for the digital assistant to control the scope of the dynamic vocabulary donation. For example, the software application may determine the relative priority of each vocabulary entry of the set of vocabulary entries based on user interaction, context data, associated functionality, or the like (e.g., prioritizing entities and enumerations that the user frequently interacts with over rarely-used entities and enumerations).

In some embodiments, a determination can be made whether the software application has modified the ordered set of vocabulary entries, and the request to register the second vocabulary entry received at block 914 can be received in accordance with a determination that the software application has modified the ordered set of vocabulary entries. For example, when the software application adds new vocabulary to the dynamic corpus, modifies vocabulary already included in the dynamic corpus, re-orders (e.g., re-prioritizes) the dynamic corpus, or removes vocabulary from the dynamic corpus, the software application can "push" a dynamic vocabulary donation in order to update the digital assistant accordingly.

At block 916, the second vocabulary entry is registered to the knowledge base for the digital assistant. As with registering the first vocabulary entry, in some embodiments, registering the second vocabulary entry includes adding the second vocabulary entry to the knowledge base (e.g., for the first time), or updating the second vocabulary entry in the knowledge base (e.g., if a version of the second vocabulary entry for the second class was previously donated by the software application or a different software application).

In embodiments where the second vocabulary entry is included in the ordered set of vocabulary entries, a determination can be made whether an order index of the second vocabulary entry in the ordered set of vocabulary entries (e.g., the priority of the dynamic corpus) satisfies registration criteria, and block 916 (registering the second vocabulary entry to the knowledge base) can be performed in accordance with a determination that the registration criteria are satisfied. For example, the digital assistant knowledge base may restrict each installed software application to a fixed vocabulary allocation (e.g., fewer than 1,000 entries per application). As another example, the digital assistant knowledge base may restrict each installed software application to a flexible vocabulary allocation, such that if the voice recording application only donates 100 vocabulary entries, the reader application may use some of the voice recording application's remaining 900 allocated entries in addition to its own 1,000 allocated entries. Accordingly, the registration criteria may include a requirement that the index of the second vocabulary entry in the ordered set of vocabulary entities does not exceed the threshold of the static vocabulary allocation.

In some embodiments, registering the second vocabulary entry includes, at block 918, registering second metadata in association with the second vocabulary entry. In some embodiments, the second metadata associated with the second vocabulary entry may include the identifier of the second class; the at least second command associated with the second vocabulary entry; the identity of the application (or applications) that donated or can handle the second vocabulary entry; related vocabulary entries, or any other information that would assist the digital assistant in interpreting and operationalizing a user input with respect to the second vocabulary entry. For example, second metadata associated with the second vocabulary entry for the recording "Voice Note 2" may include the identifier "VoiceNote2," the recording entity type, the identity of the voice recording application (and/or the video editing application capable of handling recording entity types), the date the recording "Voice Note 2" was created, and so forth. In some embodiments, at least a part of the second metadata may be provided by the software application, e.g., with the request to register the second vocabulary application.

In some embodiments, the second metadata registered in association with the second (e.g., dynamic) vocabulary entry includes automatic speech recognition (ASR) metadata for the second vocabulary entry. For example, the ASR metadata may include pronunciation information and/or contextual information, for instance, indicating that the term "The Underground Railroad" is more likely to occur in proximity to the word "read" than the word "paint." In some embodiments, method 900 includes determining (e.g., generating) the ASR metadata for the second vocabulary entry. For example, for the second vocabulary entry for the recording "Voice Note 2," the digital assistant may determine pronunciation data for the identifier and/or contextual information related to the specific entity in order to facilitate recognition of the user-generated title.

In some embodiments, registering the second vocabulary entry includes, at block 920, indexing the second vocabulary entry in one or more searchable databases for the digital assistant. In some embodiments, as with the first vocabulary entry, the second vocabulary entry may be indexed to a search engine (e.g., term database 810) that the digital assistant can query for a vocabulary entry match based on the vocabulary entries' identifiers, synonyms, associated commands, and/or associated metadata. In some embodiments, the second vocabulary entry may be indexed to an ASR-specific database (e.g., ASR database 812) in order to promote (e.g., boost) recognition of the second vocabulary entry when performing an ASR or NLP process. For example, indexing the second vocabulary entry to an ASR database may increase the likelihood of recognizing the words "Voice Note 2" (in combination) as an ASR interpretation (e.g., as a candidate transcription of a speech input), as opposed to homonyms "Voice note too" or "Voice note to."

Referring to FIG. 9B, in some embodiments, at block 922, the first vocabulary entry and/or the second vocabulary entry for the software application are deregistered from the knowledge base for the digital assistant. In some embodiments, deregistering the first vocabulary entry and/or the second vocabulary entry for the software application includes removing the first vocabulary entry and/or the second vocabulary from the knowledge base. In some embodiments, deregistering the first vocabulary entry and/or the second vocabulary entry for the software application includes updating the first vocabulary entry and/or the second vocabulary entry such that the version of the vocabulary entry specifically associated with the software application is removed from the knowledge base, but a version of the vocabulary entry associated with a different application may remain registered.

In some embodiments, block 922 is performed in response to receiving a request to launch the software application. For example, launching the software application may trigger a "refresh" of the application vocabulary, where the second (e.g., dynamic) vocabulary entry is deregistered from the knowledge base and subsequently re-registered by performing some or all of blocks 912-920 (e.g., registering the dynamic application vocabulary anew). In some embodiments, block 922 is performed in accordance with a determination that the software application has been uninstalled from the electronic device implementing method 900. Accordingly, in these embodiments, the digital assistant will no longer interpret or operationalize user inputs including the first vocabulary entry and the second vocabulary entry with respect to the uninstalled software application.

The operations described above with reference to FIGS. 9A-9B are optionally implemented by components depicted in FIGS. 1-4, 6A-6B, 7A-7C, 8A-8B, and 10A-10B. For example, the operations of method 900 may be implemented according to system 800, which may be implemented on one or more electronic devices, such as a mobile phone. It would be clear to a person having ordinary skill in the art how other processes are implemented based on the components depicted in FIGS. 1-4, 6A-6B, 7A-7C, 8A-8B, and 10A-10B.

Figure 10A:
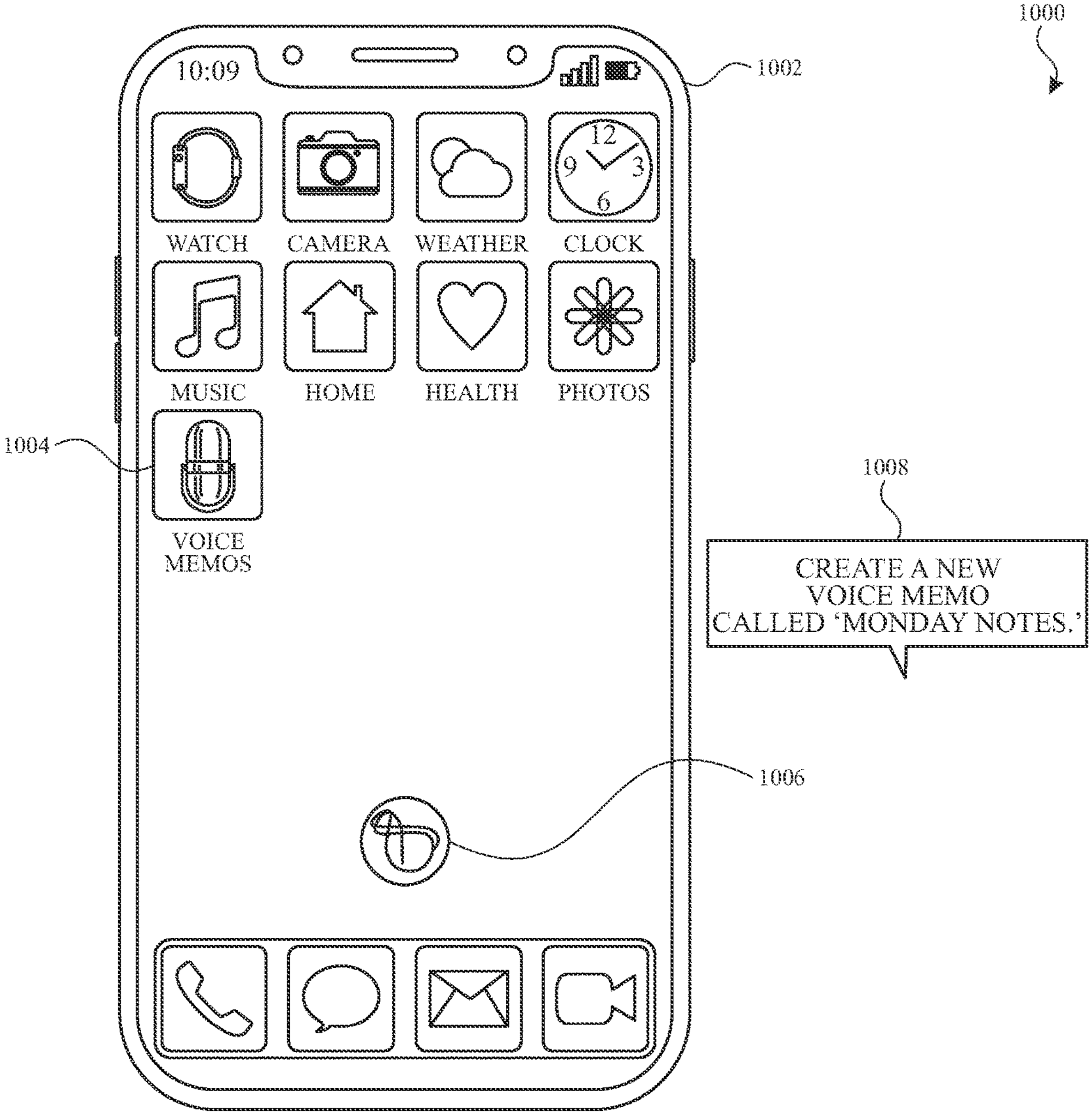
FIGS. 10A-10B illustrate systems for implementing an application vocabulary with a digital assistant, according to various examples.
Figure 10B:
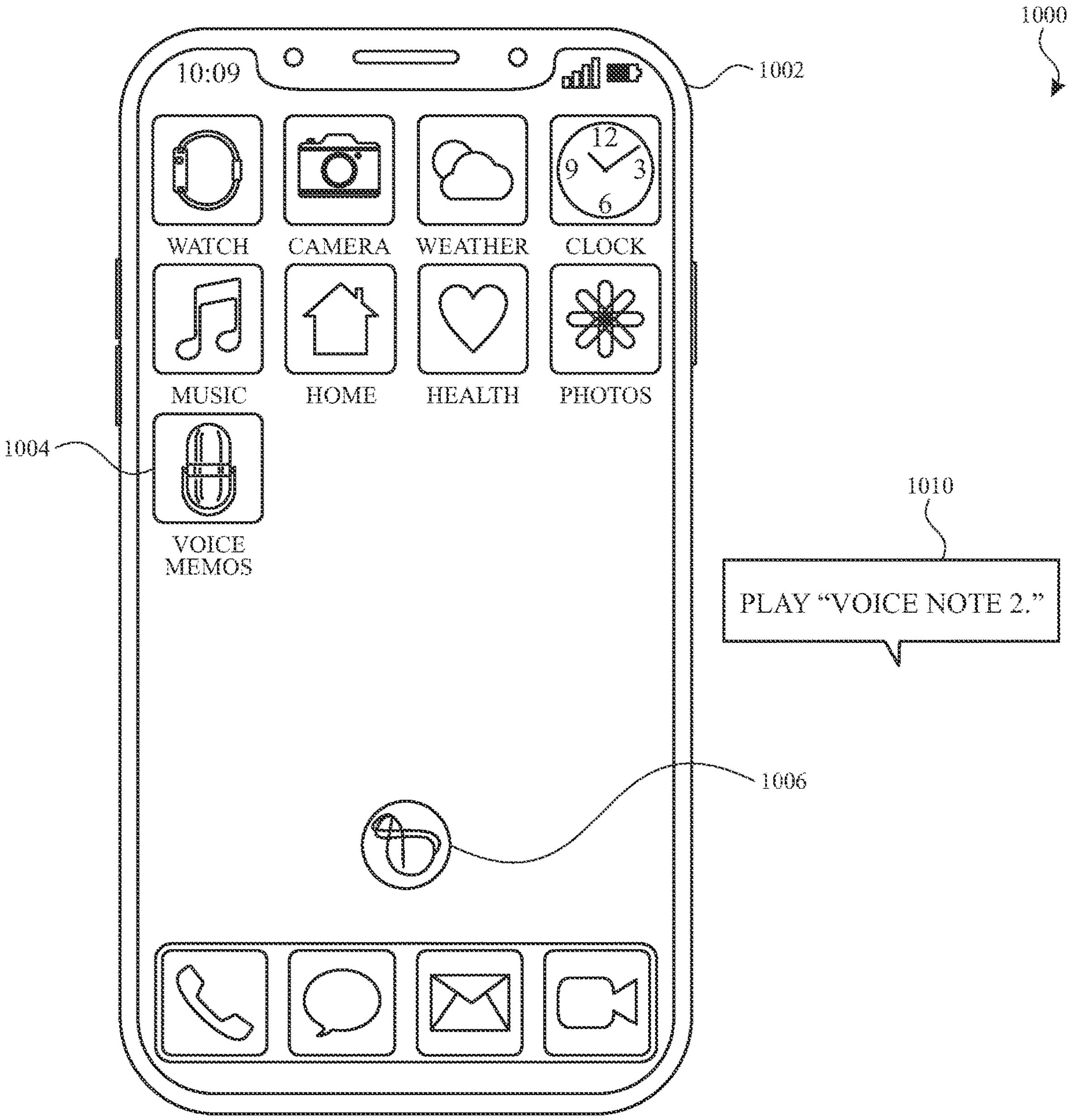

FIGS. 10A-10B illustrate system 1000 for implementing an application vocabulary with a digital assistant, according to various examples. System 1000 may be implemented, for example, using one or more electronic devices implementing a digital assistant (e.g., digital assistant system 700). In some embodiments, system 1000 is implemented using a client-server system (e.g., system 100), and the functions of system 1000 are divided up in any manner between one or more server devices (e.g., DA server 106) and a client device. In other embodiments, the functions of system 1000 are divided up between one or more servers and multiple client devices (e.g., a mobile phone and a smart watch). Thus, while some functions of system 1000 are described herein as being performed by particular devices of a client-server system, it will be appreciated that system 1000 is not so limited. In other examples, system 1000 is implemented using only a client device (e.g., user device 104) or only multiple client devices. In system 1000, some functions are, optionally, combined, the order of some functions is, optionally, changed, and some functions are, optionally, omitted. In some examples, additional functions may be performed in combination with the described functions of system 1000.

System 1000 may be implemented using hardware, software, or a combination of hardware and software to carry out the principles discussed herein. Further, system 1000 is exemplary, and thus system 1000 can have more or fewer components than shown, can combine two or more components, or can have a different configuration or arrangement of the components. Further, although the below discussion describes functions being performed at a single component of system 1000, it is to be understood that such functions can be performed at other components of system 1000 and that such functions can be performed at more than one component of system 1000. System 1000 may be used to implement method 1100 as described with respect to FIGS. 11A-11B, below.

Referring to FIGS. 10A-10B, system 1000 includes one or more software applications (e.g., first- and third-party applications) installed on device 1002, including application 1004. As illustrated in FIGS. 10A-10B, application 1004 is a voice recording application installed on device 1002, which provides additional content and functionality to a user of the electronic device, such as creating, editing, and playing back voice recordings. System 1000 further includes a digital assistant system (e.g., as described above with respect to digital assistant system 700), which includes a vocabulary used by the digital assistant to interpret and operationalize natural-language user inputs, such as spoken or typed user inputs to the digital assistant.

In order to integrate application content and functionality (e.g., in order to interpret and operationalize natural-language user inputs with the one or more applications), the digital assistant system uses an application vocabulary for the one or more applications. As discussed with respect to FIGS. 8A-9B, the application vocabulary includes vocabulary entries representing classes (e.g., programming concepts) handled by the one or more applications including application 1004. For example, a vocabulary entry may represent a type (e.g., an entity type, such as a recording entity type) or an object, such as a specific instance of an entity (e.g., a specific recording) or an enumeration (e.g., a tab of an application). The object or type represented by the vocabulary entry may be handled by a single application or by multiple applications (e.g., in addition to voice recording application 1004, a video editing application may be able to interact with recording-type entities).

As discussed with respect to FIGS. 8A-9B, application vocabulary may be classified into two types: static and dynamic. For example, a vocabulary entry for the voice recording entity type is static, as application 1004 will generally understand (e.g., handle) the general class of voice recording entities the same way on the time scale of the application update schedule. For static vocabulary entries, the donating application may include (e.g., in a first data file) predetermined information (e.g., metadata), such as synonyms selected (e.g., expertly-curated) by the application developers. On the other hand, a specific instance of a voice recording may be created, edited, or deleted by a user at any time, so a vocabulary entry for a given instance of a voice recording entity is a dynamic vocabulary entry. Although the donating application may provide some metadata for dynamic vocabulary entries (e.g., the identity of the user who created the instance, the date or time it was created, etc.), the metadata may not be included with the application and/or selected by the developers.

Accordingly, in order to integrate the content and functionality of application 1004, the digital assistant system obtains an application vocabulary from application 1004, including vocabulary entries of both the first and second type, and registers the application vocabulary to a knowledge base for the digital assistant. The application vocabulary for application 1004 may be obtained and registered to the digital assistant knowledge base as described above with respect to FIGS. 8A-9B. For example, the digital assistant may initiate the donation of (e.g., obtaining) the application vocabulary of the first type (e.g., the static vocabulary entries), for instance, when application 1004 is being installed or upon receiving a request to update or launch application 1004, while the application vocabulary of the second kind (e.g., the dynamic vocabulary entries) may be obtained in response to requests made by the application to register the dynamic vocabulary (e.g., "push" donations).

FIG. 10A illustrates the use of system 1000 to respond to a user input using static application vocabulary. As illustrated in FIG. 10A, the digital assistant, represented by icon 1006, receives user input 1008, a natural-language speech input "Create a new voice memo called 'Monday Notes.'" User input 1008 may be received by the digital assistant while device 1002 is displaying a home screen, for example, while the applications installed on device 1002 (including application 1004) are not running or are in an inactive state.

In response to receiving user input 1008, the digital assistant determines whether user input 1008 corresponds to a vocabulary entry from the application vocabulary. For example, the digital assistant may parse user input 1008 to obtain a set of one or more tokens (e.g., words, phrases, sub-word fragments, etc.), for instance, using automatic speech recognition (ASR) or natural language processing (NLP) techniques. The set of tokens can be compared to the metadata of the vocabulary entries registered with the knowledge base to determine whether one or more of the tokens representing user input 1008 corresponds to (e.g., matches) any application vocabulary.

For example, digital assistant may determine that the user input corresponds to a first vocabulary entry of the first type (e.g., static) included in the knowledge base for the digital assistant, representing the recording entity type for application 1004. The first vocabulary entry may be associated with one or more commands in the knowledge base, such as a command to create a new entity instance (and/or commands related to instances of the recording entity type, such as playing, pausing, editing, or deleting a specific recording entity). The first vocabulary entry may include an identifier for the represented type, such as "RecordingEntity," and may be registered in association with first metadata, such as synonyms for the entity type (e.g., "recording," "voice note," "voice memo," "dictation," etc.), application information (e.g., the identity of the voice recording application and/or the video editing application), the commands, and so forth.

Based on the tokens representing user input 1008, "Create a new voice memo called 'Monday Notes,'" the digital assistant determines that the tokens "voice memo" matches a synonym for the recording entity type included in the first metadata of the first vocabulary entry. In some embodiments, because the first vocabulary entry is a static vocabulary entry, and may include predetermined synonyms (e.g., synonyms selected by the application developers) in the first metadata, the digital assistant may require an exact match between the tokens and the synonym (or other portion of metadata used to determine the match). The correspondence between user input 1008 and the first vocabulary entry for the recording entity type may be further reinforced by other natural-language understanding and context information, for instance, the token "create" matching the action to create a new entity instance associated with the first vocabulary entry (e.g., compatible with the recording entity type).

As user input 1008 was received while application 1004 was in an inactive state, this determination may be performed while application 1004 is still in an inactive state (e.g., not running or not currently focused). Although application 1004 is in an inactive state, because the first vocabulary entry for the recording entity type was registered to the digital assistant knowledge base as part of the application vocabulary, the digital assistant is still able to interpret user input 1008 using the content and functionality of application 1004.

Once the digital assistant has determined that user input 1008 matches the first vocabulary entry for the recording entity type, the digital assistant causes application 1004 to perform a first action based on the first vocabulary entry. The digital assistant may identify application 1004 using the first metadata of the first vocabulary entry. For example, the first metadata of the first vocabulary entry may include the identity of application 1004 as an application that can handle the recording entity type and/or a command associated with the recording entity type. As another example, the first metadata of the first vocabulary entry may identify application 1004 as the application that donated the first vocabulary entry and/or a specific version of the first vocabulary entry to the digital assistant (e.g., the application that donated the "voice memo" synonym used for the match).

The digital assistant may further identify the first action using the first metadata of the first vocabulary entry. For example, the first metadata of the first vocabulary entry may include the command to create a new entity instance associated using application 1004. The first action may also be identified using other application vocabulary, such as a matching vocabulary entry for the command itself, which the digital assistant can determine is compatible with the recording entity type identified from the first vocabulary entry.

Accordingly, in response to user input 1008, "Create a new voice memo called 'Monday Notes,'" the digital assistant causes application 1004 to create a new instance of a recording entity, the entity type identified by the matching first vocabulary entry. In embodiments where user input 1008 is received and processed while application 1004 is in an inactive state, the digital assistant may first open (e.g., launch or change to an active focus) application 1004. In some embodiments, the digital assistant may also provide application 1004 with other information for performing the first task, such as a parameter for the name of the new instance of the recording entity, "Monday Notes," extracted from user input 1008 (e.g., using natural-language processing techniques). In some embodiments, in order to cause application 1004 to perform the first action based on the first vocabulary entry, the digital assistant instructs application 1004 using the identified command to create a new entity instance, for example, using a digital assistant plugin or an application programming interface (API) call. In response to receiving the instruction, application 1004 performs the tasks needed to complete the first action, for example, instantiating a new instance of the recording entity, naming it "Voice Notes," and beginning to record audio.

FIG. 10B illustrates the use of system 1000 to respond to a user input using dynamic application vocabulary. As illustrated in FIG. 10B, the digital assistant, represented by icon 1006, receives user input 1010, a natural-language speech input "Play 'Voice Note 2.'" User input 1010 may be received by the digital assistant while device 1002 is displaying a home screen, for example, while the applications installed on device 1002 (including application 1004) are not running or are in an inactive state.

As described with respect to FIG. 10A, the digital assistant determines whether user input 1010 corresponds to a vocabulary entry from the application vocabulary. For example, the digital assistant may parse user input 1010 to obtain a set of one or more tokens (e.g., words, phrases, sub-word fragments, etc.) to compare to the application vocabulary, for instance, using automatic speech recognition (ASR) or natural language processing (NLP) techniques.

For example, digital assistant may determine that the user input corresponds to a second vocabulary entry of the second type (e.g., dynamic) included in the knowledge base for the digital assistant, representing the recording entity instance "Voice Note 2" for application 1004. The second vocabulary entry may be associated with one or more commands in the knowledge base, such as a command to play, edit, pause, or delete the entity. The second vocabulary entry may include an identifier for the represented type, such as "VoiceNote2," and may be registered in association with second metadata, such as application information (e.g., the identity of the voice recording application and/or the video editing application), the commands, and so forth. In some embodiments, as described above with respect to FIGS. 8B-9B, the second metadata may include ASR metadata determined (e.g., generated) during the registration of the second vocabulary entry, such as pronunciation data and/or contextual information. In these embodiments, the ASR metadata included in the second metadata may promote (e.g., boost) ASR recognition of the second vocabulary entry. For example, system 1000 may determine pronunciation data for the second vocabulary entry to facilitate the recognition of the words "Voice Note 2" in combination as an ASR interpretation, as opposed to homonyms "Voice note too" or "Voice note to," and/or contextual information indicating that "Voice Note 2" is more likely to occur in proximity to the word "play" than to the word "call."

Based on the tokens representing user input 1010, "Play 'Voice Note 2,'" the digital assistant determines that the tokens "Voice Note 2" matches the identifier and/or ASR metadata of the second vocabulary entry. In some embodiments, because the second vocabulary entry is a dynamic vocabulary entry, the second vocabulary entry may represent proper, automatically-generated, or user-generated terminology, and may not include predetermined synonyms. Accordingly, the digital assistant may only require a partial match between the tokens and the second metadata to account for slight variations (e.g., an ASR transcription of an input as "Voice Note To" rather than "Voice Note 2"). The correspondence between user input 1010 and the second vocabulary entry for the recording entity type may be further reinforced by other natural-language understanding and context information, for instance, the token "play" matching the command to play a voice recording associated with the second vocabulary entry (e.g., compatible with the recording entity instance).

As with user input 1008, although application 1004 may be in an inactive state while user input 1010 is received, because the second vocabulary entry for the recording "Voice Note 2" was registered to the digital assistant knowledge base as part of the application vocabulary, the digital assistant is still able to interpret user input 1010 using the content and functionality of application 1004.

Once the digital assistant has determined that user input 1010 matches the second vocabulary entry for the recording "Voice Note 2," the digital assistant causes application 1004 to perform a second action based on the second vocabulary entry. As described with respect to FIG. 10A, the digital assistant may identify application 1004 and/or the second action using the second metadata of the second vocabulary entry. For example, the second metadata of the second vocabulary entry may include the identity of application 1004 as the application that created the recording "Voice Note 2," and may include indications of commands compatible with recording entities, such as playing, editing, moving, or deleting.

Accordingly, in response to user input 1010, "Play 'Voice Note 2,'" the digital assistant causes application 1004 to initiate playing the recording "Voice Note 2," the specific entity instance identified by the matching second vocabulary entry. As described with respect to FIG. 10A, initiating the performance of the second action with application 1004 may include opening application 1004 (e.g., if application 1004 had been in an inactive state) or providing additional parameters for the second action to application 1004. The digital assistant may instruct application 1004 using the identified command, for instance, using a digital assistant plugin or an API call. Accordingly, application 1004 accesses the recording "Voice Note 2" and plays it for the user.

The operations described above with reference to FIGS. 10A-10B are optionally implemented by components depicted in FIGS. 1-4, 6A-6B, and 7A-7C. For example, the operations of system 1000 may be implemented by one or more electronic devices (e.g., 104, 122, 200, 400, 600, 1002) such as one implementing system 700 It would be clear to a person having ordinary skill in the art how other processes are implemented based on the components depicted in FIGS. 1-4, 6A-6B, and 7A-7C.

Figure 11A:
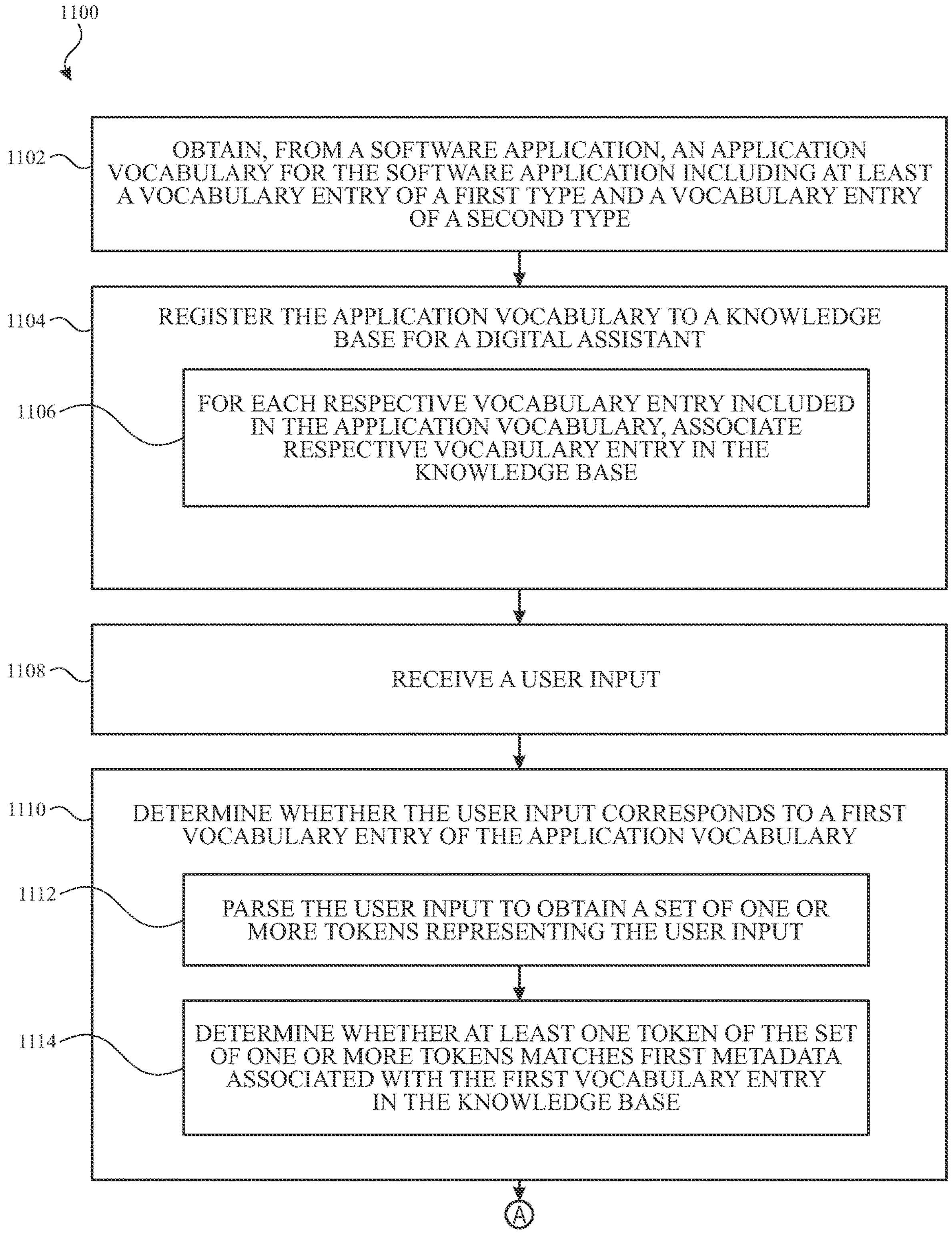
FIGS. 11A-11B illustrate a flow chart for implementing an application vocabulary with a digital assistant, according to various examples
Figure 11B:
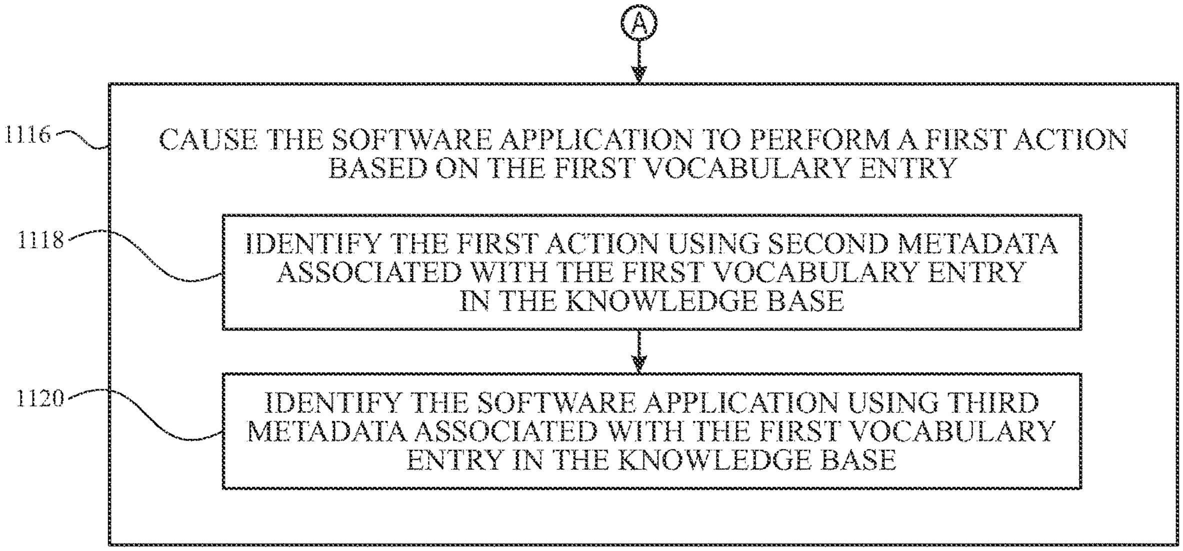

FIGS. 11A-11B are a flow diagram illustrating method 1100 for implementing an application vocabulary with a digital assistant in accordance with some embodiments. Method 1100 may be performed using one or more electronic devices (e.g., device 104, device 200, device 600, device 1002) with one or more processors and memory. In some embodiments, method 1100 is performed using a client-server system, with the operations of method 1100 divided up in any manner between the client device(s) (e.g., 104, 200, 600, 1002) and the server. Some operations in method 1100 are, optionally, combined, the orders of some operations are, optionally, changed, and some operations are, optionally, omitted.

Referring to FIG. 11A, at block 1102, an application vocabulary for a software application, including at least a vocabulary entry of a first type and a vocabulary entry of a second type, is obtained from a software application. In some embodiments, block 1102 is performed as described with respect to FIGS. 8A-9B, and in particular, blocks 902 and 912-914 of FIG. 9A. For example, the application vocabulary may represent content and functionality of a voice recording application (e.g., application 1004), a reader application, or any other application installed on or in the process of being installed on a device implementing method 1100.

In some embodiments, the vocabulary entry of the first type is a static vocabulary entry (e.g., as described with respect to the first vocabulary entry of FIGS. 8A-9B), and the vocabulary entry of the second type is a dynamic vocabulary entry (e.g., as described in further detail with respect to the second vocabulary entry of FIGS. 8A-9B). That is, in some embodiments, the obtained application vocabulary is a hybrid static-dynamic vocabulary for the software application. For example, the application vocabulary for a voice recording application may include a static vocabulary entry for a general recording entity type and dynamic vocabulary entries for specific instances of recordings in the user's recording library. As another example, the application vocabulary for a reader application may include static vocabulary entries for a general book entity type and a "Library" tab enumeration, and dynamic vocabulary entries for specific instances of books in the user's library and/or an online library or book store.

In some embodiments, obtaining the application vocabulary for the software application includes obtaining at least a first portion of the application vocabulary in response to receiving a user input requesting to install the software application. For example, the first portion of the application vocabulary may be an initial donation of static application vocabulary (e.g., vocabulary of the first type) obtained as part of the application installation process. In some embodiments, the software application is installed on the electronic device implementing method 1100. In these embodiments, obtaining the application vocabulary for the software application may include obtaining at least a second portion of the application in response to launching the software application. For example, the second portion of the application vocabulary may be a "refresh" of the static application vocabulary (e.g., vocabulary of the first type).

In some embodiments, obtaining the application vocabulary for the software application includes receiving a request from the software application, and, in response to receiving the request from the software application, obtaining at least a third portion of the application vocabulary, which includes the vocabulary entry of the second type. For example, as described with respect to FIG. 8B and block 914 of FIG. 9A, the third portion of the application vocabulary may be a dynamic vocabulary entry or dynamic vocabulary corpus for which the software application "pushes" a donation. In some embodiments, the request from the software application is received as an application programming interface (API) call. For example, the software application may issue the request (e.g., make the API call) directly, or the request from the software application may be received via a daemon of the software application.

At block 1104, the application vocabulary is registered to a knowledge base for a digital assistant. In some embodiments, block 1104 is performed as described with respect to FIGS. 8A-9B, and in particular, blocks 906-910 and 916-920 of FIG. 9A.

In some embodiments, at block 1106, registering the application vocabulary to the knowledge base includes, for each respective vocabulary entry, associating respective metadata with the respective vocabulary entry in the knowledge base. For example, the metadata for a given vocabulary entry may include the identifier, synonyms, commands, donating application information, source or context information, automatic speech recognition (ASR) data, or any other information associated with the vocabulary entry that would assist the digital assistant in interpreting and operationalizing a user input with respect to the vocabulary entry.

In some embodiments, method 1100 includes determining ASR metadata for a respective vocabulary entry, and the ASR metadata is included in the respective metadata. In some embodiments, as described with respect to FIGS. 8B and 10B, dynamic vocabulary entries such as "Voice Note 2" may not include predetermined synonyms, and may instead be pre-processed to determine (e.g., generate) ASR metadata, such as pronunciation data and/or contextual information. In these embodiments, the ASR metadata may be registered in association with the dynamic vocabulary entries in order to increase the likelihood of recognition of corresponding tokens at the ASR stage (e.g., block 1112). For example, the ASR metadata may promote (e.g., "boost") the recognition of "Voice Note 2" in combination, (e.g., as opposed to homonyms "Voice note too" or "Voice note to") or when in proximity to contextually-related words such as "play" (e.g., as opposed to "call").

At block 1108, a user input is received. In some embodiments, the user input is a natural-language input to the digital assistant, which may be a spoken user input or a text (e.g., typed) input. Example user inputs may include "Create a new voice memo called 'Monday Notes,'" "Play 'Voice Note 2,'" "Open 'The Underground Railroad' to my bookmark," "Open my library," and so forth. In some embodiments, the user input is received while the software application is in an active state, for instance, while the user is viewing the software application on the electronic device implementing method 1100. In some embodiments, the user input is received while the software application is not in an active state. For example, the user input may be received while the software application is not running or not focused (e.g., while the user is viewing a home page on the electronic device implementing method 1100), as illustrated in FIGS. 10A-10B.

At block 1110, a determination is made whether the user input corresponds to a first vocabulary entry of the application vocabulary. For example, the correspondence may be explicit (e.g., the user input names the first vocabulary entry) or implicit (e.g., the first vocabulary entry can be implicitly determined from the context of the user input). In some embodiments, as described with respect to FIGS. 8A-9B, the first vocabulary entry represents a first class (e.g., first programming concept) handled by the software application. For example, the first vocabulary entry may represent a first object handled by the software application, such as a specific instance of an entity (e.g., the recording entity "Voice Note 2," the book entity "The Underground Railroad") or an enumeration (e.g., the "Library" tab of a reader application). As another example, the first vocabulary entry may represent a first type handled by the software application, such as a general entity type (e.g., a general recording entity type, a general book entity type, etc.). Accordingly, at block 1110, the digital assistant may determine whether the user input refers, implicitly or explicitly, to a programming concept that the digital assistant can operationalize using the content and functionality of the software application.

In some embodiments, the first vocabulary entry is associated with at least a first command for the software application. In some embodiments, the at least first command may be included as a portion of the first metadata associated with the first vocabulary entry in the knowledge base (e.g., at block 1106). For example, the first command may be a task or action that can be performed by the software application on, with, or in relation to the first class. A first vocabulary entry for a recording entity type may be associated with commands to create an instance of the recording entity type with the voice recording application, or commands that can be performed on specific instances of the recording entity type, such as playing, editing, or deleting. As another example, a first vocabulary entry for the book instance "The Underground Railroad" may be associated with commands to open the book, search the book, place a bookmark in the book, and so forth.

In some embodiments, at block 1112, determining whether the user input corresponds to the first vocabulary entry includes parsing the user input to obtain a set of one or more tokens representing the user input. For example, for a natural-language user input, such as speech or typed text, the digital assistant may initiate automatic speech recognition (ASR) and/or natural-language processing (NLP) processing to recognize the phonemes, sub-word fragments, words, and/or phrases uttered or typed by the user. The recognized tokens can then be compared to the respective metadata of the application vocabulary entries registered with the knowledge base to determine whether one or more of the tokens representing the user input corresponds to (e.g., matches) any application vocabulary.

In some embodiments, at block 1114, determining whether the user input corresponds to the first vocabulary entry includes determining whether at least one token of the set of one or more tokens matches first metadata associated with the first vocabulary entry in the knowledge base. For example, as described with respect to FIGS. 8A-9B, the application vocabulary may be indexed to one or more searchable databases that the digital assistant can search using the recognized tokens to find matching vocabulary entries. In some embodiments, as discussed above, the first metadata associated with the first vocabulary entry may include any information related to the first vocabulary entry, such as identifiers, synonyms, commands, donating application information, related vocabulary entries, and the like.

For example, the user input "Open 'The Underground Railroad' to my bookmark" may be determined to correspond to a vocabulary entry for the book entity "The Underground Railroad" for a reader application based on the token(s) "The Underground Railroad" matching the title (e.g., the identifier). Additional matches, such as the token "open" matching a command for opening the book entity "The Underground Railroad," and/or the token "bookmark" matching a related vocabulary entry to the book entity type of the reader application, may increase confidence in the determination that the user input corresponds to the first vocabulary entry for the software application. As another example, a user input such as "Open the book by Colson Whitehead" may be determined to correspond to the vocabulary entry for the book entity "The Underground Railroad" based on the token(s) "Colson Whitehead" matching "author" metadata for the book entity. As another example, a user input such as "My Library" may be determined to explicitly correspond to a vocabulary entry for the "Library" tab enumeration, as well as to implicitly correspond to a vocabulary entry for an open folder action, as a command for an open folder action is associated with the vocabulary entry for the "Library" tab enumeration.

In some embodiments, the first vocabulary entry is a vocabulary entry of the first type (e.g., a static vocabulary entry), and determining whether the at least one token matches the first metadata includes determining whether the at least one token exactly matches at least a first portion of the first metadata. For example, as discussed above with respect to FIGS. 8A and 10A, for static vocabulary, some of the associated metadata, such as synonyms, may be predetermined (e.g., selected by the application developers) and provided by the software application (e.g., as part of the first data file), and accordingly, the exact match standard may be used as the synonyms are likely to reflect expected user behavior. In some embodiments, the at least first portion of the first metadata may include a synonym for the first vocabulary entry. For example, a first vocabulary entry for a recording entity type may include the predetermined synonyms "recording," "voice note," "voice memo," and "dictation." Accordingly, the user input "Create a new voice memo called 'Monday Notes'" may be determined to correspond to the first vocabulary entry since the tokens "voice memo" exactly match at least the portion of the first metadata for the synonym "voice memo." However, a user input such as "Create a note called 'Monday Notes'" may not be determined to correspond to the first vocabulary entry, since the token "note" on its own is not an exact match for a synonym of the first vocabulary entry.

In some embodiments, the first vocabulary entry is a vocabulary entry of the second type (e.g., a dynamic vocabulary entry), and determining whether the at least one token matches the first metadata includes determining whether the at least one token partially matches at least a second portion of the first metadata. For example, as discussed above with respect to FIGS. 8B and 10B, for dynamic vocabulary, the first vocabulary entry may include proper, automatically-generated, or user-generated terminology, and accordingly, a partial match standard may be used to account for unanticipated user behavior or inexact ASR parsing. For example, for a first vocabulary entry for the book instance "The Underground Railroad," a user input "Open 'Underground Railroad'" may be a sufficient match to the identifier "TheUndergroundRailroad." As another example, the user input "Play 'Voice Note 2'" may be parsed as the set of tokens "Play voice note too," which is not an exact (e.g., character-for-character) match for the identifier "VoiceNote2," but may be a sufficient match under the partial match standard. In some embodiments, the second portion of the first metadata may include the ASR metadata determined during the registration (e.g., at block 1106), which may reduce uncertainty or inaccuracy in determining correspondence between the user input and a dynamic vocabulary entry.

In some embodiments, any or all of blocks 1108-1114 (e.g., receiving the user input and determining whether the user input corresponds to the first vocabulary entry) are performed while the software application is not in an active state, such as while the software application is not currently running or not currently focused (e.g., the software application is running in the background, but not being viewed or interacted with by the user). For example, registering the application vocabulary at block 1104 allows the digital assistant to interpret and operationalize user inputs with respect to the software application at any time, as the application vocabulary persists in the knowledge base for the digital assistant (e.g., until deregistered) even when the software application is inactive.

Referring to FIG. 11B, at block 1116, the software application is caused to perform a first action based on the first vocabulary entry. For example, in response to the user input "Open 'The Underground Railroad' to my bookmark," the digital assistant may cause a reader application to perform the action of opening the book "The Underground Railroad," which is the specific book entity represented by the first vocabulary entry corresponding to the user input. As another example, in response to the user input "Open my library," the digital assistant may cause the reader application to perform the action of opening to the "Library" tab, which is the enumeration represented by the first vocabulary entry corresponding to the user input. In some embodiments, the first action is determined by providing the first vocabulary entry and any associated metadata to a statistical or machine learning model, for instance, allowing the first vocabulary to influence the selection of the first action even if a vocabulary entry for the first action is not included in the user input.

In some embodiments, causing the software application to perform the first action includes, at block 1118, identifying the first action using second metadata associated with the first vocabulary entry in the knowledge base. In some embodiments, the second metadata may be a portion of the first metadata associated with the first vocabulary entry during the registration of the application vocabulary, such as the at least first command associated with the first vocabulary entry in the knowledge base. For example, for a first vocabulary entry for a recording entity type, the second metadata may include a command to create a new entity instance, so the digital assistant may identify the first action as creating a new instance of the recording entity type. As another example, for a first vocabulary entry for the specific book entity "The Underground Railroad," the second metadata may include a command to open a book entity, so the digital assistant may identify the first action as opening the specific book entity "The Underground Railroad."

In some embodiments, the first action may be identified using other application vocabulary, such as a vocabulary entry for an action determined to be compatible with the first class represented by the first vocabulary entry. For example, the digital assistant may recognize the token "create" in the user input "Create a voice memo called 'Monday Notes'" as an action for creating an entity instance compatible with the recording entity type represented by the first vocabulary entry, and may thus identify the first action as creating an instance of the recording entity type.

In some embodiments, causing the software application to perform the first action includes, at block 1120, identifying the software application using third metadata associated with the first vocabulary entry in the knowledge base. In some embodiments, the third metadata may be a portion of the first metadata associated with the first vocabulary entry during the registration of the application vocabulary, such as the identity of the application or applications that donated the first vocabulary entry and/or handle the first class represented by the first vocabulary entry. For example, for a first vocabulary entry for a recording entity type, the third metadata may indicate that a voice recording application can handle recording entities and/or can perform the command to create a new entity instance, so the digital assistant may identify that the first action of creating a new instance of the recording entity type should be performed with the voice recording application. As another example, for a first vocabulary entry for the specific book entity "The Underground Railroad," the third metadata may indicate that a reader application donated the first vocabulary entry, so the digital assistant may identify that the first action of opening the specific book entity "The Underground Railroad" should be performed with the reader application.

In some embodiments, such as embodiments where some or all of blocks 1108-1114 are performed while the software application is in an inactive state, causing the software application to perform the first action based on the first vocabulary entry at block 1116 includes opening (e.g., launching or focusing) the software application. In some embodiments, causing the software application to perform the first action based on the first vocabulary entry at block 1116 includes instructing the software application using the first command. For example, the first command may correspond to a digital assistant plugin or API call that causes the software application to perform the first action. In some embodiments, causing the software application to perform the first action based on the first vocabulary entry at block 1116 includes providing additional information for performing the first action to the software application. For example, for the user input "Create a voice memo called 'Monday Notes,'" the digital assistant can extract (e.g., using NLP techniques) the name "Monday Notes" as a parameter for the first action of creating a new recording entity. Accordingly, using the application vocabulary as described above, the digital assistant is able to coordinate a response to a user input using application content and functionality.

The operations described above with reference to FIGS. 11A-11B are optionally implemented by components depicted in FIGS. 1-4, 6A-6B, 7A-7C, 8A-8B, and 10A-10B. For example, the operations of method 900 may be implemented according to system 800, which may be implemented on one or more electronic devices, such as a mobile phone. It would be clear to a person having ordinary skill in the art how other processes are implemented based on the components depicted in FIGS. 1-4, 6A-6B, 7A-7C, 8A-8B, and 10A-10B.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

In accordance with some implementations, an electronic device (e.g., a portable electronic device) is provided that comprises means for performing any of the methods or processes described herein.

In accordance with some implementations, an electronic device (e.g., a portable electronic device) is provided that comprises a processing unit configured to perform any of the methods or processes described herein.

In accordance with some implementations, an electronic device (e.g., a portable electronic device) is provided that comprises one or more processors and memory storing one or more programs for execution by the one or more processors, the one or more programs including instructions for performing any of the methods or processes described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the integration of application vocabulary for use by a digital assistant. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to populate a registered application vocabulary, for instance, as metadata for a vocabulary entry. Accordingly, use of such personal information data enables a digital assistant to interpret and tailor an application response based on user preferences. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of a digital assistant integrating application vocabulary, the present technology can be configured to allow users to select to "opt in" or "opt out" of participation in the collection of personal information data during registration for services or anytime thereafter. In another example, users can select not to provide mood-associated data for a digital assistant integrating application vocabulary. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, a digital assistant can interpret and operationalize a user input using application vocabulary based on non-personal information data or a bare minimum amount of personal information, such as the content being requested by the device associated with a user, other non-personal information available to the digital assistant integrating application vocabulary, or publicly available information.

What is claimed is:

1. An electronic device, comprising:

one or more processors;

a memory; and one or more programs, wherein the one or more programs are stored in the memory and configured to be executed by the one or more processors, the one or more programs including instructions for:

obtaining, from a software application, a first vocabulary entry for the software application;

registering the first vocabulary entry with a knowledge base for a digital assistant of the electronic device; and while the software application is running:

receiving a request from the software application to register a second vocabulary entry for the software application, wherein the second vocabulary entry is included in an ordered set of vocabulary entries;

determining that an order index of the second vocabulary entry in the ordered set of vocabulary entries satisfies registration criteria; and in accordance with a determination that the order index of the second vocabulary entry satisfies the registration criteria:

registering the second vocabulary entry with the knowledge base for the digital assistant.

2. The electronic device of claim 1, wherein the first vocabulary entry includes a first identifier of a first class handled by the software application, and wherein the first vocabulary entry includes a first synonym for the first identifier, wherein the second vocabulary entry includes a second identifier of a second class handled by the software application.

3. The electronic device of claim 1, wherein the first vocabulary entry is associated with a first command for the software application.

4. The electronic device of claim 1, wherein the second vocabulary entry is associated with a second command for the software application.

5. The electronic device of claim 1, wherein obtaining the first vocabulary entry for the software application is performed in response to receiving a user input requesting to install the software application.

6. The electronic device of claim 1, wherein the software application is installed on the electronic device.

7. The electronic device of claim 1, wherein obtaining the first vocabulary entry for the software application is performed in response to launching the software application.

8. The electronic device of claim 1, wherein obtaining the first vocabulary entry for the software application is initiated by the digital assistant of the electronic device.

9. The electronic device of claim 1, wherein obtaining the first vocabulary entry for the software application includes retrieving the first vocabulary entry from a first data file of the software application.

10. The electronic device of claim 1, wherein registering the first vocabulary entry to the knowledge base includes registering first metadata in association with the first vocabulary entry.

11. The electronic device of claim 1, wherein registering the first vocabulary entry to the knowledge base includes indexing the first vocabulary entry in a searchable database for the digital assistant.

12. The electronic device of claim 1, wherein the request from the software application is received as an application programming interface (API) call.

13. The electronic device of claim 1, wherein the request from the software application is received via a daemon.

14. The electronic device of claim 1, wherein the one or more programs further include instructions for:

determining whether the software application has modified the ordered set of vocabulary entries; and receiving the request from the software application to register the second vocabulary entry in accordance with a determination that the software application has modified the set of vocabulary entries.

15. The electronic device of claim 1, wherein registering the second vocabulary entry to the knowledge base includes registering second metadata in association with the second vocabulary entry.

16. The electronic device of claim 15, wherein the second metadata includes automatic speech recognition (ASR) metadata for the second vocabulary entry, and wherein the one or more programs further include instructions for:

determining the ASR metadata for the second vocabulary entry.

17. The electronic device of claim 1, wherein registering the second vocabulary entry to the knowledge base includes indexing the second vocabulary entry in a searchable database for the digital assistant.

18. The electronic device of claim 1, wherein the one or more programs further include instructions for:

in response to receiving a request to launch the software application, deregistering the second vocabulary entry from the knowledge base.

19. The electronic device of claim 1, wherein the one or more programs further include instructions for:

in accordance with a determination that the software application has been uninstalled from the electronic device, deregistering the first vocabulary entry and the second vocabulary entry from the knowledge base.

20. A non-transitory computer-readable storage medium storing one or more programs, the one or more programs comprising instructions, which when executed by one or more processors of a first electronic device, cause the first electronic device to:

obtain, from a software application, a first vocabulary entry for the software application;

register the first vocabulary entry with a knowledge base for a digital assistant of the electronic device; and while the software application is running:

receive a request from the software application to register a second vocabulary entry for the software application, wherein the second vocabulary entry is included in an ordered set of vocabulary entries;

determining that an order index of the second vocabulary entry in the ordered set of vocabulary entries satisfies registration criteria; and in accordance with a determination that the order index of the second vocabulary entry satisfies the registration criteria:

register the second vocabulary entry with the knowledge base for the digital assistant.

21. The non-transitory computer-readable storage medium of claim 20, wherein the first vocabulary entry includes a first identifier of a first class handled by the software application, and wherein the first vocabulary entry includes a first synonym for the first identifier, wherein the second vocabulary entry includes a second identifier of a second class handled by the software application.

22. The non-transitory computer-readable storage medium of claim 20, wherein obtaining the first vocabulary entry for the software application is performed in response to receiving a user input requesting to install the software application.

23. The non-transitory computer-readable storage medium of claim 20, wherein obtaining the first vocabulary entry for the software application is performed in response to launching the software application.

24. The non-transitory computer-readable storage medium of claim 20, wherein obtaining the first vocabulary entry for the software application is initiated by the digital assistant of the electronic device.

25. The non-transitory computer-readable storage medium of claim 20, wherein obtaining the first vocabulary entry for the software application includes retrieving the first vocabulary entry from a first data file of the software application.

26. The non-transitory computer-readable storage medium of claim 20, wherein registering the first vocabulary entry to the knowledge base includes registering first metadata in association with the first vocabulary entry.

27. The non-transitory computer-readable storage medium of claim 20, wherein the one or more programs further comprise instructions, which when executed by the one or more processors of the first electronic device, further cause the first electronic device to:

determine whether the software application has modified the ordered set of vocabulary entries; and receive the request from the software application to register the second vocabulary entry in accordance with a determination that the software application has modified the set of vocabulary entries.

28. The non-transitory computer-readable storage medium of claim 20, wherein registering the second vocabulary entry to the knowledge base includes indexing the second vocabulary entry in a searchable database for the digital assistant.

29. The non-transitory computer-readable storage medium of claim 20, wherein the one or more programs further comprise instructions, which when executed by the one or more processors of the first electronic device, further cause the first electronic device to:
in response to receiving a request to launch the software application, deregister the second vocabulary entry from the knowledge base.

30. The non-transitory computer-readable storage medium of claim 20, wherein the one or more programs further comprise instructions, which when executed by the one or more processors of the first electronic device, further cause the first electronic device to:
in accordance with a determination that the software application has been uninstalled from the electronic device, deregister the first vocabulary entry and the second vocabulary entry from the knowledge base.

31. A method for registering application terminology, comprising:
at an electronic device with one or more processors and memory:
obtaining, from a software application, a first vocabulary entry for the software application;
registering the first vocabulary entry with a knowledge base for a digital assistant of the electronic device; and
while the software application is running:
receiving a request from the software application to register a second vocabulary entry for the software application, wherein the second vocabulary entry is included in an ordered set of vocabulary entries;
determining that an order index of the second vocabulary entry in the ordered set of vocabulary entries satisfies registration criteria; and
in accordance with a determination that the order index of the second vocabulary entry satisfies the registration criteria:
registering the second vocabulary entry with the knowledge base for the digital assistant.

32. The method of claim 31, wherein the first vocabulary entry includes a first identifier of a first class handled by the software application, and wherein the first vocabulary entry includes a first synonym for the first identifier, wherein the second vocabulary entry includes a second identifier of a second class handled by the software application.

33. The method of claim 31, wherein obtaining the first vocabulary entry for the software application is performed in response to receiving a user input requesting to install the software application.

34. The method of claim 31, wherein obtaining the first vocabulary entry for the software application is performed in response to launching the software application.

35. The method of claim 31, wherein obtaining the first vocabulary entry for the software application is initiated by the digital assistant of the electronic device.

36. The method of claim 31, wherein obtaining the first vocabulary entry for the software application includes retrieving the first vocabulary entry from a first data file of the software application.

37. The method of claim 31, wherein registering the first vocabulary entry to the knowledge base includes registering first metadata in association with the first vocabulary entry.

38. The method of claim 31, further comprising:
determining whether the software application has modified the ordered set of vocabulary entries; and
receiving the request from the software application to register the second vocabulary entry in accordance with a determination that the software application has modified the set of vocabulary entries.

39. The method of claim 31, wherein registering the second vocabulary entry to the knowledge base includes indexing the second vocabulary entry in a searchable database for the digital assistant.

40. The method of claim 31, further comprising:
in response to receiving a request to launch the software application, deregistering the second vocabulary entry from the knowledge base.

41. The method of claim 31, further comprising:
in accordance with a determination that the software application has been uninstalled from the electronic device, deregistering the first vocabulary entry and the second vocabulary entry from the knowledge base.

* * * * *